(12) United States Patent
Ito et al.

(10) Patent No.: US 12,038,419 B2
(45) Date of Patent: Jul. 16, 2024

(54) LIQUID CHROMATOGRAPHY DATA PROCESSING DEVICE, AND LIQUID CHROMATOGRAPHY DEVICE

(71) Applicant: HITACHI HIGH-TECH SCIENCE CORPORATION, Tokyo (JP)

(72) Inventors: Masahito Ito, Tokyo (JP); Katsutoshi Shimizu, Tokyo (JP)

(73) Assignee: Hitachi High-Tech Science Corporation, Tokyo (JP)

( * ) Notice: Subject to any disclaimer, the term of this patent is extended or adjusted under 35 U.S.C. 154(b) by 223 days.

(21) Appl. No.: 17/477,279

(22) Filed: Sep. 16, 2021

(65) Prior Publication Data
US 2022/0099639 A1 Mar. 31, 2022

(30) Foreign Application Priority Data

Sep. 24, 2020 (JP) ................................. 2020-160100
Jun. 14, 2021 (JP) ................................. 2021-098964

(51) Int. Cl.
*G01N 30/86* (2006.01)

(52) U.S. Cl.
CPC ..... *G01N 30/8651* (2013.01); *G01N 30/8658* (2013.01)

(58) Field of Classification Search
None
See application file for complete search history.

(56) References Cited

U.S. PATENT DOCUMENTS

2019/0145943 A1* 5/2019 Ito .................. G01N 30/74 703/9

FOREIGN PATENT DOCUMENTS

| JP | 2019090813 A | 6/2019 |
|---|---|---|
| WO | 2014030537 A1 | 2/2014 |

OTHER PUBLICATIONS

Ito, et al., "Three-Dimensional Representation Method Using Pressure, Time, and Number of Theoretical Plates to Analyze Separation Conditions in HPLC Columns", Analytical Sciences, Feb. 2018, vol. 34 (6 pages).
Groskreutz et al., "Graphical Method for Choosing Optimized Conditions Given a Pump Pressure and a Particle Diameter in Liquid Chromatography", Analytical Chemistry, 2016, 88, 11742-11749 (8 pages).

(Continued)

*Primary Examiner* — Daniel S Larkin
(74) *Attorney, Agent, or Firm* — Holland & Hart LLP

(57) ABSTRACT

In order to obtain analysis conditions, there is provided a liquid chromatography data processing device which generates, based on data regarding analysis conditions of a chromatography device and data on separation performance, display data that displays a graph showing correspondence of data regarding analysis conditions of the chromatography device and separation performance, generating a first group of biaxial data regarding the above analysis conditions, second group of biaxial data obtained by calculation comprising multiplication and/or division of two data of the first group of biaxial data, and display data according to a graph showing correspondence of the data regarding separation performance, wherein at least each axis of the first group of biaxial data and the second group of biaxial data is represented as a logarithmic axis.

10 Claims, 28 Drawing Sheets

CONTOUR DIAGRAM IN WHICH BOTTOM PLANE IS LOGARITHMIC AXIS

(56) References Cited

OTHER PUBLICATIONS

Antia et al., "High-Performance Liquid Chromatography at Elevated Temperatures: Examination of Conditions For The Rapid Separation of Large Molecules", Journal of Chromatography, 435, 1988 (15 pages). 435, 1988.

Ito et al., "Three approaches to improving performance of liquid chromatography using contour maps with pressure, time, and No. of theoretical plates", Journal of Chromatography A 1637, 2021 (10 pages).

Bristow et al., "Standardization of Test Conditions for High Performance Liquid Chromatography Columns", Chromatographia, vol. 10, No. 6, Jun. 1977 (11 pages).

Knox et al., "Kinetic Conditions for Optimum Speed and Resolution in col. Chromatography", Journal of Chromatographic Science, vol. 7, Oct. 1969 (9 pages).

H. Poppe, "Some reflections on speed and efficiency of modern chromatographic methods", Journal of Chromatography A 778, 1997 (19 pages).

Desmet et al., "Geometry-Independent Plate Height Representation Methods for the Direct Comparison of the Kinetic Performance of LC Supports with a Different Size or Morphology", Analytical Chemistry, vol. 77, No. 13, Jul. 1, 2005 (13 pages).

\* cited by examiner

CONTOUR DIAGRAM IN WHICH BOTTOM
PLANE IS LOGARITHMIC AXIS

CONTOUR DIAGRAM OF
ANTILOGARITHM AXIS

EXAMPLE OF CROSS-SECTIONAL VIEW

ALL LOGARITHMIC TYPE 3D GRAPH OF COLUMN WITH PARTICLE SIZE OF 2μm

LIQUID CHROMATOGRAPHY DATA PROCESSING DEVICE, AND LIQUID CHROMATOGRAPHY DEVICE

This application claims the benefit of Japanese Patent Application No. 2020-160100, filed Sep. 24, 2020 and Japanese Patent Application No. 2021-098964 filed Jun. 14, 2021, each of which are hereby incorporated by references in its entirety into this application.

BACKGROUND OF THE INVENTION

Field of the Invention

The present invention relates to a chromatography data processing device, and particularly, to a quantitative visualization analysis device that searches for separation conditions for liquid chromatography.

Description of Related Art

First, Patent Document 1 has the basis for understanding the relationship between the analysis time and the separation performance in HPLC. In Patent Document 1, according to an expression of a flow constant Cf, the same variable as a velocity-length product $\Pi(m^2/s)$ of (Equation 1) is introduced.

$$\Pi \equiv \frac{K_V \Delta P}{\eta} = u_0 L \quad \text{[Equation 1]}$$

Here, $K_V(m^2)$ is a column permeability (column liquid permeability), and $\eta(Pa \cdot s)$ is a viscosity. The pressure loss $\Delta P$ is simply $\Pi$ with $K_V$ and $\eta$ as proportional factors. In the present invention, for convenience, in order to remove the secondary factors of $K_V$ and $\eta$, the $\Pi$ term is essentially treated as a variable rather than $\Delta P$. $\Pi$ is also called a pressure-driven strength. $u_0$ (m/s) in (Equation 1) is a linear velocity of a non-retained component, and L(m) is a column length, which are important variables on a par with $\Pi$ as will be described below.

Next, in Patent Document 1, a so-called kinetic plot analysis (KPA) method is used, and a theoretical number of plates N is used as an index of separation performance, and a hold up time $t_0(s)$ is used as an index of a speed. $t_0$ has a role of a basic unit that forms the retention time $t_R$. In the present invention, the discussion will proceed with the retention coefficient k of each component fixed. Therefore, a stationary phase (a column filler, a particle size, etc.), a mobile phase (an eluent composition), a solute (an analyte component), and a column temperature are fixed, and an isocratic elution is assumed. FIGS. 1 to 3 are all based on the results measured under the same separation conditions (the stationary phase is a C18 silica fully porous filler with a particle size of 2 µm, the mobile phase is a 60% aqueous acetonitrile solution, the column temperature is 40° C., and the sample solute is butyl benzoate). When these separation conditions change, separate corresponding theoretical models will be used. In addition, in the present invention, the KPA method is also referred to as a kinetic performance limit (KPL) method as described in Patent Document 2.

In Patent Document 1, stacking of $t_0$–N plot planes in layers is devised, and expressing them in a 3D graph is proposed. In this case, the third axis is $\Delta P$, that is, an axis proportional to $\Pi$. In Patent Document 1, the 3D graph $N(\Pi, t_0)$ or $N(\Delta P, t_0)$ referred to in the present invention has been completed.

In Patent Document 2, a problem that $N(\Pi, t_0)$ has no relationship with L or $u_0$ is addressed. A graph shows that coordinates of planes can be transformed from $(\Pi, t_0)$ to $(u_0, L)$. This is called logarithmic rotational transformation (LRT) in consideration of transformation with rotation of the logarithmic coordinate system. A characteristic in which the product of antilogarithms is the sum of logarithms is applied. The base of the logarithm is 10.

In addition, in Patent Document 2, contour diagrams of $N(\Pi, t_0)$ on the antilogarithm axis instead of the logarithmic axis are shown (FIG. 2). There is a KPL curved surface that has a hilly landscape shape expressed in a 3D space. Based on the slope of the hilly landscape, the coefficients are defined as two types: a pressure-application coefficient (PAC) and a time-extension coefficient (TEC). Since the space is three-dimensional, a total of three types of coefficients related to the slope can be defined. Each coefficient is normalized with the slope of an Opt. method operating at an optimal linear velocity $u_{0,opt}$ as one reference. When three types of coefficients are introduced, the efficiency of each point on the KPL curved surface can be measured by the slope of a desired performance for each applied variable.

Patent Documents

[Patent Document 1] WO2014/030537
[Patent Document 2] Japanese Unexamined Patent Publication No. 2019-90813

Non-Patent Documents

[Non-Patent Document 1] M. Ito, K. Shimizu, and K. Nakatani, Anal. Sci., 34, 137-142 (2018).
[Non-Patent Document 2] Stephen G. Weber, et al., Anal. Chem., 88, 11742-11749 (2016).
[Non-Patent Document 3] Firoz D. Antia and Csaba Horvath, J. Chromatogr., 435, 1-15 (1988).
[Non-Patent Document 4] Ito, M; Shimizu, K.; Nakatani, K. J. Chromatogr., 1637 (2021), https://doi.org/10.1016/j.chroma.2020.461778.
[Non-Patent Document 5] Bristow, P. A., Knox, Chromatographia 10, 279-289 (1977).
[Non-Patent Document 6] J. H. Knox and M. Saleem, J. Chromatogr. Sci. 7, 614-622 (1969).
[Non-Patent Document 7] H. Poppe, J. Chromatogr. 778, 3-21 (1997).
[Non-Patent Document 8] G. Desmet, D. Clicq, P. Gzil, Anal. Chem. 77, 4058-4070 (2005).

SUMMARY OF THE INVENTION

So far, N has been treated as a consequential characteristic to be imparted, and for example, it has not been argued that the theoretical stage equivalent height H be improved by reducing a particle size of a column filler. In addition, the above $K_V$ is also related to the particle size. An objective of the present invention is to provide a display method and a liquid chromatography data processing device in which, when N is positioned as a result (effect), it is easy for a user to see its action at a glance by clarifying causes and effects thereof. In other words, in Patent Document 2, there is a limit due to the fact that the z-axis is represented only by N, but the main objective of the present invention is to visualize the degree of influence from H beyond the limit.

The next objective begins with the assumption that, first, N does not decrease along the high flow velocity $u_0$ as an ideal case. When the C term of a so-called van Deemter equation (Equation 8) is zero, H can be regarded as almost constant, and the curve of N($\Pi$, $t_0$) drawn under conditions with a constant L is almost the same as an equal-height curve. However, actually, since N is considerably lowered due to the C term, it is not immediately possible to imagine how much N will decrease and how much the C term will influence to by simply looking at the van Deemter plot of H vs $u_0$. The present application also provides a display method in which a user can intuitively understand this relationship.

For example, in FIG. 2, a state in which the contours with N=10,000 plates and the N curve obtained under a certain condition of L=70 mm deviate from each other as $\Pi$ increases is visible. In this background, in order to increase $\Pi$ with a constant L, $u_0$ needs to be increased, but when it is increased, H gradually increases under the influence of the above C term, and as a result, N decreases. However, this relationship cannot be intuitively understood simply by looking at FIG. 2. Another objective of the present invention is not only visualization of H but also visualization of the degree of influence of the C term, in addition to the overlay method as shown in FIG. 2.

In order to achieve the above objective, the present invention provides a liquid chromatography data processing device which generates, based on data regarding analysis conditions of a chromatography device and separation performance, display data that displays a graph showing correspondence of the data regarding analysis conditions of the chromatography device and separation performance, generating a first group of biaxial data regarding the analysis conditions, a second group of biaxial data obtained by calculations, comprising multiplication and/or division of two data of the first group of biaxial data and display data according to a graph showing correspondence of data regarding the separation performance, wherein at least each axis of the first group of biaxial data and the second group of biaxial data is represented as a logarithmic axis.

Accordingly, it is possible to easily to determine the relationship between the data regarding analysis conditions of the chromatography device and separation performance, and it is possible to easily obtain analysis conditions according to user intent.

According to the present invention, it is possible to easily determine the relationship between the data regarding analysis conditions of the chromatography device and separation performance such as analysis conditions of the chromatography device and it is possible to easily obtain analysis conditions according to user intent.

DETAILED DESCRIPTION OF THE INVENTION

Figure 1:
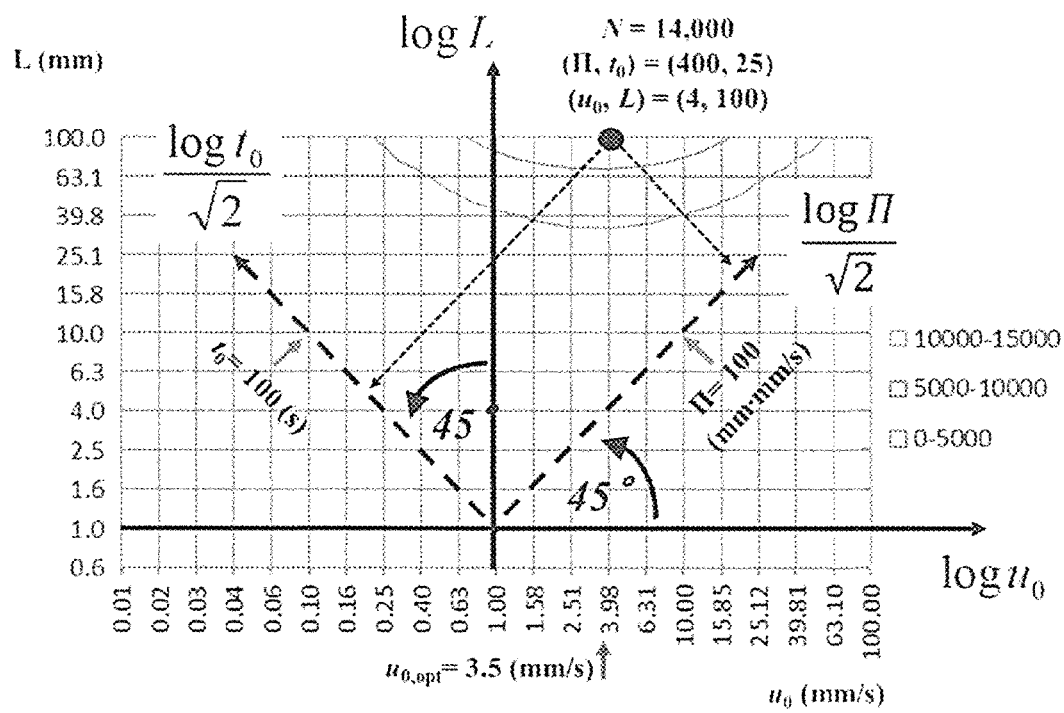
FIG. 1 is a contour diagram in which the bottom plane is the logarithmic axis.

First, the premise outline will be described.
In FIG. 1, for example, when looking at the intersection of $u_0$=10 mm/s and L=10 mm, 100 mm·mm/s can be read on the $\Pi$ axis. Since the $\Pi$ axis is a logarithmic axis, this corresponds to the product of $u_0$ and L. In addition, there is another feature in which the length of the axis is reduced by a factor of $1/\sqrt{2}$. When the bar is viewed obliquely it looks short, but to use a metaphor, this corresponds to scaling a scale in order to measure the length of a bar. Similarly, when the point at the coordinates ($u_0$, L)=(4, 100) is viewed from the axis of the coordinates ($\Pi$, $t_0$), the coordinate point ($\Pi$, $t_0$)=(400, 25) can be read. It can be understood that a first component corresponds to a product of $u_0$ and L, and a second component corresponds to a quotient of $u_0$ and L. This is a clear feature of LRT in which the same hilly landscape can be read by changing significances of coordinate planes due to the difference in axes.

In addition, in the present invention, instead of H, a theoretical number of plates N/m per meter in which the numerical value is higher when the column has better separation performance is newly used. However, although this notation is general, N is dimensionless and is not an inherent physical quantity having a length dimension. Therefore, in the present invention, N/m is redefined as a theoretical number of plates n (lower case N) per unit length. That is, it is a reciprocal of H (Equation 2).

$$n(u_0) \equiv \frac{1}{H(u_0)} = \frac{N}{L} \quad \text{[Equation 2]}$$

$$N = nL$$

n is a physical quantity having a unit of (1/m) or (1/mm) and having a dimension of a reciprocal of a length, and has large the better characteristics Like $u_0$ and L, n used in the present invention serves as an operation/setting/input variable of a cause system. On the other hand, like $\Pi$ and $t_0$, N is an output variable of a result system. N and $t_0$ are variables related to separation and speed, respectively, and can be said to be the result of the performance system. However, it is unnatural to simply call $\Pi$ performance, and in the present invention, it is broadly referred to as a result system variable in consideration of side effects or adverse effects. When a constant flow rate or constant speed $u_0$ pump is used, a pressure loss $\Delta P$ is generated at a column L site with $K_V$ and $\eta$ as proportional constants, and $\Pi$ is the above result proportional to the $\Delta P$.

On the other hand, although $\Pi$ is such a result, there is also an aspect of requiring a driving force with which $u_0$ and L can increase or $\Delta P$ or $\Pi$ as a pressure-driven strength as described above. Therefore, $\Pi$ has a characteristic of one kind of feedback variable that can be both an input variable related to pressure resistance of the column itself, which is a limiting condition, and maximum pressure performance of the (U) HPLC system, and an output variable as the adverse effect as described above.

One objective of the present invention is to allow elegant visualization of three input variables of a cause system and three output variables of a result system, and to provide a graph that a user can systematically easily understand and form an impression of at the same time. That is, there is a display analysis device in which it is possible to instantly determine the influence and restriction relationship of six variables when searching for separation conditions.

Figure 2:
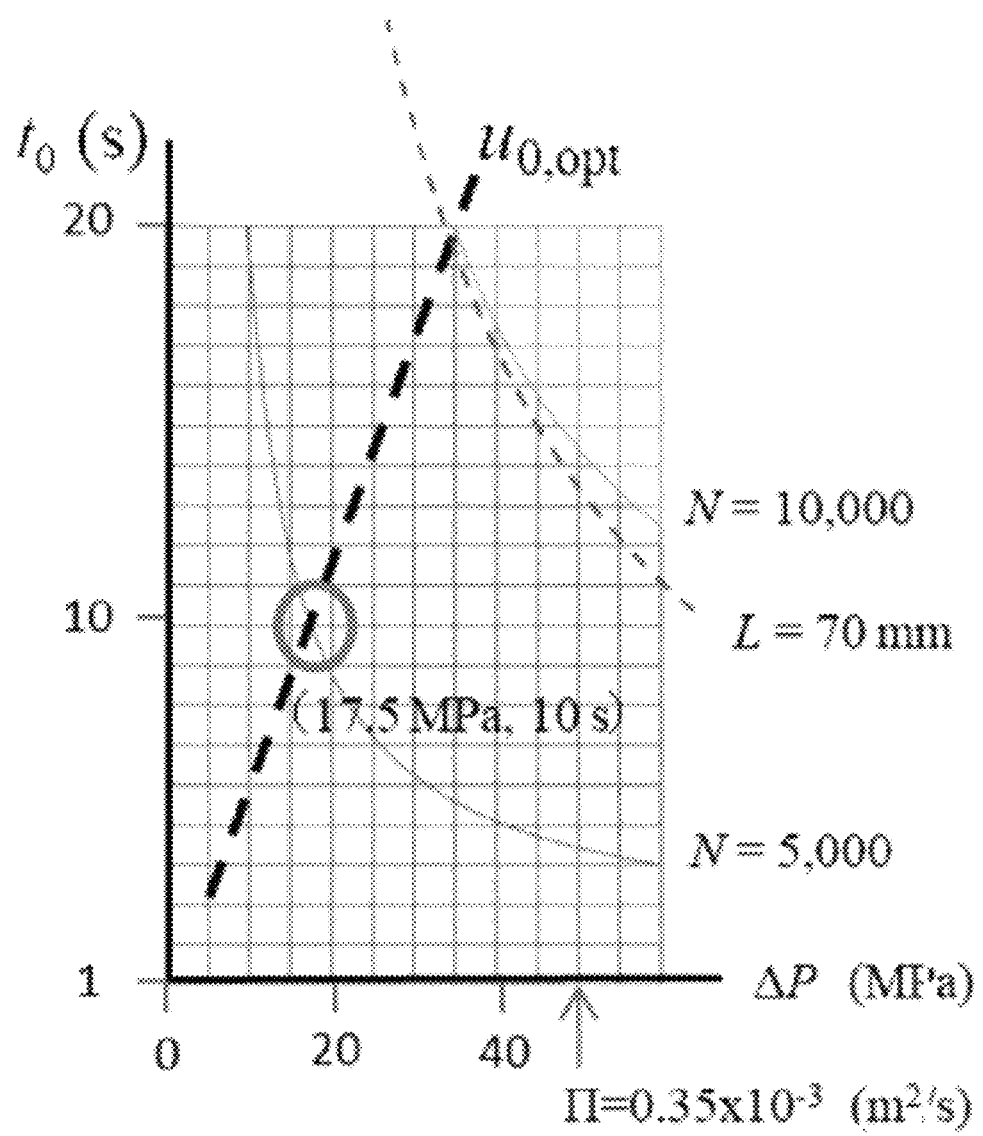
FIG. 2 is a contour diagram of the antilogarithm axis.

In addition, in order to intuitively represent the influence of the above C term, a liquid chromatography data processing device of the present invention overlays curves with a constant L on a contour diagram. According to this overlay, it is possible to show an image in which the curve with a constant L deviates from the N constant curve, that is, the contour. (FIG. 2). In addition, according to preference, this can be displayed in a 3D graph including three axes.

Figure 3:
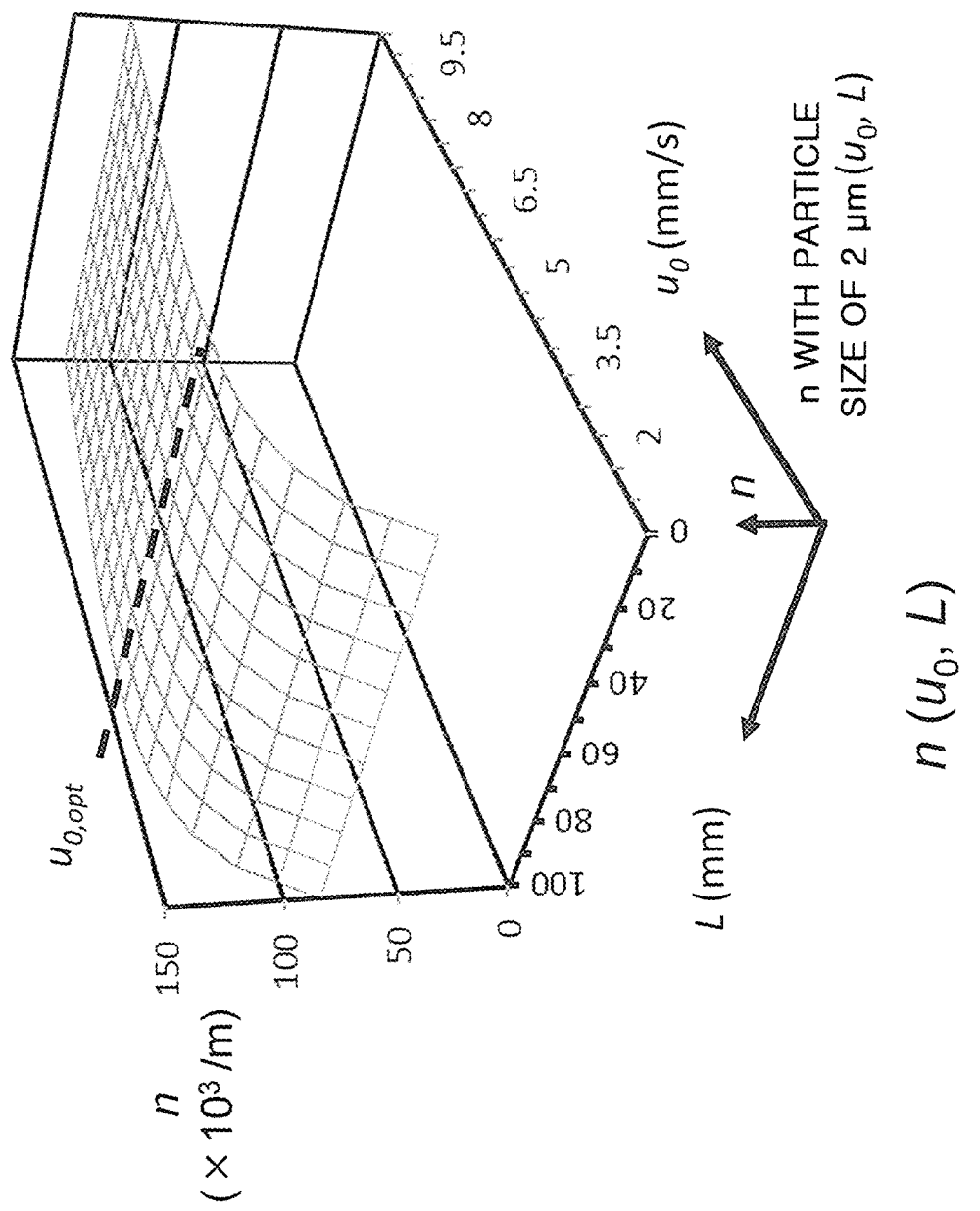
FIG. 3 is a diagram showing n($u_0$, L).

$n(u_0)$ is a function of $u_0$, like $H(u_0)$. The maximum value $n_{max}$ can be obtained with $u_{0,opt}$ in (Equation 19). The graph is 2D n vs $u_0$. An L-axis is added as a third linear axis orthogonal to the 2D plane of the Cartesian coordinate system with a right hand rule to form a 3D graph. Here, in order to be consistent with Patent Document 2, the order of axes x, y, and z is rearranged in the order of $u_0$, L, and $n(u_0)$. These three variables are newly displayed on the logarithmic axis and used as unit vectors, so called basis vectors, that generate a 3D graph. Hereinafter, an xyz type 3D graph is shown using basis vectors x, y, and z. For example, it is shown as an uLn type or MN type. All are abbreviated to one letter, $u_0$ is abbreviated to u, and $t_0$ is abbreviated to t. All logarithms or bottom plane logarithms are added as modifiers, and are expressed as a bottom plane logarithm uLN type contour diagram. Since $n(u_0)$ does not depend on L, the n vs $u_0$ plane is the same along L, that is, the sheet-like curved surface is continuously constant in the inward L direction (FIG. 3). Hereinafter, this sheet-like curved surface is referred to as an n membrane. Indeed, the starting point of the present invention is such an image. Since L is an axis that is simply mathematically added, it can be said that truly necessary data is only 2D data of $n(u_0)$. However, due to design related to extension of 2D data to a 3D graph, all other necessary variables can be obtained simply by transformation, projection, or cross section display. The fact that a required graph associated with the transformation and the like can also be visually displayed will be described below. In other words, 2D data is inherently sufficient, but by extending to a 3D space using L and displaying all with logarithms, the interrelationships between various characteristic variables can be visualized. It is useful to logarithmically display all variables as new terms. The display method of the present invention includes coordinate system transformation or projection to a unit vector dedicated for measurement. The above LRT is one kind of logarithmic coordinate transformation (LCT), and in the present invention, LCT is used as a superordinate concept. In addition, when it is desired to clearly show orthogonal projection, this method can also be called logarithmically orthogonal projection (LOP). In the orthogonal projection, the magnitude of a target vector can be measured by its inner product with a specific unit vector. In addition, when the coordinate system that rotates is intentionally expressed, it is abbreviated as a logarithmically rotating coordinate system (LRCS) or simply LRC. For example, in the case of an all logarithmic uLN type 3D graph, by grabbing and rotating the N-axis, the bottom plane coordinate system of L-u is rotated as a whole. As a feature of the present invention, a logarithmic axis is used to easily calculate a product or quotient between physical quantity variables.

To summarize methods that can be applied to the present invention, (1) n is introduced, and targets are six variables, (2) all variables are logarithmically displayed, and (3) the influence relationship and limiting conditions of variable groups are visualized in a 3D graph including contour diagrams and cross section displays, coordinate transformation, and orthogonal projection.

The present invention can provide a method, an analysis device, and the like that trace back to three causative variables ($u_0$, L, n) that should be found as separation conditions in order to obtain a 3D graph ($\Pi$, $t_0$, N) that displays the results that the user demands for performance. The lower case N (n) is defined as a reciprocal of H as a variable having a large the better characteristics. The basis for realizing this effect is that, with LRT coordinate transformation from ($\Pi$, $t_0$) of the bottom plane coordinates (x, y) to ($u_0$, L) as a starting point of an idea, when N is also logarithmically displayed, $n(u_0)$, which is a variable of the cause system, appears as a cross section of the logarithmic 3D graph.

In addition, focusing on the fact that the LRT transformation is logarithmic, and again is based on orthogonal projection to a specific unit vector, it is also widely called an LOP method. Once reconsidered as the LOP method, it can also be applied to an operation for measuring other variables. Based on such mathematical background, the present invention exhibits the effect of visualization while showing various 3D graph display methods including contour diagrams as examples.

[Orthogonal Projection from uLn Type to N]

One embodiment of the present invention is shown. In order to obtain N from the cause and input system 3D graph, first, all $u_0$, L, and $n(u_0)$ variables are converted from antilogarithms to logarithms, and then, first, a 3D coordinate system (log $u_0$, log L, log n) is displayed with respective basis vectors. For example, if $u_0=u_{0,opt}$ is fixed, 2D coordinates (log L, log n), which are the cross section, can be focused on.

$N=nL=Ln$ log $N$=log $L$+log $n$ log $N$=$\sqrt{2}$(cos 45° log $L$+sin 45" log $n$) [Equation 3]

It can be understood from this equation (Equation 3) that log N is a mixture of the log L component and the log n component at certain weights. The sum of squares of weights is normalized to 1. When the basis vectors $e_1=(1, 0)$ and $e_2=(0, 1)$ of log L and log n are arranged orthogonally, the unit vector (log N)/$\sqrt{2}$ is rotated in the direction from log L to 45° log n, that is, converted to $e_3=(1/\sqrt{2}, 1/\sqrt{2})$ (FIG. 4a). This is a dedicated unit vector that can measure (log N)/$\sqrt{2}$. In other words, the length of the scale log N is divided by $\sqrt{2}$ for scaling, and the scale is finely divided, and thus the magnitude of the vector when viewed in the log n–log L coordinate system is normalized to 1. The same applies to the relationship of the log Π axis with respect to the log L–log $u_0$ bottom plane coordinate in FIG. 1, including the scaling factor of the axis.

Figure 4:
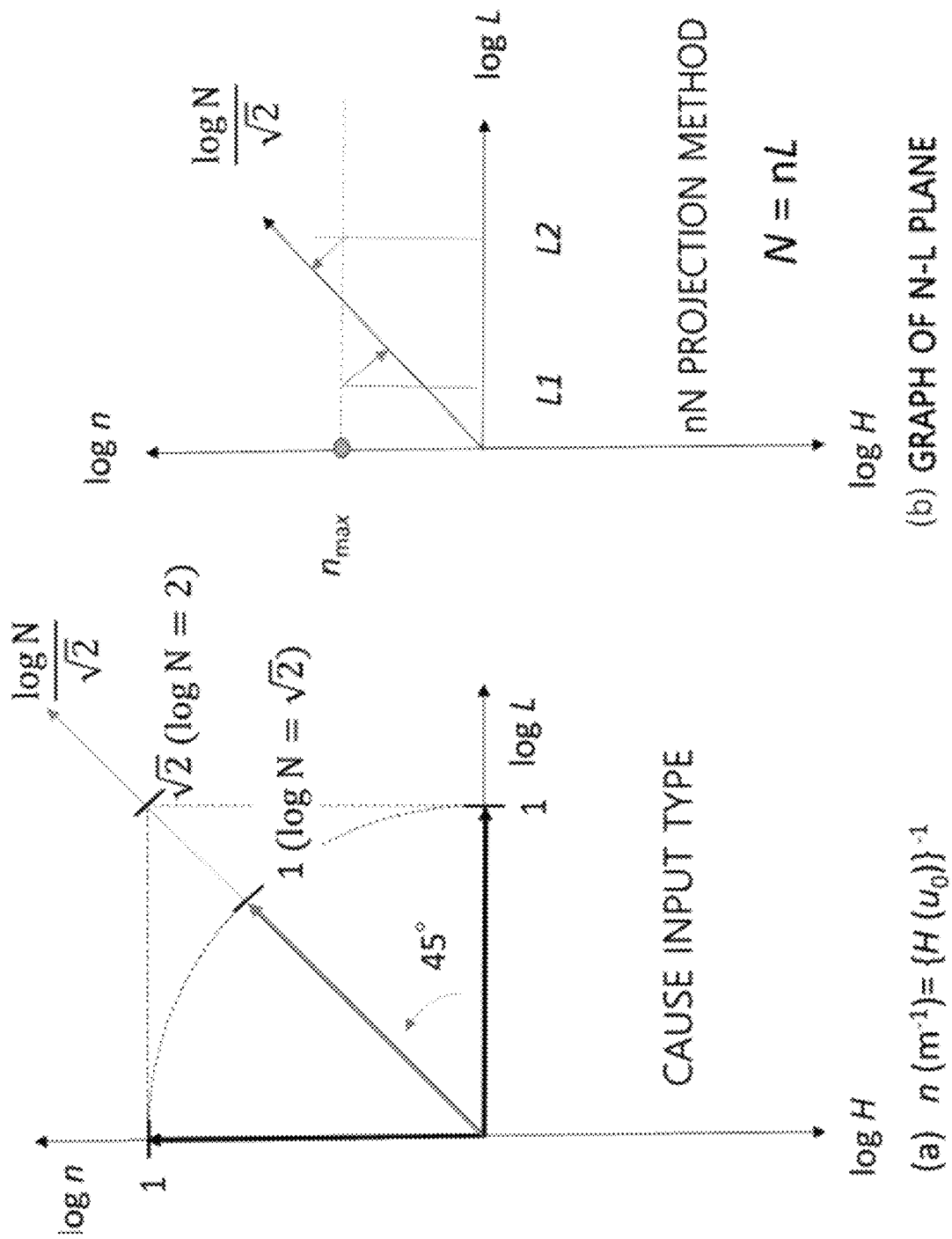
FIGS. 4(a) and 4(b) show a graph of the N–L plane.

Here, in FIG. 4, log H is also drawn in the negative direction of log n because H is a reciprocal of n.

If $u_0=u_{0,opt}$, n is always constant at $n_{max}$ regardless of whether L is L1 or L2. Focusing on L1, since it is still $n_{max}$, when projected onto a unit vector (log N)/$\sqrt{2}$, it exactly corresponds to a product of L1 and $n_{max}$. Similarly, for L2, in the orthogonal projection, the product of L2 and $n_{max}$ corresponds to an inner product of (log N)/$\sqrt{2}$ with a unit vector (FIG. 4b).

When a 3D graph of the cause system is generated, the 2D graph plane of $u_0=u_{0,opt}$ is not limited to the $u_{0,opt}$ plane, and other $u_0$ planes can be stacked along the $u_0$ axis. The log $u_0$ axis of the straight line is made orthogonal to the origin of the 2D plane in FIG. 4 and extends frontward. Using the function $n(u_0)$, stacking is preformed while gradually changing the n value from the back to front in FIG. 4. Stacking is similarly performed in the inward direction. Then, a 3D graph of logarithm coordinates (log $u_0$, log L, log n) is formed. This is a logarithmic expression of each axis in FIG. 3. In this logarithm coordinate system (log $u_0$, log L, log n), as a convention, all three axes are orthogonal. For the curve function $n(u_0)$, a sheet-like n membrane is formed by stretching the same curve along the L-axis. This is because, regardless of which L is cut, the cross section (log $u_0$, log n) is the same curve $n(u_0)$ that is convex upward, but when viewed in the 3D space, it is a continuous $n(u_0)$ membrane that is convex upward.

When the $n(u_0)$ membrane is present in this 3D graph, a unit vector dedicated to log N tilted 45° is formed in the (log L, log n) plane. A scaling factor multiplied by log N is 1/$\sqrt{2}$ as described above. However, it should be noted that this unit vector does not form an oblique coordinate system because it is not a basis vector that indicates coordinates. The purpose of tilting is to obtain a product of L and n, and to mix the component L in the plane and n at certain weights. In a measurement method, orthogonal projection is simply performed on a scale unit vector (log N)/$\sqrt{2}$, and the original cause system coordinates (log $u_0$, log L, log n) are simply used for the 3D space. With the 3D space and the $n(u_0)$ membrane without change, when the tilted unit vector (log N)/$\sqrt{2}$ is simply arranged, and orthogonal projection is performed, log N can be read from the original coordinate system (log $u_0$, log L, log n).

[Orthogonal Projection from uLN Type to n]

Similarly, the unit vector n can be found from the orthogonal coordinate system of ($u_0$, L, N) using the inverse projection relationship.

$$\log n = -\log L + \log N$$

$$\log n = \sqrt{2}(-\sin 45' \log L + \cos 45° \log N) \qquad \text{[Equation 4]}$$

Figure 5:
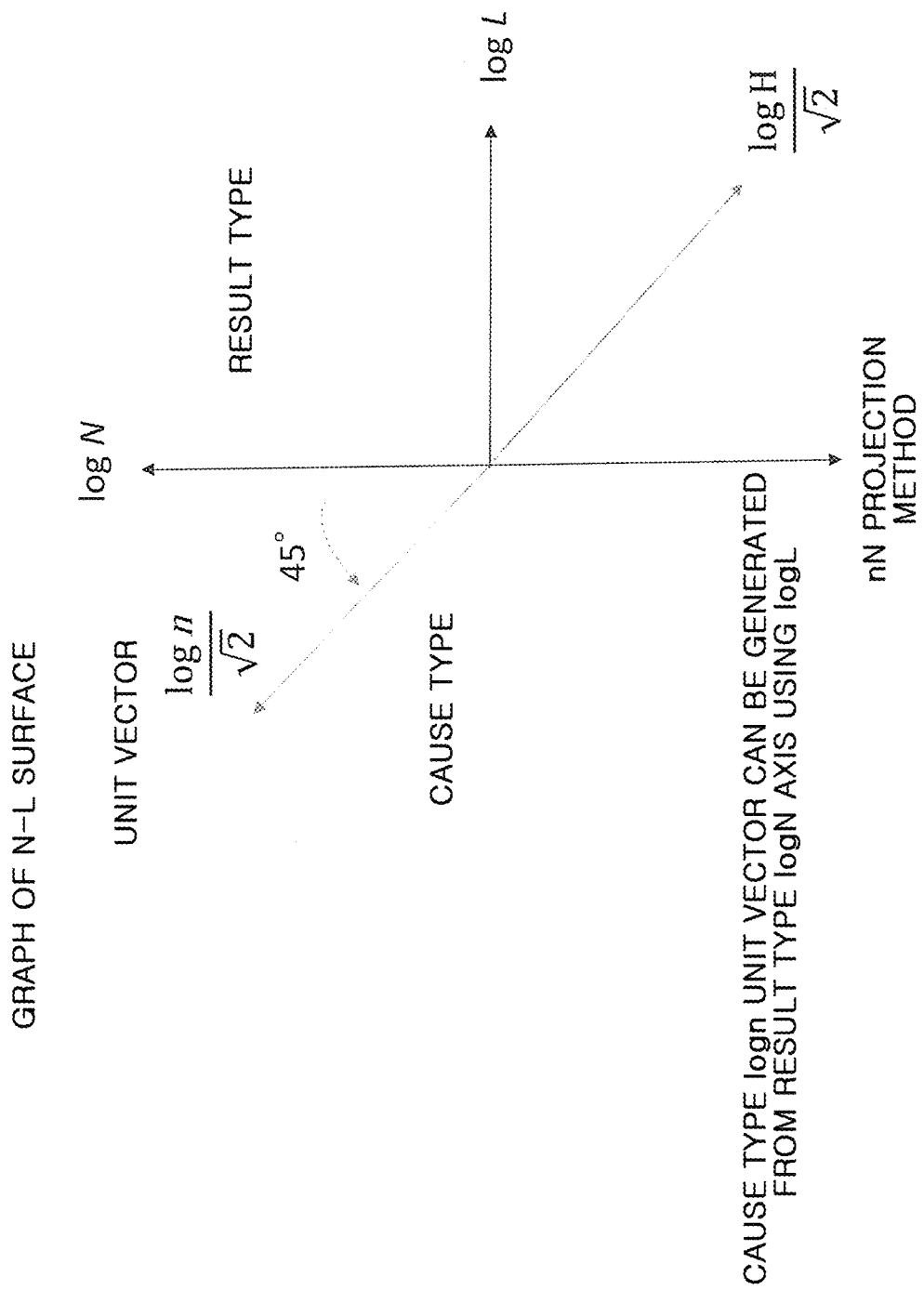
FIG. 5 is a diagram illustrating an nN projection method.

According to this transformation in the log N–log L plane, the unit vector (log n)/$\sqrt{2}$ can be found in the direction opposite to the log L-axis direction from the log N axis, that is, rotated 45° counterclockwise when viewed from the front side (FIG. 5). This is exactly the same as the relationship in which the log $t_0$ axis with respect to the log L–log $u_0$ bottom plane coordinate in FIG. 1 is a logarithm of a quotient of L and $u_0$.

Thus, it is possible to display both the coordinate systems ($u_0$, L, n) and ($u_0$, L, N) using orthogonal projection. Therefore, the same $n(u_0)$ membrane can be displayed in different coordinate systems. The coordinates ($u_0$, L, n) are the cause input system, and in the later z-axis, only N is the variable of the result output system. As described in Patent Document 2, since the coordinate system ($u_0$, L, z) can perform logarithmic coordinate transformation of LRT to the coordinate system (Π, $t_0$, z), when the log N<–>log n orthogonal projection method (hereinafter referred to as nN projection: lower case N large N projection method) of the present invention is used together, the cause input system coordinates ($u_0$, L, n) can easily transition to the result output system coordinates (Π, $t_0$, N). As described above, this transition method is an extended LRT from the cause input system two-variable function $n(u_0, L)$ to the result output system two-variable function $N(\Pi, t_0)$. It is called an expanded LRT or eLRT in order to emphasize that it is an extended version of LRT.

Based on the operation of adding log L to log n, the reason why nN is projected on the log N axis corresponding to the product thereof will be explained. It is not impossible to express it on the antilogarithm axis instead of the logarithmic axis. An orthogonal 2D plane graph with N on the vertical axis and L on the horizontal axis is drawn, and N can be displayed as a proportional linear function of L. This straight line passes through the origin. In this case, n corresponds to the slope of the straight line. This slope is a first-order differential coefficient, and is graphically represented as a rate of change or a rate.

However, if the rate remains the same, it is difficult to perform projection for scaling. Therefore, by displaying it on the logarithmic axis, n can be measured not as a rate but as a numerical value.

There is another reason. In the present application, the graph is displayed on the logarithmic axis as a whole. Since L is already displayed as a logarithm log L in the graph, it is better to display related variable groups in logarithms uniformly.

[Transition from Cause Input System Coordinates ($u_0$, L, n) to Result Output System Coordinates (Π, $t_0$, N)]

Figure 6:
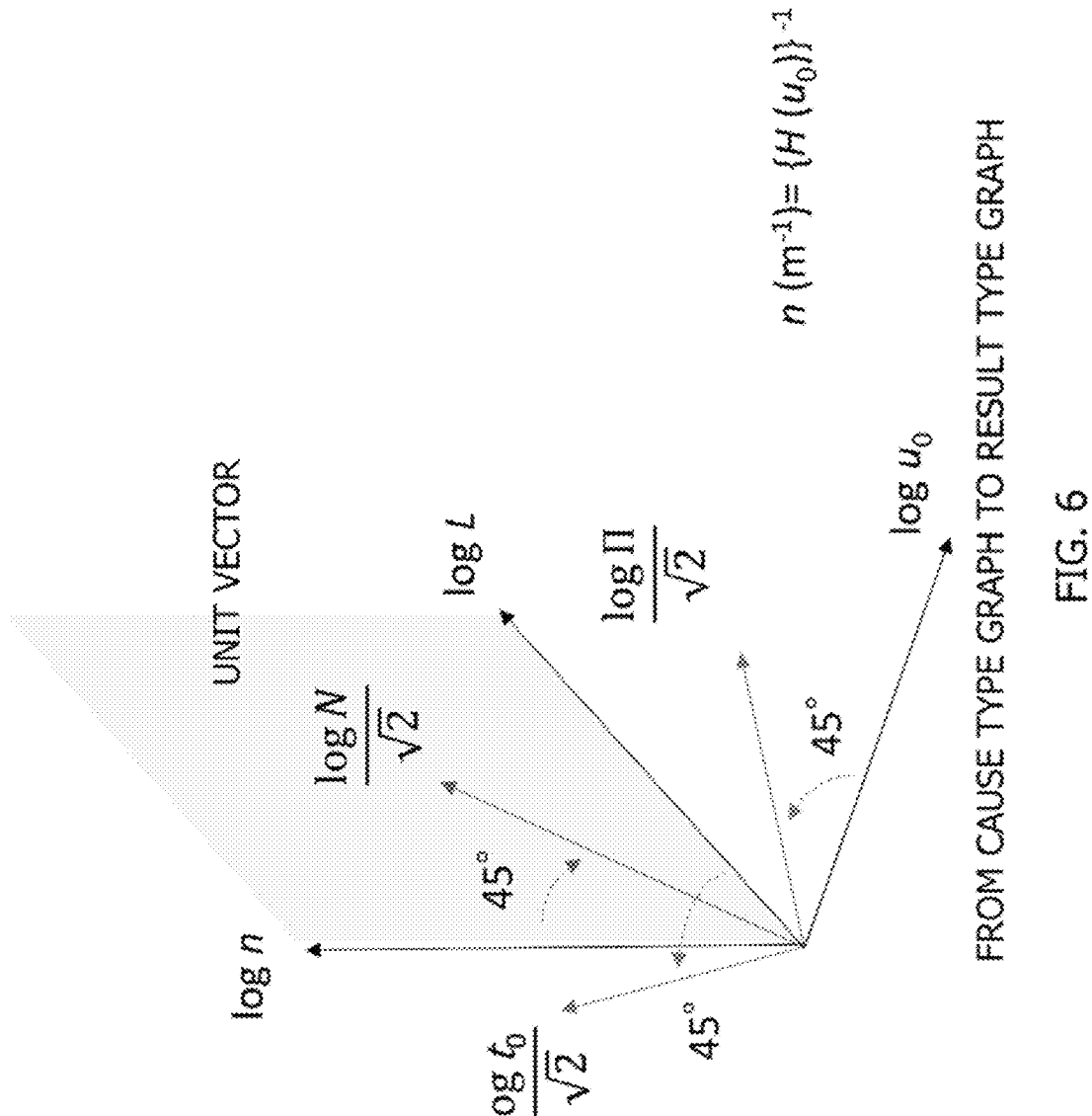
FIG. 6 is a diagram illustrating a method of transforming a cause type graph to a result type graph.

FIG. 6 shows a diagram of a transition from the cause input system coordinates ($u_0$, L, n) to the result output system coordinates (Π, $t_0$, N). First, the unit vector (log N)/$\sqrt{2}$ is generated in the plane including the log n axis and the log L-axis. Next, the (log Π)/$\sqrt{2}$ axis and the (log $t_0$)/$\sqrt{2}$ axis are generated by logarithmic coordinate transformation in the bottom plane including the log $u_0$ axis and the log L-axis. As a result, three logarithmic variables, which are components of the result output system coordinates (Π, $t_0$, N), can be read from the cause input system 3D graph (FIG. 6).

[n in all Logarithmic uLN Type 3D Graph]

Figure 7:
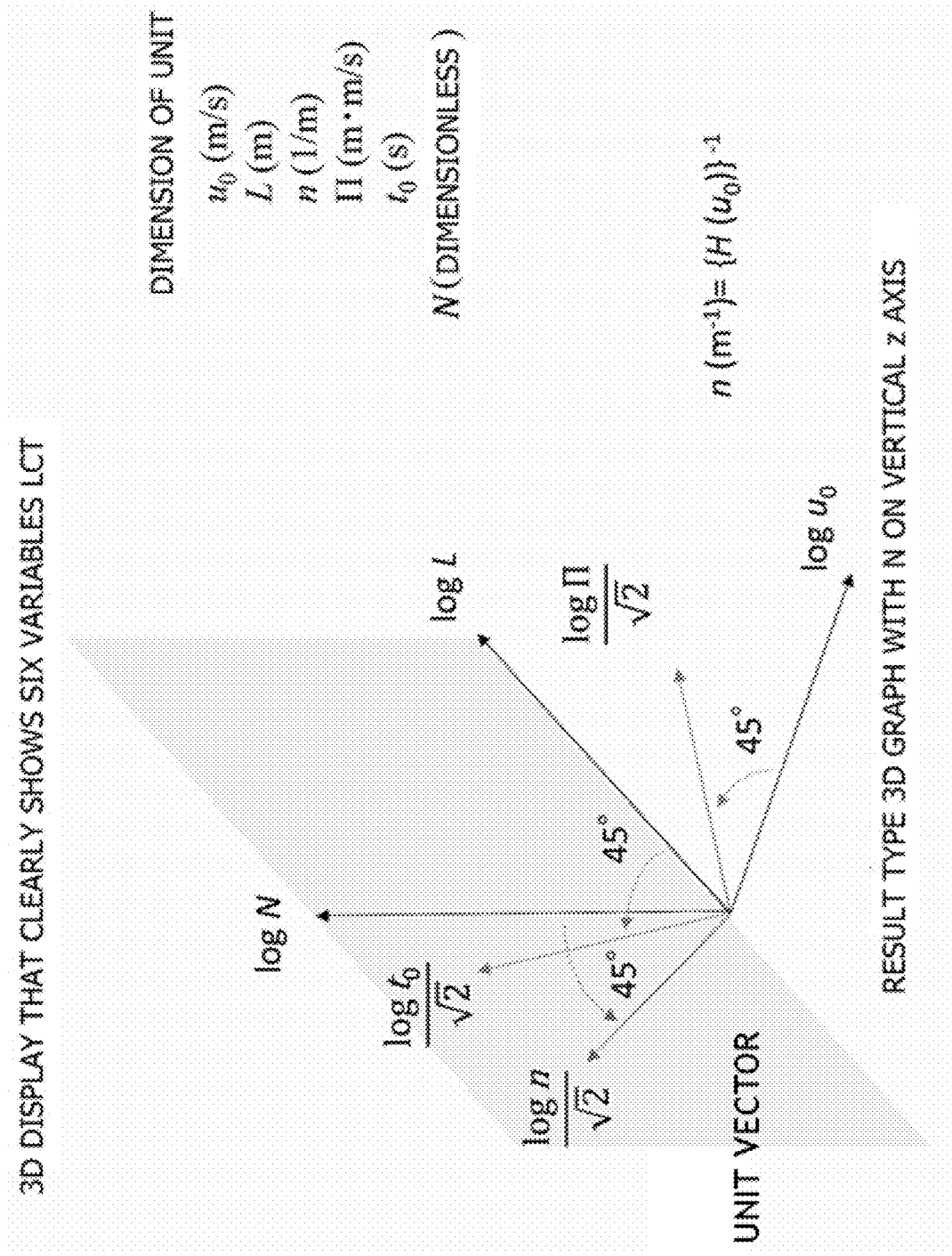
FIG. 7 is a diagram showing a result type 3D graph in which the vertical z-axis is N.

FIG. 7 is a 3D graph in which the vertical z-axis is the result type log N axis. This is the case in which the so-called basis vector is log N. When this state is drawn, all three components shown in FIG. 1 correspond to the contour diagram with the result type logarithmic axis. Coordinates of the bottom plane can be bidirectionally transformed from the logarithm coordinates ($u_0$, L) to the logarithm coordinates (n, $t_0$) according to the LRT relationship. If the vertical z-axis is the result type, it should be the log N axis. In this case, the unit vector (log n)/$\sqrt{2}$ can be arranged in the same space by the nN projection method, and is tilted 45° in the plane including log L and log N. The cause is found in that n. Since $u_0$ is constant in the log L–log N plane, log n is fixed. If log L is 0, that is, L=1 m, n($u_0$) is drawn on the $u_0$ axis. It can be understood that n($u_0$) is an intercept of log L=0. Here, it is possible to change the length unit of L from m to mm so that log L=0.

The advantage of modeling the vertical z-axis with log N is that log n is manifested as an intercept. That is, the variable n can be displayed on the result type 3D graph. Since N is proportional to L, that is, the exponent is 1, the slope is simply 1 if it is displayed on both log–log axes of log N and log L. Incidentally, if it is squared, it is an exponent with a slope of 2. The quality of n is expressed as a height of the cliff of the upwardly convex cross section function log n ($u_0$), which is the intercept of the log N axis obtained by log L=0.

In the cause system 3D coordinates (log $u_0$, log L, log n), log N is found as a unit vector at an angle of 45° by the nN projection method, but it turns out that new axis coordinates (log $u_0$, log L, log N) with log N as one basis vector are very convenient just like standing the mast of a sailing ship vertically. For example, this is because (1) log n($u_0$) looks like a cut cross section of log L=0 as an intercept function, and (2) it is easy to shift the eyes to the result system 3D coordinates (log Π, log $t_0$, log N) by LRT transformation. This new axis coordinate system is called an all logarithmic uLN type 3D graph.

The reason why log N of the z-axis is also logarithmic is that log n($u_0$) is viewed as an intercept function of log L=0 in the first place. (1) The starting point of the present invention is to clearly show the n membrane. (2) By displaying in uLN type 3D coordinates (log $u_0$, log L, log N), the n membrane becomes a slope of log N that climbs the log L-axis with an exponent of 1. (3) According to LRT transformation, the slope is visible on the log Π axis and the log $t_0$ axis. (4) When searching for separation conditions, $t_0$ is understood as a normal time. (5) When looking ahead at the limiting condition ΔP, log Π is added or subtracted by log $K_V$ and log η.

Figure 12:
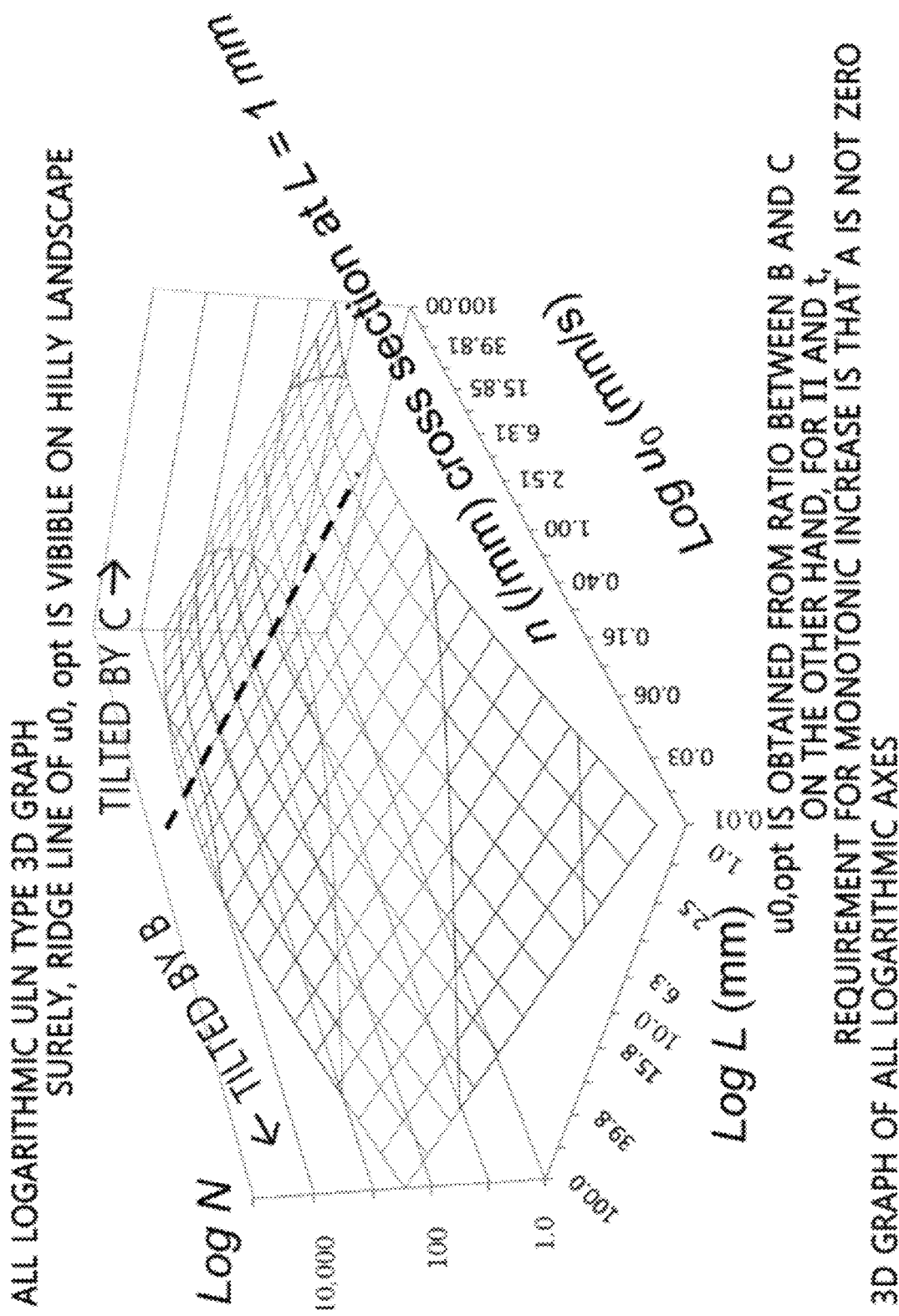
FIG. 12 is a diagram showing a 3D graph of all logarithmic axes.

As described above, the n membrane is the starting point, and log N of the z-axis climbs with an exponent of 1 along the log L-axis. In this visualized image, since characteristics of the column filler are only reflected in the function of log n, any filler simply exhibits a slope of 45° along the log L-axis (FIG. 12). On the other hand, for the log Π axis, the exponent is at most ½ because the slope climbs in the direction opposite to the flow line of downhill. This is a synergistic effect of the scaling scale factor 1/$\sqrt{2}$ of the log Π axis and the exponential contribution of log Π to log N when climbing downhill, which is at most 1/$\sqrt{2}$, and the exponent is at most ½. The exponent of the log L axis is exactly 1, but the exponent of log Π is at most ½. This is because the hilly landscape of log N is not a flat surface but a curved surface generated from the function n($u_0$) with $u_0$. Similarly, the exponent of log $t_0$ for log N is also at most ½.

Here, first, an overview will be given of the relationship between physical entities and mathematical expressions. First, the 3D space is displayed in the coordinate system of three basis vectors (log $u_0$, log L, log N) (FIG. 12). Orthogonal straight line coordinates are used for simplicity. Three axes are independent unit vectors. Since the physical entity n can be represented as a function n($u_0$) with $u_0$, n and $u_0$ are dependent. Therefore, it exists in the 3D space with 2D degrees of freedom and is called an n membrane. Actually, the n membrane tilts at a slope of 1 along the log L-axis in the space. It is displayed as a log N curved surface tilted in the 3D space (log $u_0$, log L, log N). The curved surface N is tilted 45° in the (log N, log L) plane with any log $u_0$.

The LRT shown in Patent Document 2 is the origin of the invention. Coordinates of the orthogonal 2D bottom planes of $u_0$ and L can be transformed to the 2D bottom planes Π and $t_0$ that are also orthogonal, according to LRT. However, there is a logarithmic axis, and a scaling factor of 1/$\sqrt{2}$.

Fortunately, in the LRT, since the 2D orthogonal planes of $u_0$ and L can be transformed into 2D orthogonal planes of Π and $t_0$, it is easy to rotate the coordinate system of the bottom plane by changing the axes. It is not necessary to use log N as a basis vector, which is one axis that forcibly stretches the 3D space. When the basis vector log N is used as the axis, it is sufficient if log n can be displayed as a cliff cross section in the graph.

[Application of Logarithm Orthogonal Projection Method LOP]

If it is desired to perform displaying using the result type 3D space (log Π, log $t_0$, log N), display is performed once in a new axis uLN type 3D space (log $u_0$, log L, log N), and only the bottom plane may then be subjected to LRT transformation. log n($u_0$) appears in this uLN type 3D graph as an intercept function of L=0. In any 3D space, the n($u_0$) membrane appears horizontally or tilted as a physical entity. In addition, the desired physical quantity can be measured by arranging a specific unit vector in the 3D space.

Once this physical image, that is, the mathematical structure, is noticed, various visualizations with 3D graphs are possible. In addition, it can be understood that any product and a quotient operation can be replaced with arrangement of a logarithmic measurement unit vector. Exponentiation is also available. Once the relationship between 2D curved membranes in the 3D space is understood, a method of measuring both the plate time $t_P$ and the impedance time $t_E$ by orthogonally projecting the n($u_0$) membrane according to dedicated unit vector arrangement can be conceived.

(a) [Equation 5]

$$t_P = \frac{t_0}{N} = \frac{H(u_0)}{u_0}$$

$$\log t_P = -\log N + \log t_0$$

$$\log t_P = \sqrt{2}(-\sin 45° \log N + \cos 45° \log t_0)$$

(b)

$$t_E = \frac{t_0}{N^2} = \frac{t_P}{N} = \frac{\{H(u_0)\}^2}{u_0 L} = \frac{\{H(u_0)\}^2}{\Pi}$$

$$\log t_E = -2\log N + \log t_0$$

$$\log t_E = \sqrt{5}(-\sin 63.4° \log N + \cos 63.4° \log t_0)$$

Figure 8:
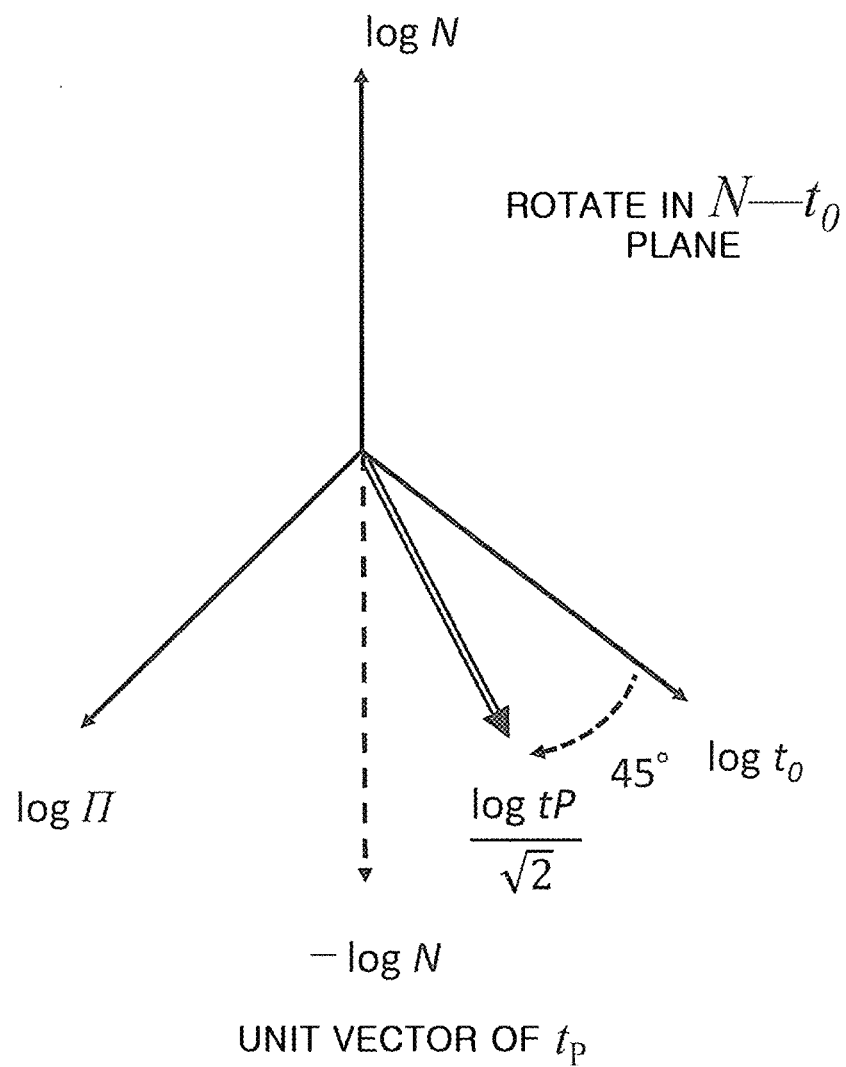
FIG. 8 is a diagram showing a unit vector of $t_P$.

That is, as shown in FIG. 8, from (Equation 5a), log $t_P$ can be regarded as rotation transformation in the plane stretched by log N and log $t_0$. In this case, the scaling factor is 1/($\sqrt{2}$).

Figure 9:
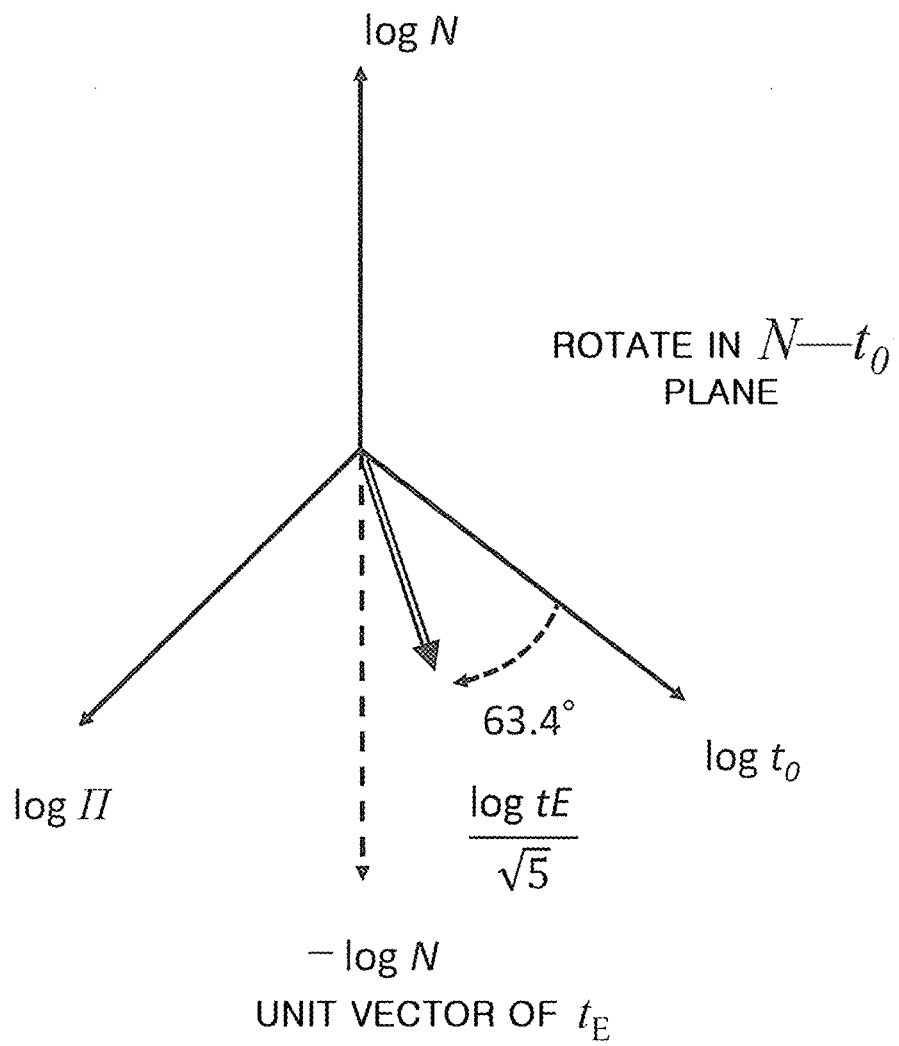
FIG. 9 is a diagram showing a unit vector of $t_E$.

Similarly, as shown in FIG. 9, from (Equation 5b), log $t_E$ can also be regarded as rotation transformation in the plane stretched by log N and log $t_0$. In this case, the scaling factor is 1/($\sqrt{5}$).

In addition, the particle size $d_P$ can be introduced as an orthogonal fourth axis. However, since the space is four-dimensional, it is more difficult to display a graph. $d_P$ is one variable of a two-variable function such as n($u_0$, $d_P$), and also has a relationship with a function $K_V(d_P)$ with a column permeability $K_V$. The particle size framework does not correspond to a monolith column, but if a 5D space is generated with a new $K_V$ axis, a monolith column can be treated with $d_P$ as a fixed value. Alternatively, $d_P$ can be replaced by a certain index corresponding to $d_P$ specific to the monolith column.

When the number of dimensions of the space increases, it is important to pay attention to whether there is a dependency relation. When $d_P$ is added as a fourth axis and a cause system 4D space (log $u_0$, log L, log n, log $d_P$) is generated, since there is a function of n($u_0$, $d_P$), a 3D solid constrained by $d_P$ and $u_0$ floats in the 4D space.

Even if $K_V$ is added to the 5th dimensional axis, since $K_V$ is constrained to $d_P$ by the function $K_V(d_P)$, there are three independent unit vectors in the 5D space (log $u_0$, log L, log n, log $d_P$, log $K_V$), that is, three independent axes (log $u_0$, log L, log $d_P$). Therefore, a 3D object still floats.

To develop this discussion, the pressure loss ΔP is a product or quotient of $K_V$, and the viscosity η (Equation 1), a new 3D space (log Π, log $K_V$, log η) can be generated with these three variables as independent orthogonal logarithmic axes. ΔP can be measured as a variable in which specific unit vectors are arranged, and $K_V$, Π, and η are mixed with a constant mixing angle, that is, a weight.

$$\Delta P = \frac{\eta}{K_V}\Pi \qquad \text{[Equation 6]}$$

$$\log \Delta P = \log \Pi - \log K_V + \log \eta$$

$$\log \Pi = \log \Delta P + \log K_V - \log \eta$$

Figure 10:
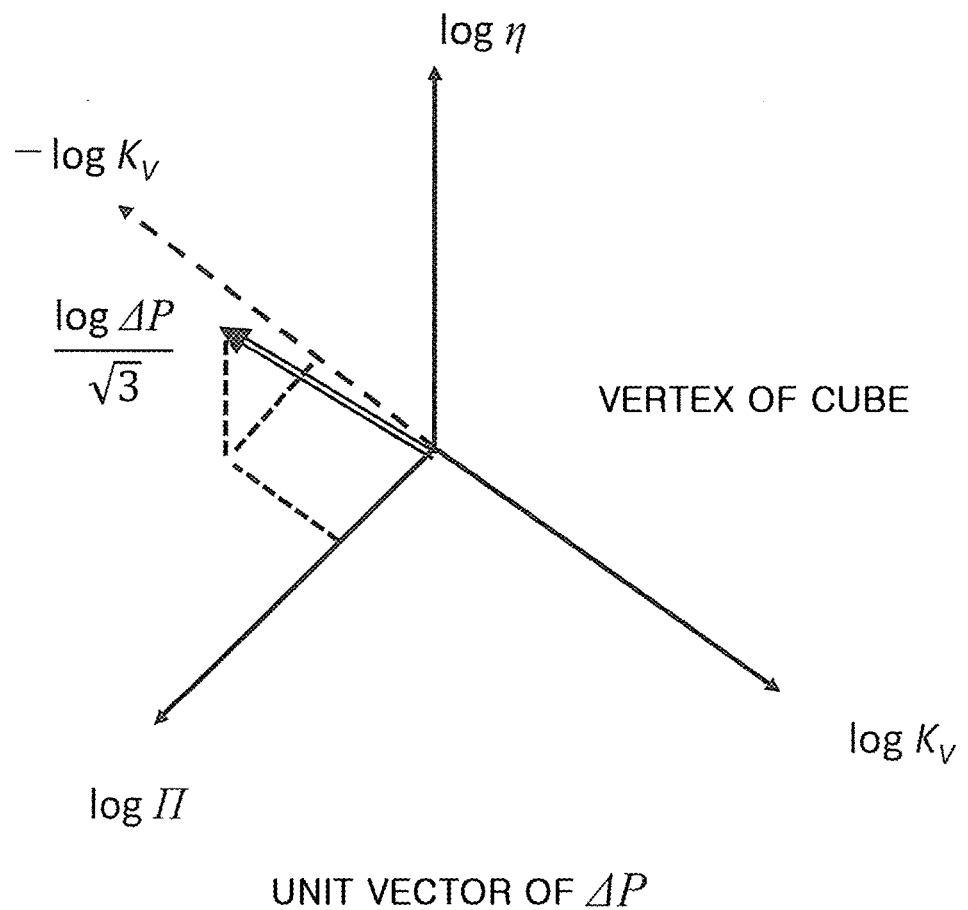
FIG. 10 is a diagram showing a unit vector of $\Delta P$.

As shown in FIG. 10, the unit vector of log ΔP is arranged in the 3D space stretched by the basis vector (log Π, log $K_V$, log η). Like before, in order to normalize the magnitude of the unit vector to 1, a scaling factor of $1/\sqrt{3}$ is multiplied. Therefore, the change in Π can be projected onto the unit vector of logarithm ΔP. The 3D graph is positioned as a kind of scale tool for bidirectional expression of Π<–>ΔP. It can also be called a ΠΔP projection method.

In addition, other variables to and n can be added as independent orthogonal logarithmic axes to generate a 5D space with a larger number of dimensions.

Similarly, the separation impedance E is also arranged as a specific unit vector in the 3D space with n, $u_0$, and $K_V$ as three orthogonal axes, and can be measured.

$$E \equiv \frac{\{H(u_0)\}^2}{K_V} = \frac{1}{K_V\{n(u_0)\}^2} \qquad \text{[Equation 7]}$$

$$\log E = -\log K_V + 2\log H$$

$$\log E = \sqrt{5}(-\sin 26.6° \log K_V + \cos 26.6° \log H)$$

Figure 11:
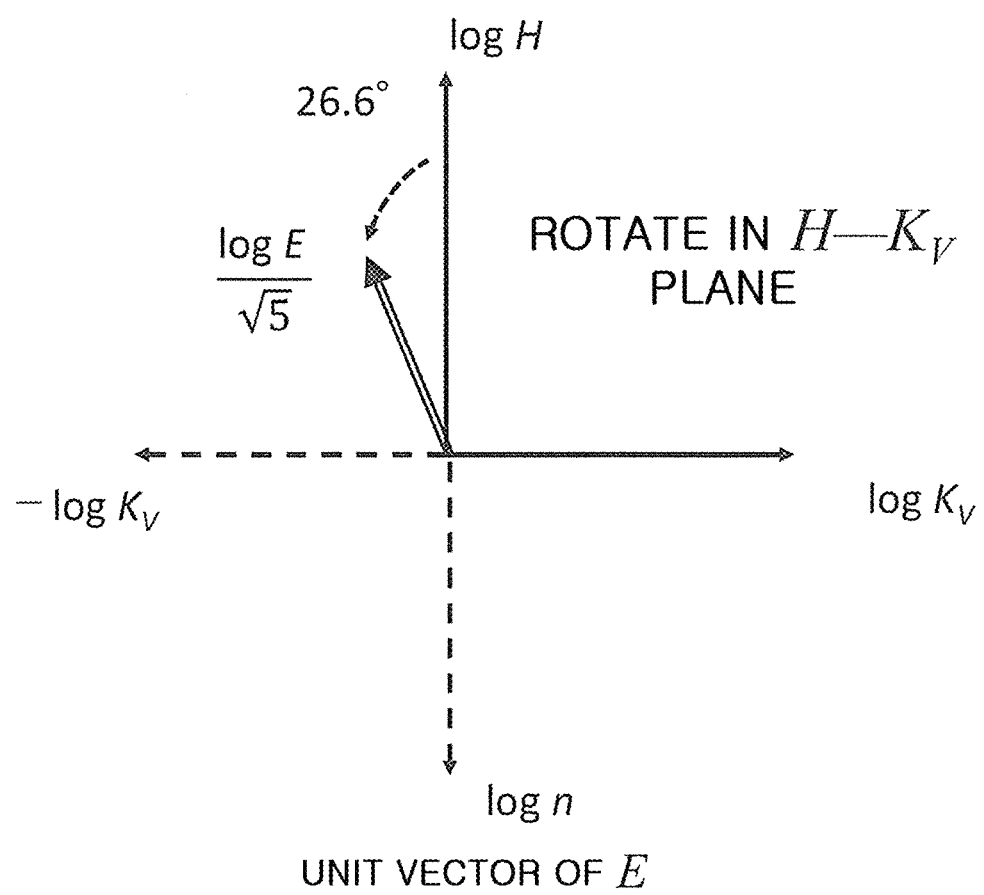
FIG. 11 is a diagram showing a unit vector of E.

Here, n is a reciprocal of H. As shown in FIG. 11, for example, the change in H can be orthogonally projected onto the logarithmic unit vector E.

Of course, as necessary, ΔP is expressed as a function of Π, and the retention time $t_R$ can be expressed as a function of the retention coefficient k or (k+1) with $t_0$. The degree of separation RS can also be expressed as a function of IN with separation coefficients α and k by adding axes and clearly showing binding functions (Equation 23).

[LRT Transformation of all Logarithmic uLN Type 3D Graph]

A preferable embodiment of the present invention is shown. In the present embodiment, the uLN type all logarithmic axes 3D graph is the starting point, and the LOP method is not explicitly used and LRT transformation remains. In a separation analysis method using an arbitrary column filler having a column efficiency characteristic n, a chromatography analysis device that visualizes both performances including the separation performance N and the analysis speed to in order to optimize the column length L and the flow velocity $u_0$ is provided. In this visualization technique, a velocity-length product Π proportional to the pressure is used as a driving force. As a premise, the mobile phase and the stationary phase are fixed, and used as isocratic elution conditions. Since the temperature is also fixed, the viscosity η of the mobile phase is also fixed. The pressure loss ΔP has some upper limit $\Delta P_{max}$. In addition, since the column filler is fixed, the column permeability $K_V$, which is a unique characteristic, can also be treated as a constant.

In order to visualize the relationship between the optimization variable and performance, there is data that should be input to an analysis and display device in advance. There are the function n($u_0$) and $K_V$. In addition, as necessary, there are η and $\Delta P_{max}$. In the function n($u_0$) which is a reciprocal of H, parameters in the van Deemter equation can also be used.

$$H = A + B\frac{1}{u_0} + Cu_0 \qquad \text{[Equation 8]}$$

Here, the coefficients A, B, and C are constants specific to the column filler. In the case of the van Deemter equation, $u_{0,opt}$ can be obtained by the following equation.

$$u_{0,opt} = \sqrt{\frac{B}{C}} \qquad \text{[Equation 9]}$$

First, all 3D graphs display the uLN type on the logarithmic axis. The function n($u_0$) can be regarded as a cliff-like cross section with an intercept log L=0. In FIG. 12, the intercept is visible at L=1 mm. Actually, since n is a physical dimension of a reciprocal of a length, regardless of whether the unit is 1(1/mm) or 1(1/m), the product N of n and L is not influenced.

Figure 13:
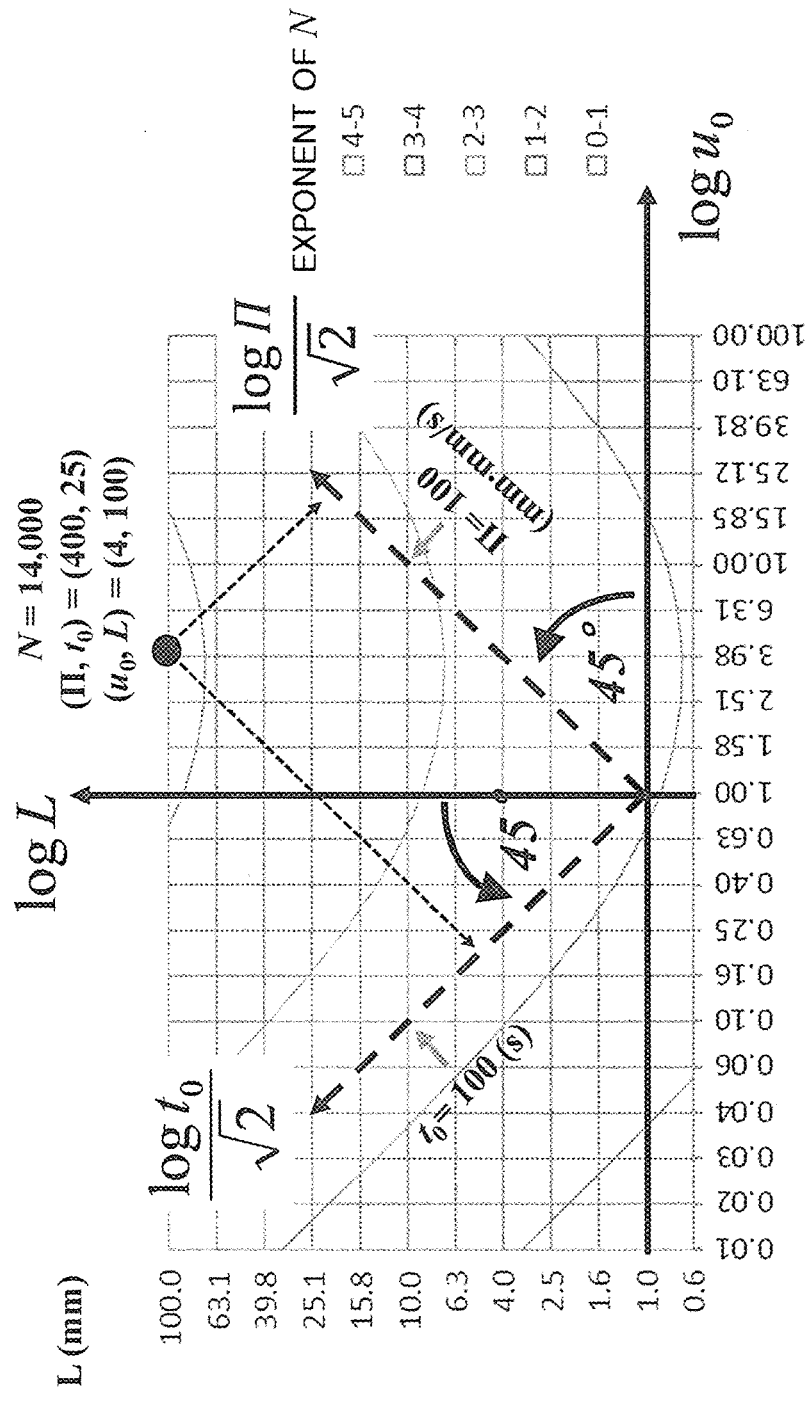
FIG. 13 is a diagram showing a contour diagram of all logarithmic axes.

The ΠtN type 3D graph stretched by the log Π axis and the log $t_0$ axis can also be displayed according to LRT coordinate transformation. In addition, the limiting condition of $\Pi_{max}$ can also be displayed based on $\Delta P_{max}$. From the ΠtN type 3D graph, the relationship between the required performance and log $u_0$ and log L can be instantly intuitively understood. In addition, it is possible to determine how much $u_0$ and L can be increased using the limiting condition $\Pi_{max}$ in which log $K_V$ is added to log $\Delta P_{max}$ (FIG. 13). Here, the LRT coordinate transformation referred to in Patent Document 2 is preferably called LCT logarithmic coordinate transformation because it is not limited to rotation when it clearly shows that $1/\sqrt{2}$ is a significant scaling factor.

In other words, as shown in FIG. 3, the starting point of the present invention is a membrane formation process in which the function n($u_0$) is stretched by L. From this starting point, by converting the z-axis to N, a so-called Weber up to FIG. 14 can be easily displayed (Non-Patent Document 2). Next, if it is devised to logarithmize all of these axes, as shown in FIG. 12, it can be understood that log N forms a slope with an exact inclination of 1 along the log L-axis. The reason for this is that N is proportional to L, that is, a linear function that passes through the origin. It is important that the slope becomes 1 by logarithmizing.

Next, we notice that the function log $n(u_0)$ still remains as a trace on the cliff cross section with the intercept log L=0. It can be said that all characteristics of the column filler are summarized in this function log $n(u_0)$. This is because the hilly landscape in FIG. 12 is simply a slope tilted at a slope of 1 along n on the log L-axis. Interestingly, the feature of this hilly landscape is only the characteristic n, but no other features. In the subsequent process, LRT transformation is used. The log Π axis and the log $t_0$ axis can be found by rotating LRT by 45°. Here, it should be noted again that the axis scale of 1/√2 is important. Here, in FIG. 13, all six variables of the present invention are displayed. If it is difficult to see the function log $n(u_0)$ in the contour diagram 13, the cross section n is visible well in the 3D graph display as shown in FIG. 12.

The log L-axis in FIG. 13 is orthogonal to the origin of log $u_0$=0, but there may be a convention in which it is orthogonal to the optimal flow velocity of log $u_0$=log $u_{0,opt}$. In FIG. 12, the line of $u_{0,opt}$ is visible as the ridge line of the hilly landscape. In addition, the coefficient C in the van Deemter equation is dominant on the right side of the ridge line, and the coefficient B is dominant on the left side. In addition, it is necessary to set the coefficient A not to be zero in order to secure monotonic increase in the next discussion, and the coefficients A, B, and C each have an important role.

If each $t_0$ is constant, the N–Π cross section is visible for each $t_0$. In FIG. 13, each cross section is in a right oblique direction of 45° and almost monotonically increases. N has a property of increasing approximately in proportion to the square root of Π. Similarly, the N–$t_0$ cross section is visible with each constant Π. As can be seen in FIG. 13, this is an almost monotonous increase and in the cross section in the left 45° direction, N approximately increases in proportion to the square root of $t_0$. Under the logarithmic display, it climbs with a contribution of 1/√2 times at most with a downhill slope, but in combination with the axis scale of 1/√2 of the example, eventually at most 1/square, that is, a logic proportional to the square root, is exquisite and interesting. It is expressed at most because the coefficients B and C are not zero. This logic will be described below in detail.

Figure 15:
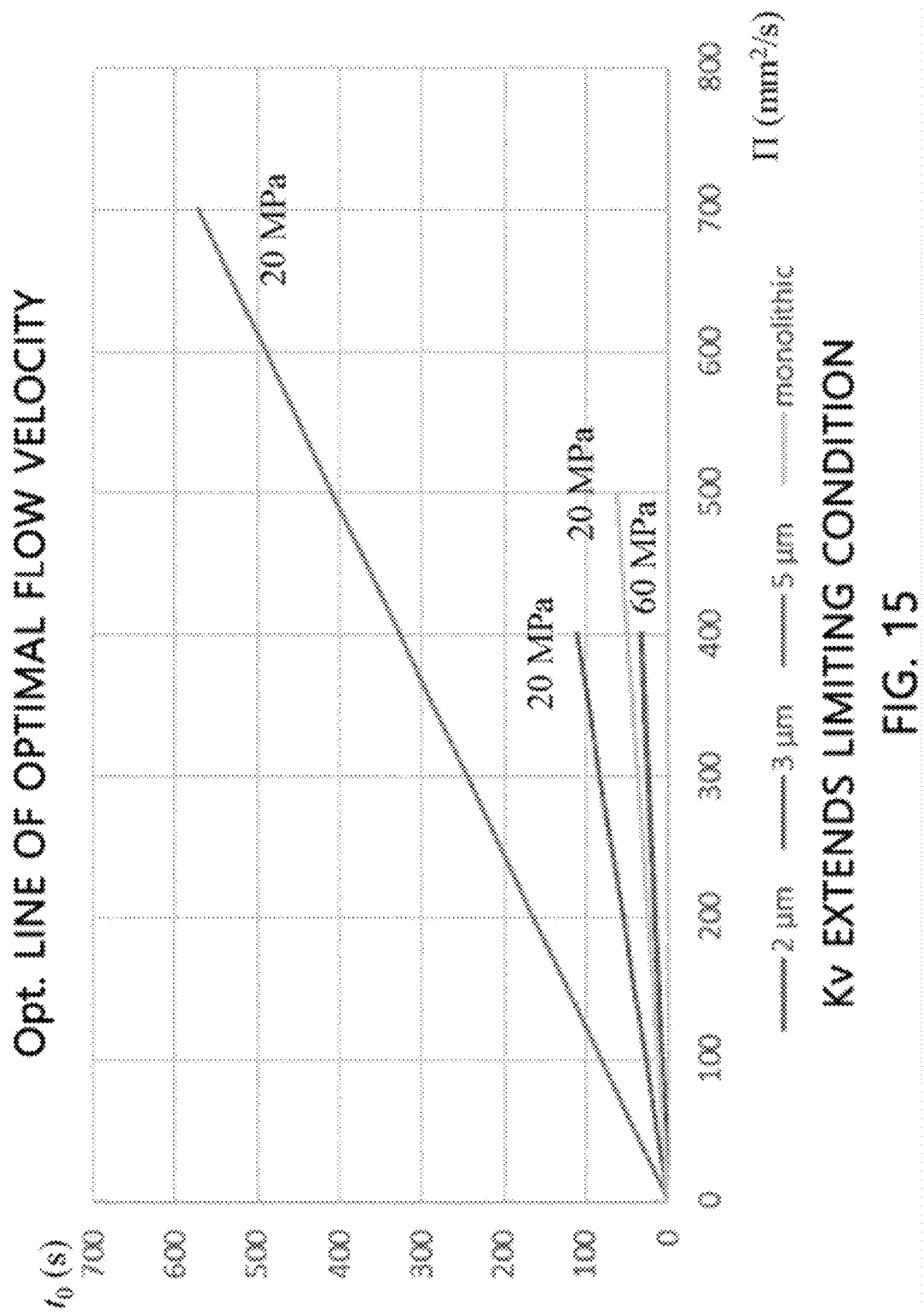
FIG. 15 is a diagram showing that $K_V$ extends a limiting condition.

Finally, $K_V$ also changes when the particle size $d_P$ changes, but where is this event reflected in FIG. 13? This influences the limiting condition ΔP. That is, when the log Π axis is expressed as the log ΔP axis, it is added as a constant log $K_V$. Naturally, when the $K_V$ is larger, that is, when the liquid permeability is higher, the limit extends (FIG. 15). $K_V$ increases in the order of 2, 3, and 5 μm, and the monolith column is the largest.

FIG. 15 will be described. Each straight line is the Opt. line of the optimal flow velocity $u_{0,opt}$. Π and $t_0$ are correlated. For example, in the Opt. line with a particle size of 2 μm, since $u_{0,opt}$ is located at a part in which the flow velocity is relatively high, the slope is shallow in this graph. Here, even though the maximum pressure is as high as 60 MPa, the upper limit of n is not so high. The reason for this is that the liquid permeability $K_V$ is small (refer to Equation 6). This interpretation is suitable for high speed analysis because the slope is shallow. However, information is not sufficient because the characteristic n is not visible in this graph. In addition, as the particle size becomes smaller, the liquid permeability deteriorates, and Π does not extend as expected. On the other hand, in the case of the Opt. line with a particle size of 5 μm, the slope is large, but since $K_V$ is relatively large, Π extends even if the pressure $\Delta P_{max}$ is as low as 20 MPa. It is still indescribable because n is not displayed, but it may be advantageous for a high separation analysis method because Π can be used effectively over time. It can be understood that the particle size of 3 μm is a characteristic intermediate between 2 μm and 5 μm. In addition, it can be understood that the monolith column is comparable to the slope with a particle size of 2 μm for high speed and effectively extends Π at a low pressure. When this graph is viewed as an all logarithmic uLN type 3D graph (FIGS. 12 and 13), each n is visible in the cliff cross section with an intercept log L=0, and z-axis information is added in FIG. 15.

[Proof of Monotonic Increase]

In preconditions, the coefficient A in the van Deemter equation (Equation 8) is a positive number, and the coefficients B and C are zero or a positive number. Since Π=$u_0$ L, N can be expressed by function N(Π, $t_0$) from (Equation 10) (Equation 11).

$$N = nL = \frac{L}{H(u_0)} \quad \text{[Equation 10]}$$

$$N = \frac{\Pi}{u_0 H(u_0)} \quad \text{[Equation 11]}$$
$$= \frac{\Pi}{Au_0 + B + Cu_0^2}$$

$$N(\Pi, t_0) = N(t_0) = \frac{\Pi t_0}{A\sqrt{\Pi t_0} + Bt_0 + C\Pi}$$

Here, Π and $t_0$ are treated as variables. The variable $u_0$ can be synthesized from Π and $t_0$. It should be noted that $Bt_0$ and CΠ have interchangeable symmetry in (Equation 11).

$$u_0 = \sqrt{\frac{\Pi}{t_0}} \quad (\Pi > 0, t_0 > 0). \quad \text{[Equation 12]}$$

All the domains of Π, $t_0$, and $u_0$ are only positive. (Equation 12) is obtained from (Equation 13).

$$\Pi = u_0^2 t_0 (t_0 > 0). \quad \text{[Equation 13]}$$

First, in (Equation 11), Π is fixed, and a one-variable function N($t_0$) is treated. In order to determine whether N($t_0$) monotonically increases, N($t_0$) is differentiated by $t_0$.

$$\frac{dN(t_0)}{dt_0} = \Pi \frac{\left(A\sqrt{\Pi t_0} + Bt_0 + C\Pi\right) - \left(\frac{A\sqrt{\Pi}}{2\sqrt{t_0}} + B\right)t_0}{\left(A\sqrt{\Pi t_0} + Bt_0 + C\Pi\right)^2} \quad \text{[Equation 14]}$$
$$= \frac{A\sqrt{\Pi^3 t_0} + 2C\Pi^2}{2\left(A\sqrt{\Pi t_0} + Bt_0 + C\Pi\right)^2}.$$

Since A and Π are positive, and B and C are non-negative, (Equation 14) is always positive. Therefore, it is proved that N($t_0$) is a monotonically increasing function in the domain in which to is positive.

For example, in the case of a filler with a particle size of 2 μm, $A=5.1\times10^{-6}$ m, $B=3.3\times10^{-9}$ m²s⁻¹, and $C=2.7\times10^{-4}$ s.

Next, in (Equation 11), $t_0$ is fixed, and a one-variable function $N(n)$ is treated.

$$N(\Pi) = \frac{t_0 \Pi}{A\sqrt{t_0\Pi} + Bt_0 + C\Pi}. \quad [\text{Equation 15}]$$

Similarly, in order to determine whether $N(n)$ monotonically increases, $N(n)$ is differentiated by $\Pi$.

$$\frac{dN(\Pi)}{d\Pi} = t_0 \frac{(A\sqrt{t_0\Pi} + Bt_0 + C\Pi) - \left(\frac{A\sqrt{t_0}}{2\sqrt{\Pi}} + C\right)\Pi}{(A\sqrt{t_0\Pi} + Bt_0 + C\Pi)^2} \quad [\text{Equation 16}]$$

$$= \frac{A\sqrt{t_0^3\Pi} + 2Bt_0^2}{2(A\sqrt{t_0\Pi} + Bt_0 + C\Pi)^2}.$$

Since A and $t_0$ are positive, and B and C are non-negative, (Equation 16) is always positive. Therefore, it is proved that $N(\Pi)$ is a monotonically increasing function in the domain in which $\Pi$ is positive.

[Relationship Between N and Π]

It can be understood that, if the coefficients B and C in (Equation 11) are set to zero, N is proportional to $\sqrt{\Pi}$. The relationship (Equation 17) is derived from the uLN type all logarithmic contour diagram (FIG. 13).

$$\log N \cong \frac{1}{2} \log \Pi + C_1$$

$$N \cong C_0 \sqrt{\Pi} \quad [\text{Equation 17}]$$

First, as shown in FIG. 17(a), the log Π axis can be found in the upper right oblique direction of 45° on the bottom plane fixed by the log $u_0$ axis and the log L-axis, but when the unit vector $e_4$ in that direction is read as log Π, the value multiplied by $\sqrt{2}$ should be read as log Π. This is the meaning of the scaling factor $1/\sqrt{2}$ of the log Π axis. According to projection or the like, when the magnitude of an arbitrary vector in the $e_4$ direction is read as the value of log Π, it always should be multiplied by $\sqrt{2}$. The reason for this is that, when a unit vector is rotated by a rotation matrix, the magnitude of each unit vector is also stored. That is, this is because a logarithmic operation of determining log Π from the sum of log $u_0$ and log L is not actually simply rotating (refer to Patent Document 2). In this meaning, it is preferable to call logarithm rotation transformation (LRT) as logarithm coordinate transformation (LCT).

Next, log N uses a characteristic that is a function of performing increasing with a slope of 1 for log L. The hilly landscape in FIG. 12 is replaced with an ideal rectangular flat surface tilted 45° with respect to the log L-axis. The hilly landscape is tilted to the right and left according to the coefficients B and C, but when both B and C are zero, there is no tilt and a simple flat surface is formed. The front side is an intercept function when log $u_0=0$, but in this case, a so-called cliff cross section becomes a horizontal straight line. This flat surface is tilted so that log N increases at a slope of 1 for log L, but if it returns back in the log Π axis direction along a flow line of downhill 45°, it climbs only $1/\sqrt{2}$ of log N even if it climbs the unit vector $e_4$. The ratio is exactly $\tan \theta = 1/\sqrt{2}$ so that θ is about 35.3° (FIG. 17(a)).

After all, even with an ideal flat surface in which coefficients B and C correspond to zero, $e_4$ does not increase by 1 unless log Π increases by $\sqrt{2}$ and even if $e_4$ increases by 1, it increases by only $1/\sqrt{2}$ of log N. Therefore, as shown in Equation (S8), log Π increases by 2 to the point B by horizontal movement, and log N can be climbed by 1 for the first time (FIG. 17(b)).

[Particle Size $d_P$]

In Non-Patent Document 3, the relational expression between H and $d_P$ (Equation 18) is described.

$$H(u_0) = ad_P + b\frac{1}{u_0} + cd_P^2 u_0 \quad [\text{Equation 18}]$$

Here, a, b, and c are coefficients. First, $u_{0,opt}$ is obtained as (Equation 19), and H (Equation 20) is obtained by fixing $u_0=u_{0,opt}$.

$$u_{0,opt} = \sqrt{\frac{B}{C}} = \sqrt{\frac{b}{cd_P^2}} = \frac{1}{d_P}\sqrt{\frac{b}{c}} \quad [\text{Equation 19}]$$

$$H(u_{0,opt}) = ad_P + bd_P\sqrt{\frac{c}{b}} + \frac{cd_P^2}{d_P}\sqrt{\frac{b}{c}} \quad [\text{Equation 20}]$$

$$= ad_P + d_P\sqrt{bc} + d_P\sqrt{bc} = (a + 2\sqrt{bc})d_P$$

When $u_0=u_{0,opt}$, a relationship in which H is proportional to $d_P$ is obtained. On the other hand, $K_V$ is proportional to the square of $d_P$. E can be regarded as a proportional constant that is generated when the relationship in which N is proportional to $\sqrt{\Pi}$ is described as a parameter $d_P$. That is, under the ideal condition of $u_0=u_{0,opt}$, when $d_P$ changes, the responses of Π and $N^2$ are proportional to the square of $d_P$, but E is a dimensionless parameter related to H and $K_V$ defined based on the relationship. This will be described below in more detail ([when the particle size is subdivided]).

In addition, log L is fixed in the all logarithmic uLN type 3D graph, and a 3D graph in which the log $d_P$ axis is added from (Equation 20) can be displayed.

[Visualization of Influence of C Term]

Figure 16:
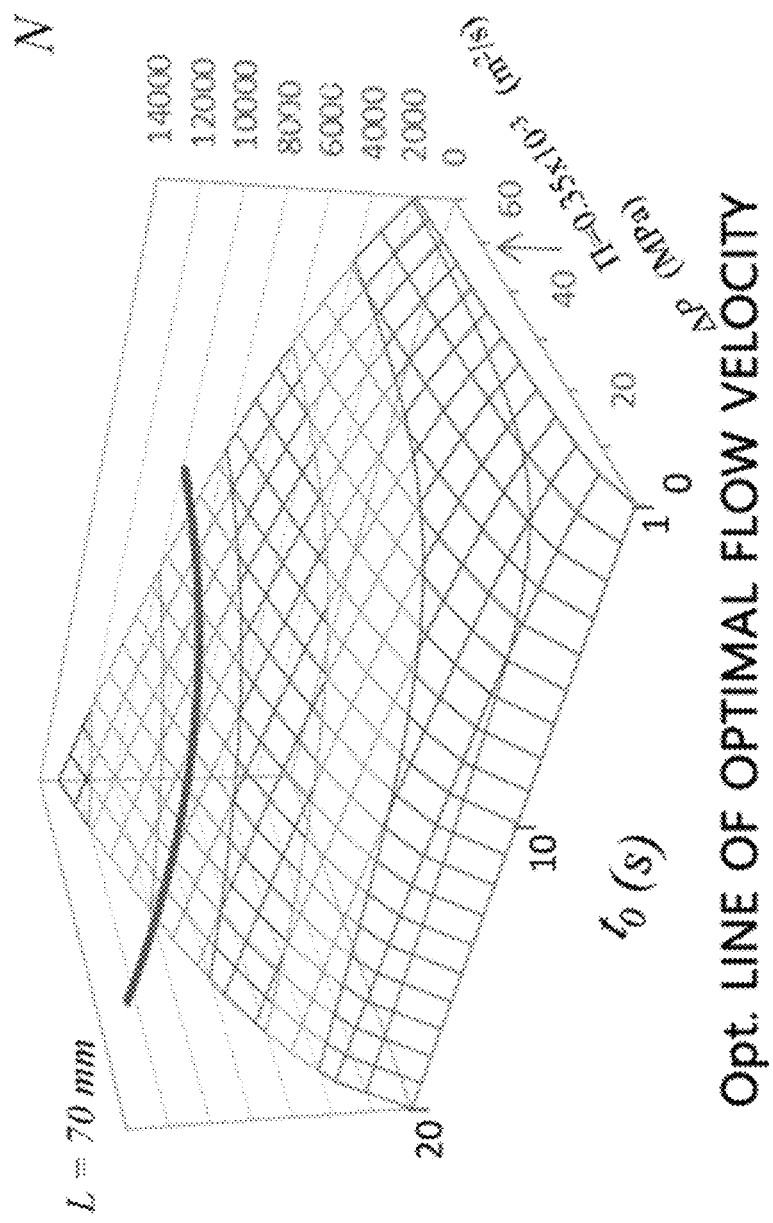
FIG. 16 is a diagram showing attenuation of N with a constant L.

From the ΠtN type contour diagram, which is displayed on all antilogarithm axes, N obtained with L=constant is visible. In FIG. 2, it can be seen that, as Π increases, the curve with L=constant gradually deviates from the contour with N=10,000. This can also be intuitively understood from the ΠtN type 3D graph (FIG. 16).

[Function Allocation of Operation Processing Unit]

Figure 18:
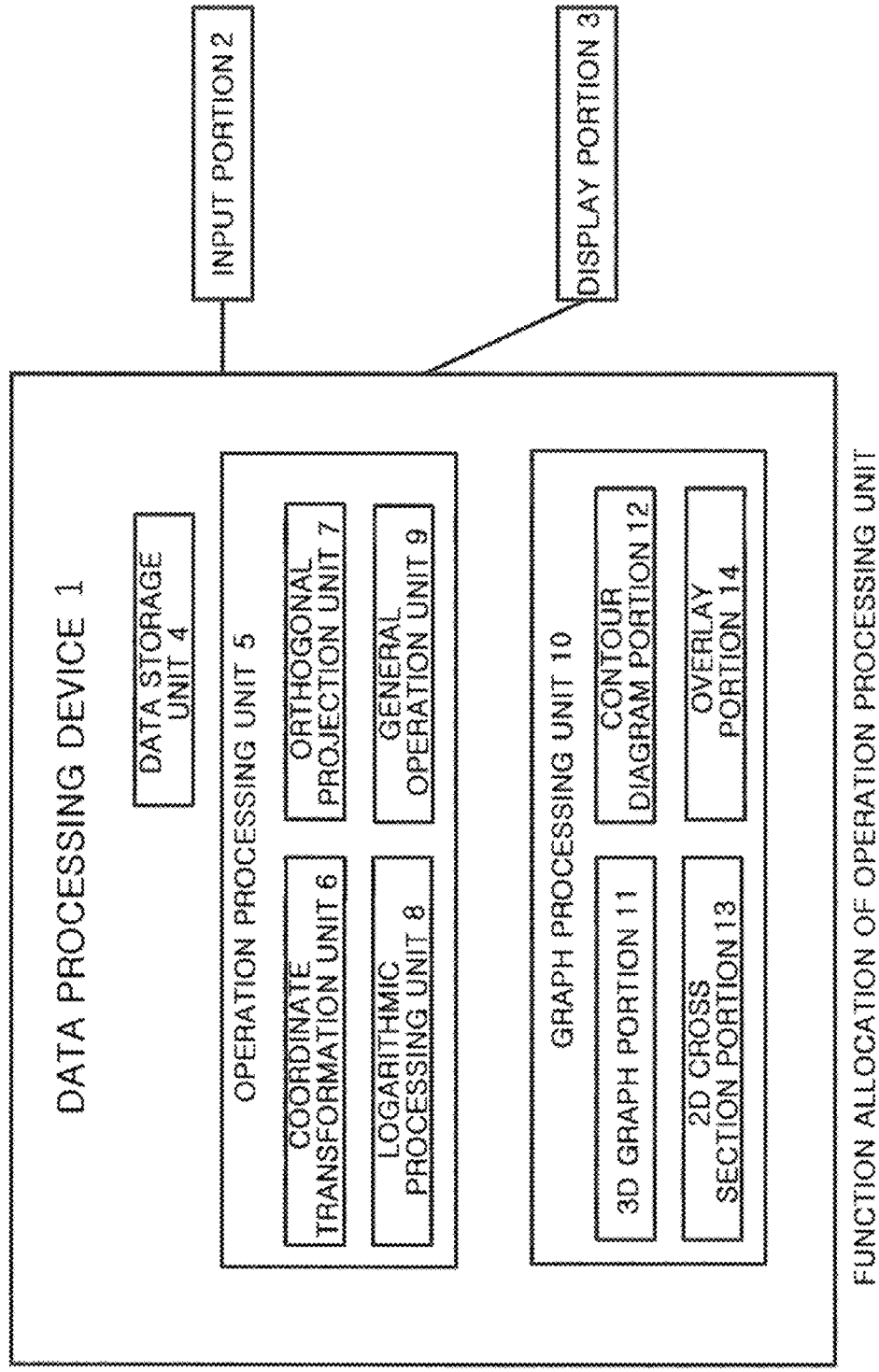
"
FIG. 18 is a diagram showing function allocation of an operation processing unit.

The liquid chromatography data processing device of the present invention has a configuration shown in FIG. 18. An input portion 2 such as a keyboard and a mouse and a display portion 3 such as a display and a printer are connected to a data processing device 1. The internal configuration of the data processing device 1 includes a data storage unit 4, an operation processing unit 5, and a graph processing unit 10. The data storage unit 4 stores basic characteristic data of the column filler and data for final graph display, including the data group generated in the intermediate processing process. The basic characteristic data includes a theoretical number of plates $n(u_0)$ per unit length, which corresponds to the cliff cross section function, and a column liquid permeability $K_V$. As necessary, η and the upper limit $\Delta P_{max}$ of the pressure loss can also be stored. The coefficients A, B, and C, or a, b, c, or $d_P$ in the van Deemter equation (Equation 8 and Equation 18) can also be stored.

The operation processing unit 5 includes a logarithmic processing unit 8, a coordinate transformation unit 6, an orthogonal projection unit 7, and a general operation unit 9.

Figure 19:
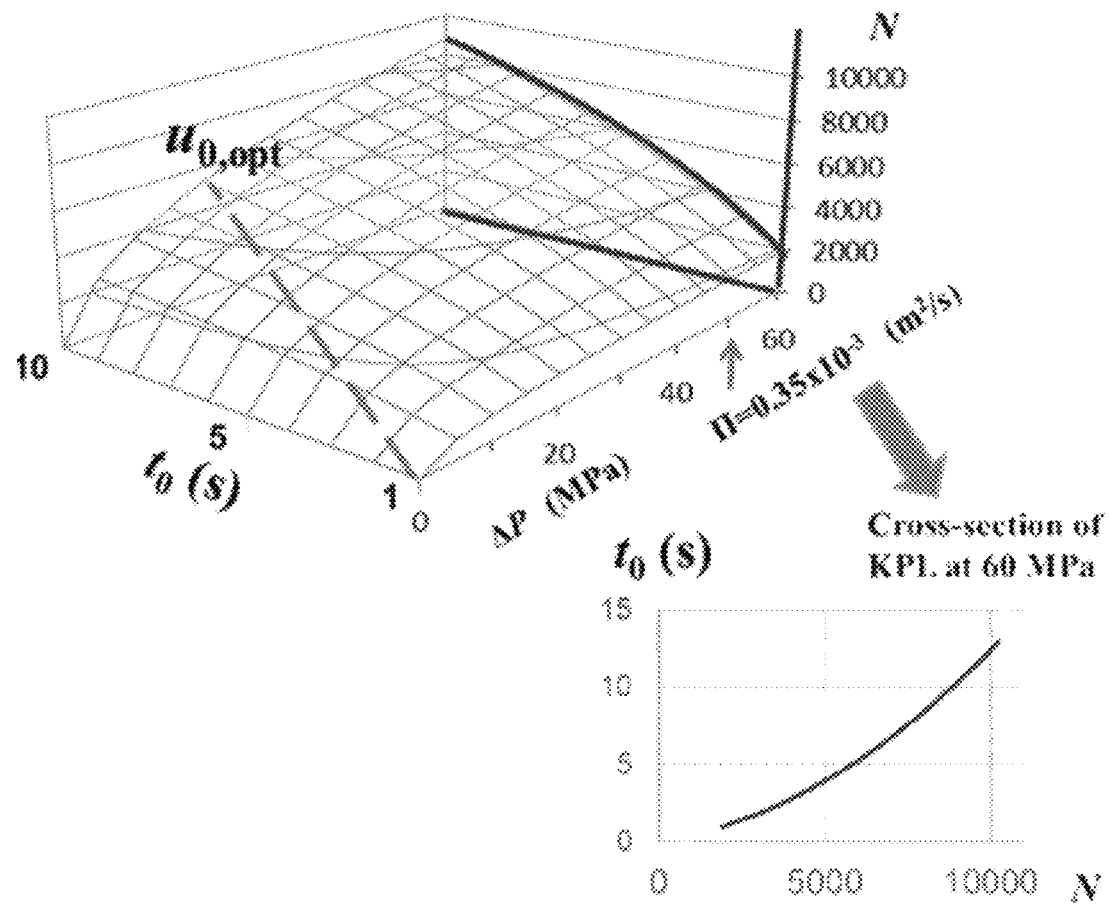
FIG. 19 is a diagram showing an example of a cross-sectional view.

The coordinate transformation unit 6 can also execute a rotation transformation process. The graph processing unit 10 can display both logarithms and antilogarithms. It includes a 3D graph portion 11, a contour diagram portion 12, a 2D cross section portion 13, and an overlay portion 14. As display examples, FIG. 12 shows a 3D graph, FIG. 13 shows a contour diagram, FIG. 19 shows a 2D cross section portion, and FIG. 16 shows an overlay diagram.

Functions of respective units of the data processing device will be described using [LRT transformation of all logarithmic uLN type 3D graph] as an example. First, data of $n(u_0)$ is input from the input portion. This is temporarily stored in the data storage unit. Next, the operation processing unit adds the L-axis to the data $n(u_0)$ and extends it to a 3D space by a general operation unit. For example, an nN projection method is executed using the orthogonal projection unit to generate an uLN type antilogarithm 3D space. In addition, the logarithmic processing unit executes a logarithmic operation on an antilogarithm on three axes. The operation processing unit finally activates the coordinate transformation unit, and generates log Π axis and log $t_0$ axis with a scaling factor by LRT transformation.

When the user of the data processing device activates the graph processing unit and selects, for example, the 3D graph portion, the all logarithmic uLN type 3D graph as shown in FIG. 12 is displayed on the display portion. If the user uses the contour portion, the all logarithmic type contour diagram as shown in FIG. 13 can be displayed. In addition, if the user uses a 2D cross-sectional view, log n–log $u_0$ as an intercept function can be observed as a cliff cross section. When the overlay portion is used, it is possible to form a graph with a constant L as shown in FIG. 16.

[When Particle Size is Subdivided]

Figure 20:
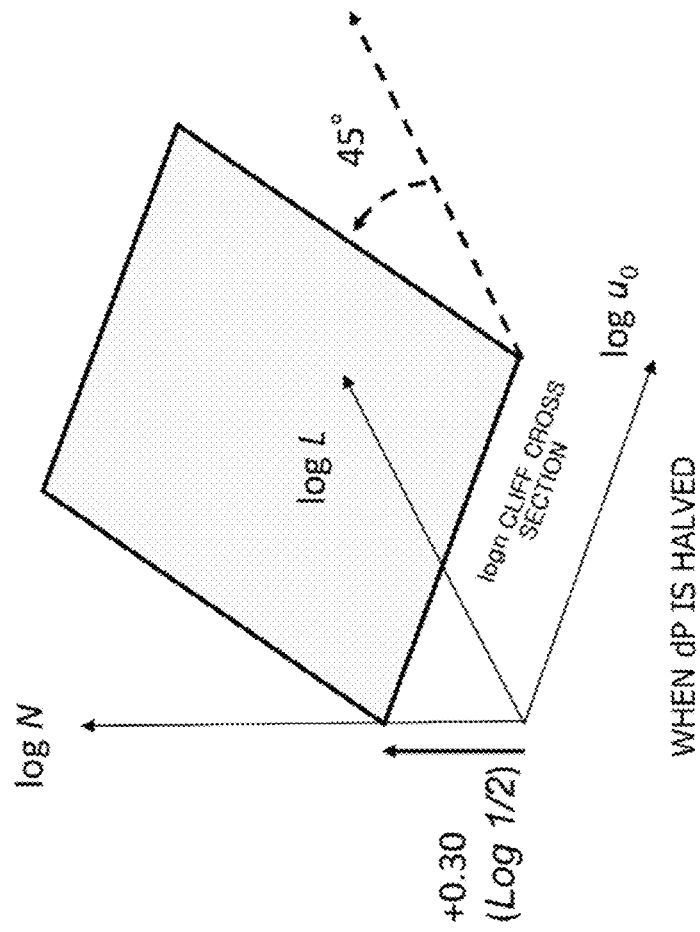
FIG. 20 is a diagram showing a case in which $d_P$ is halved.

A property in which the product of antilogarithms such as multiples is the sum of logarithms is also used here. What happens if $d_P$ is halved. H is also halved and n is a reciprocal thereof. Using the all logarithmic uLN type 3D graph, log n becomes –log 2, and the cliff cross section increases by about +0.30 (FIG. 20). Even if log N increases by +0.30 as a whole, it does not influence log $u_0$, log L, or log Π. Since an ideal flat surface model in which the coefficients B and C are zero is used, it has a tilt of 45°.

If $d_P$ is halved, $K_V$ is then proportional to the square, and it is multiplied by ¼. That is, the logarithm log $K_V$ is –log 4, which is about –0.60. As shown in FIG. 21(a), the straight line of the pressure upper limit $\Delta P_{max}$ vertically intersects the log Π axis. Since $\Delta P_{max}$ is constant, using (Equation 6), log Π is –0.60 loss according to the change in $K_V$ when $d_P$ is halved. The division of ¼ is a logarithmic subtraction. When the liquid permeability $K_V$ decreases to one-quarter, the velocity-length product Π that can be effectively used also decreases to one-quarter, and the logarithm also becomes a subtraction of –0.60.

Incidentally, when the unit vector $e_4$ that stretches the log Π axis has a magnitude of 1, log Π has a scaling factor of $1/\sqrt{2}$. Since it is displayed in the all logarithmic uLN type 3D space, the scaling factor is also applied to –0.60 of the loss log Π. $1/\sqrt{2}$ times –0.60, that is, about –0.43, is the loss on (log Π)/$\sqrt{2}$ axis.

In FIG. 21(b), although log n increases by +0.30 from the original point C, which is $\Delta P_{max}$, a loss of –0.43 occurs along (log Π)/$\sqrt{2}$ axis due to the action of $K_V$. log N decreases along the downhill flow line at θ=about 35.3°. Since tan θ is $1/\sqrt{2}$, the triangle horizontal movement –0.43 is a decrease of –0.30 in log N. After all, the point D has the same level of log N as the original point C, and is returned to the start point. $K_V$ at the point D is one-quarter thereof, and Π is also one-quarter thereof.

Specific numerical values will be exemplified. The particle size of 2 μm is provisionally subdivided to 1 μm. H is halved, but $K_V$, $7\times10^{-15}$ m², is reduced to one-quarter, $1.75\times10^{-15}$ m². Therefore, if $\Delta P_{max}$ remains at 60 MPa, the driving force Π is lowered to 400 mm·mm/s to 100 mm·mm/s. Then, even if n, which is a reciprocal of H, is doubled, the upper limit of Π decreases to one-quarter, and there is no gain.

Actually, since it is not an ideal flat surface, it falls below the original level N due to the influence of the C term. Therefore, when $d_P$ is subdivided, $\Delta P_{max}$ should be definitely increased at the same time. The scaling factor of $(-\log 4)/\sqrt{2}$ for the horizontal movement along the (log Π)/$\sqrt{2}$ axis is exactly applied, but the downhill flow line is curved due to the influence of the C term, and tan θ has only a relationship of about $1/\sqrt{2}$.

Figure 21:
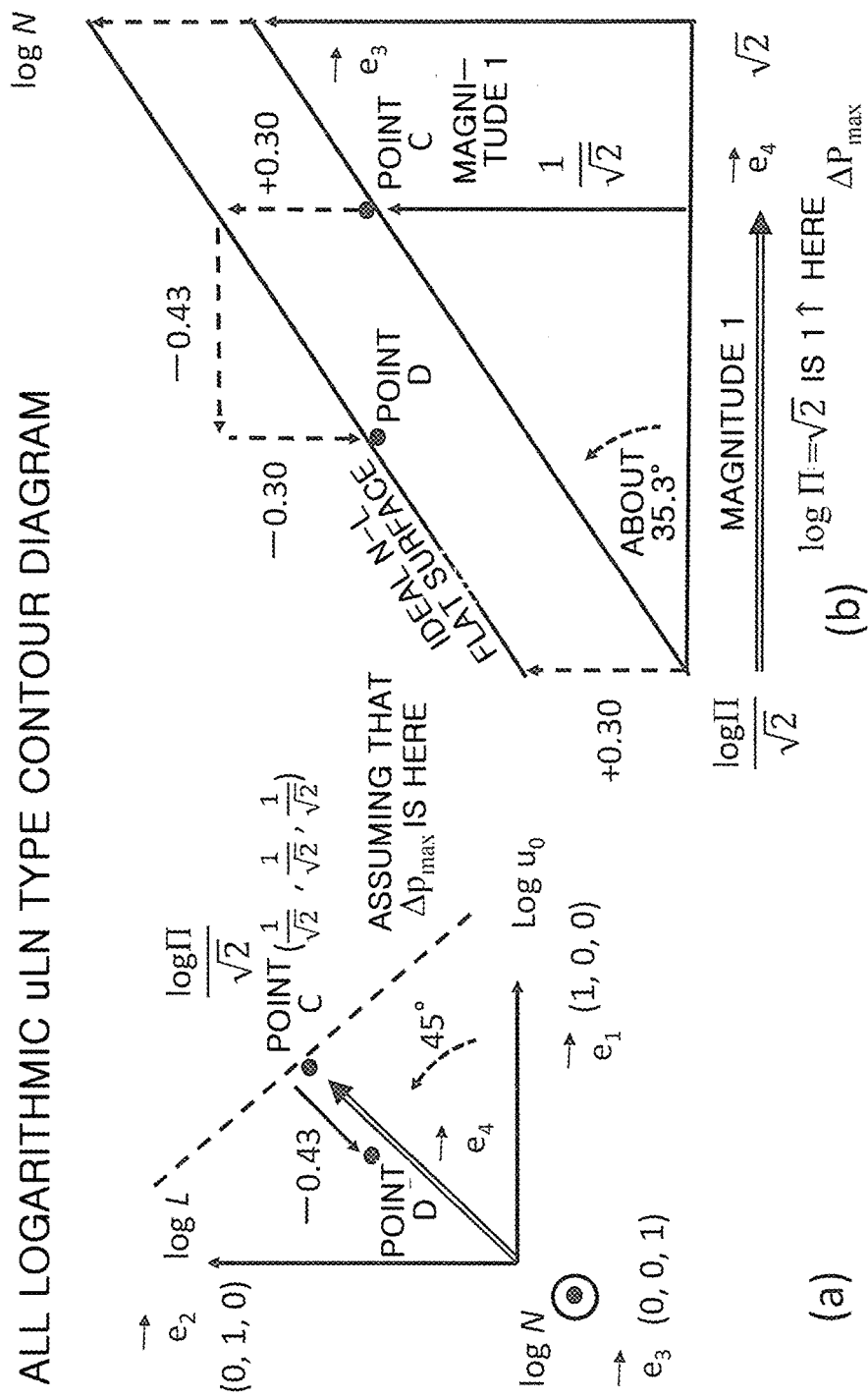
FIG. 21 is a diagram showing a case in which, even if $d_P$ is halved, shifting to a point D is performed, and there is no gain.

When viewed from E, H is proportional to $d_P$, but $K_V$ is proportional to the square of $d_P$. In addition, N is approximately proportional to the square root of Π. In other words, Π is approximately proportional to the square of N. When H is proportional to N, and $\Delta P_{max}$ is fixed, since $K_V$ is proportional to Π, $K_V$ is approximately proportional to the square of H. Therefore, the definition equation of E shown in (Equation 7) is considered to be rational. Looking back again, the action of $d_P$ on n and the action of $d_P$ on $K_V$ pass through completely different logics as shown in FIG. 20 and FIG. 21, but finally result in E of (Equation 7).

[Display Operation Example]

A display example of this data processing device will be described. Based on the data such as $n(u_0)$ input from the input portion, 3D data to which the L-axis is added as the starting point for all by the operation processing unit is stored in the data storage unit. The display portion can display not only the all antilogarithmic uLn type 3D graph as shown in FIG. 3 but also various graphs.

Here, the order is random, but by the user specification, the all antilogarithmic uLN type 3D graph (FIG. 14) can be displayed based on (Equation 2) by the general operation unit without using the nN projection method. If the logarithmic processing unit displays a log-log axis contour diagram (FIG. 1) only on the bottom plane, in addition to the bottom plane logarithm uLN type contour diagram, FIG. 1 can be viewed as a bottom plane logarithm ΠtN type contour diagram using LRT rotation of the coordinate transformation unit. If the logarithmic processing unit is used for an inverse operation, the all antilogarithmic tN type contour diagram (FIG. 2) can also be displayed. In order to show the influence of the C term, in FIG. 2, it is possible to overlay curves with a constant L by the overlay portion.

Figure 14:
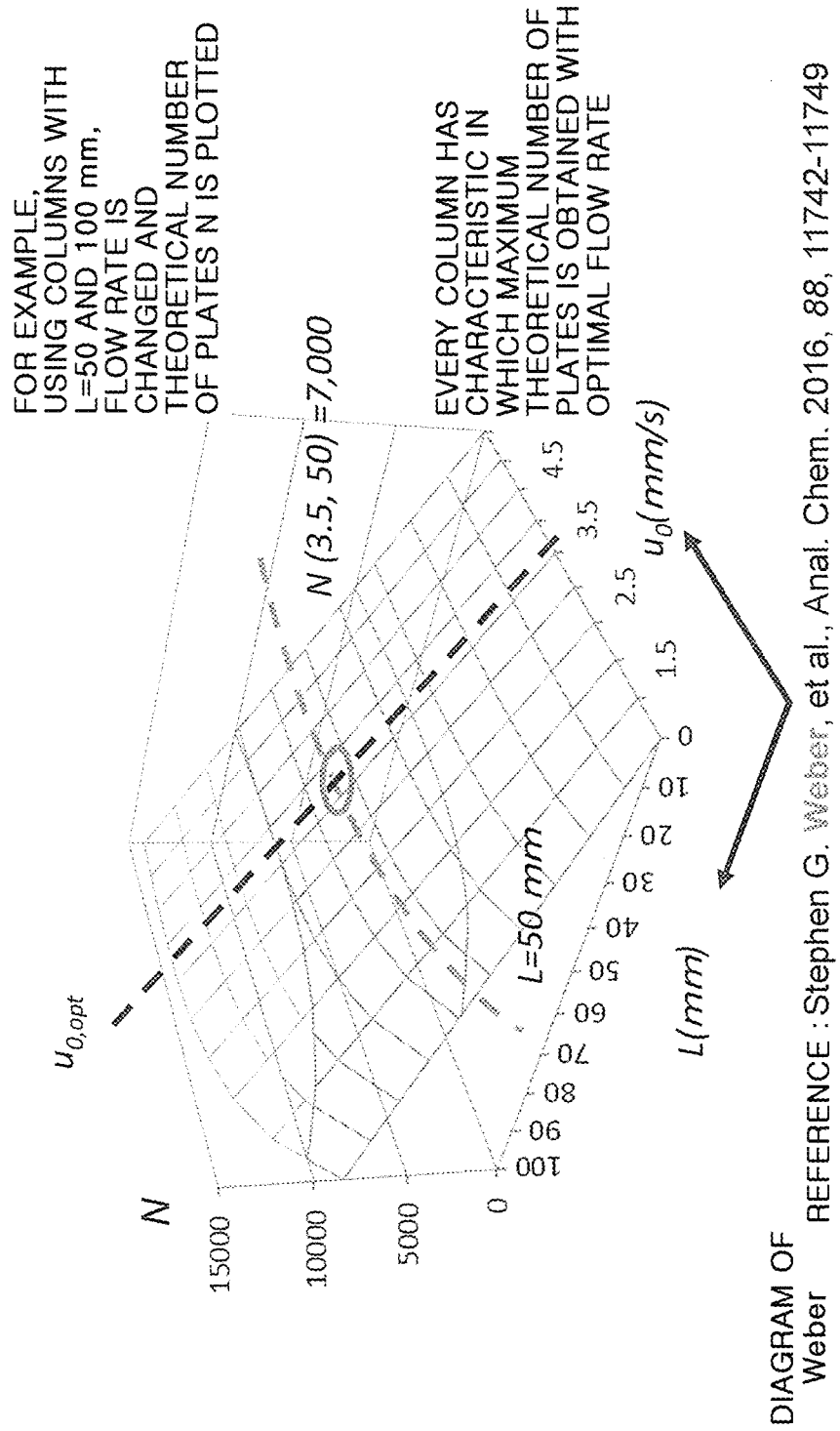
FIG. 14 is a diagram of Weber.
Figure 17:
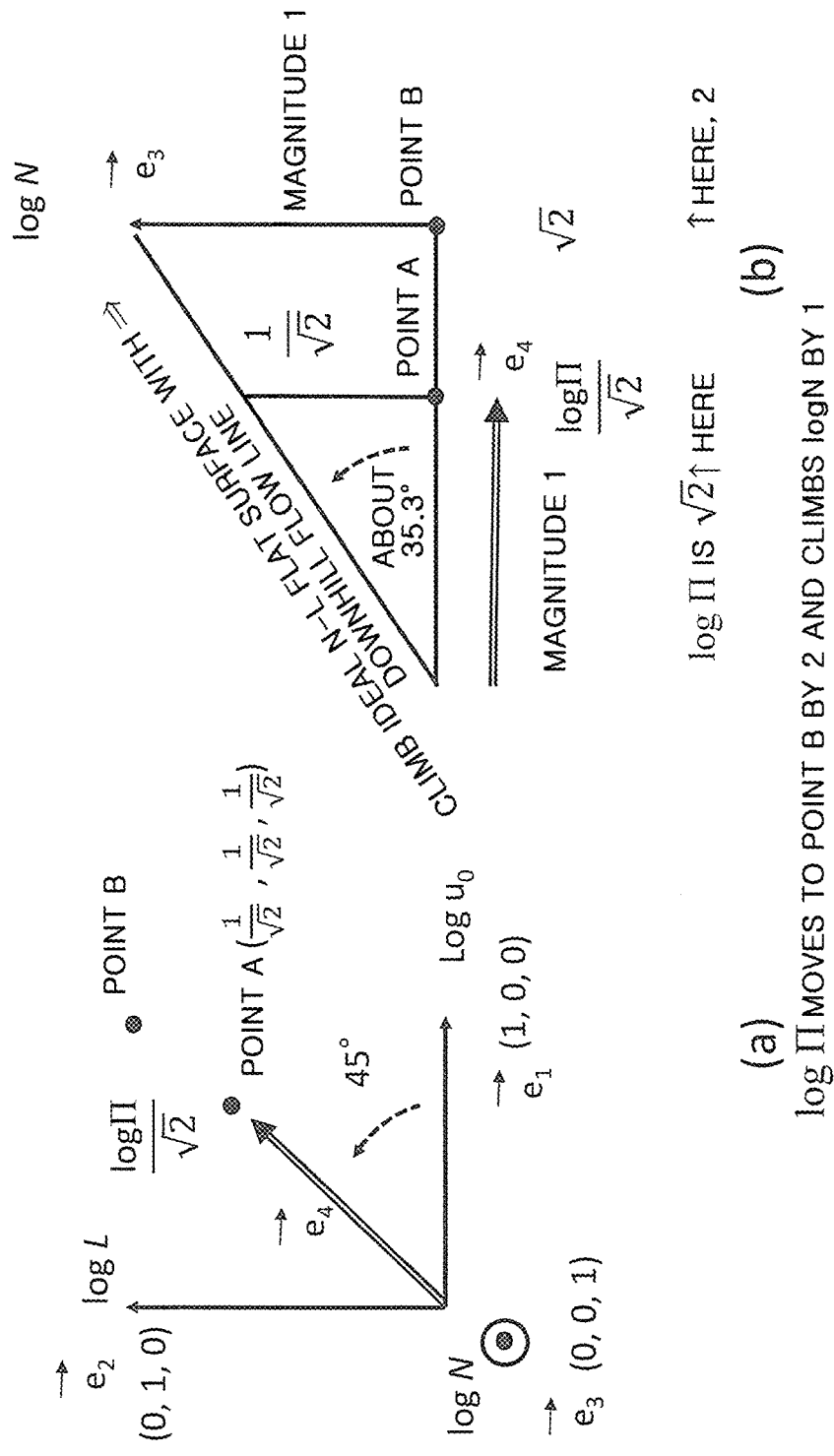
FIG. 17 is a diagram showing that "log $\Pi$ moves to a point B by 2 and climbs log N by 1.

Using FIG. 14, the hilly landscape can be displayed on the all logarithmic uLN type 3D graph (FIG. 12) newly shown in the present invention. The intercept function log n that is visible in the cliff cross section with log L=0 is an important feature of the all logarithmic display. The contour diagram portion can also display the all logarithmic uLN type contour diagram (FIG. 13). The coordinate transformation unit performs LRT coordinate transformation with a scaling factor, and thus the all logarithmic MN type contour diagram in FIG. 13 can be found. In FIG. 13, undulations of the intercept function log n are visible in the cross section of the log $u_0$ axis. In addition, as shown in FIG. 17, the all logarithmic uLN type 3D graph is convenient for graphically understanding the relationship between the square of N and Π. In addition, FIG. 21 from the all logarithmic uLN type 3D graph geometrically proves that, even if subdivision of $d_P$ contributes to performance improvement of n, it has an adverse effect on $K_V$, and eventually cancels out. As a concept related to this, it can be understood that E, which is a reciprocal of the product of the square of n and $K_V$, is related (Equation 7).

Using FIG. 2, the 3D graph portion can also display the all antilogarithmic MN type 3D graph as shown in FIG. 19. The 2D cross section portion can display a $t_0$–N type 2D cross-sectional view shown in the lower right of FIG. 19. As proved by Equation 14, it can be understood at a glance that it is surely monotonically increasing.

In the orthogonal projection unit, as shown in FIG. 10, after the all logarithmic HMI type 3D graph with n, $K_V$, and η is shown, the magnitude of ΔP can be measured using the LOP orthogonal projection method with the unit vector ΔP (Equation 6).

Incidentally, in FIG. 12 and FIG. 13, the target is the same hilly landscape, but display methods thereof are different. This is because the logarithm Π axis and the logarithm to axis can be shown together in FIG. 12. If it is difficult to see on an axis, it is possible to display a vertical plane on each axis and also display a curve in which the hilly landscape intersects the vertical plane. On the other hand, although it may be difficult to see in FIG. 13, it can be seen that a cut cross section perpendicular to the intercept function $n(u_0)$ is displayed as a contour diagram on the logarithm $u_0$ axis. The user may select the display method according to the purpose. In addition, for example, using a virtual reality technique, a 3D model of a sheet-like hilly landscape with an axis frame for scaling can rise in the space. These will become a new display tool that can be conveniently used when finding separation conditions for HPLC.

It can be said that, in Patent Document 2, the framework of the display method is disclosed. Here, five variables $u_0$, L, N, Π, and $t_0$ are treated, and remain until LRT rotation of the bottom plane coordinate system is shown. In this stage, N is still a two-variable function that is automatically assigned if bottom plane coordinates are determined. In the present invention, for the first time, six variables can be displayed at the same time in a form including the characteristic function $n(u_0)$ of the column filler as the cause of generating N.

As shown in FIG. 12, as long as the cliff cross section of $n(u_0)$ is determined, the curved surface of the hill N has no other characteristics and it just climbs a slope of exactly 1 along the L logarithmic axis.

Looking at FIG. 13, the user can only select a filler having a flow velocity $u_0$, a column length L, and $n(u_0)$ as three variables of an operating system. However, the performance that the user really wants is the theoretical number of plates N indicating separation, and a basic unit to of an analysis time, which is a measure of high speed performance. Then, since there is always a pressure upper limit as a limiting condition, the user needs to know three variables of the result system including the velocity-length product Π which is proportional to the pressure.

FIG. 13 is a contour diagram when a filler with a particle size of 2 μm is used. As described above, it is a hilly landscape based on only the function $n(u_0)$ of its filler characteristic. For example, Π of the black circle can be read as 400 mm·mm/s. The velocity-length product Π is a variable that is proportional to the pressure loss ΔP, and 400 mm·mm/s corresponds to about 60 MPa. The column permeability $K_V$ and the viscosity η can be simply calculated as proportional constants, and it is convenient to show a scale of ΔP for reading together beside the Π logarithmic axis.

The user optimizes separation conditions in order to obtain the maximum N using the device system and with a column pressure upper limit of 60 MPa or less. In this case, searching is performed with Π of 400 mm·mm/s as an upper limit. As explained in the text, when Π is fixed and constant, N is a monotonically increasing function with respect to $t_0$. That is, as a longer time is spent, a higher N is obtained. This constant pressure method is called a KPL method. For example, if the black circle in FIG. 13 is selected, it can be read that N of 14,000 plates can be obtained at $t_0$ of 25 s. In addition, operation conditions with $u_0$ of 4 mm/s and L of 100 mm in this case can be read at the same time from this contour diagram.

In addition, if it is desired to increase the speed, for example, set $t_0$ to 10 s of 1/2.5, and see a contour diagram. It is halfway from the coordinate point of 100 s on the $t_0$ logarithmic axis toward the origin, and when climbing the hilly landscape in parallel with the Π logarithmic axis from that point, it reaches contact with the contours of N of about 10,000 plates. It means that, at $t_0$ of 10 s, if Π is raised to 400 mm·mm/s, N=10,000 can be obtained. Even if to is fixed, N is a monotonically increasing function. Therefore, if the pressure is further increased, a higher N can be obtained. $u_0$ and L at this coordinate point are about 6 mm/s and about 70 mm, respectively. As $u_0$, a flow rate that is slightly higher than the optimal linear velocity is set. Actually, using the length L of 50 mm of a commercially available column, if 1Z is raised to 400 mm·mm/s, $u_0$ reaches 8 mm/s so that N that is much lower than 10,000 plates can be read. The reason for this is that the decrease in N due to shortening L and the decrease in the function $n(u_0)$ due to increasing $u_0$ at the same time have a dual contribution effect.

When focusing on maximally utilizing characteristics of the function $n(u_0)$, a trial of using the optimal $u_0$ periphery, that is, at a ridge line of about 4 mm/s, can be understood. This method is called an Opt. method. The effect of the present invention is that coordinate points positioned in the intermediate conditions between two methods can be instantly examined without being biased toward any optimization method that is either the KPL method or the Opt. method. In this method, for example, six variables are visualized in the 3D graph at the same time.

In addition, as described above, since the function $n(u_0)$ shows the filler characteristic, it is possible to display the same contour diagram with a particle size of 3 μm and 5 μm using this as an input function. The user can examine separation conditions by comparing respective contour diagrams. In this case, in a more desirable embodiment, the scale of the ΔP logarithmic axis in parallel with the Π logarithmic axis is shown together. It should be noted that the proportional constant that connects ΔP to Π differs depending on the particle size of the filler.

[Method of Returning to Cause System from Result System 3D Graph]

Figure 22:
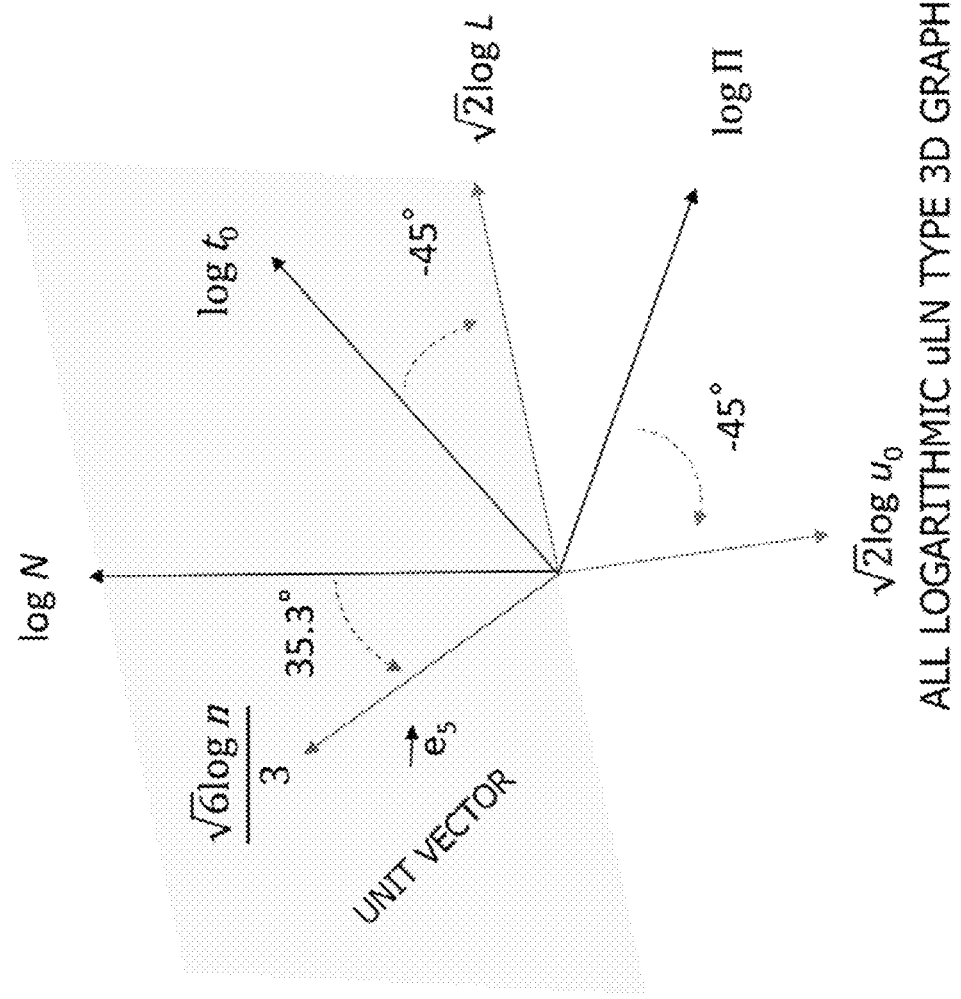
FIG. 22 is a diagram showing development from a result system MN type3D graph.

Using FIG. 22, a method of geometrically finding three variables $u_0$, L, and n of the cause system from the result system øtN type 3D graph is shown. First, inverse transformation in Patent Document 2 is derived (Equation 21). A uLN type 3D graph is obtained by this LRT coordinate transformation. The bottom plane is rotated clockwise, that is, −45° Π–$t_0$. In the generated $u_0$–L bottom plane, each axis is multiplied by a scaling factor of √2. Since the unit vector is extended rather than scaling, it is called a scaling factor in a broad sense.

$$\begin{pmatrix} \log\Pi \\ \log t_0 \end{pmatrix} = \sqrt{2} \begin{pmatrix} \cos 45° & \sin 45° \\ -\sin 45° + & \cos 45° \end{pmatrix} \begin{pmatrix} \log u_0 \\ \log L \end{pmatrix} \quad \text{[Equation 21]}$$

$$\sqrt{2} \begin{pmatrix} \log u_0 \\ \log L \end{pmatrix} = \begin{pmatrix} \cos 45° & -\sin 45° \\ \sin 45° + & \cos 45° \end{pmatrix} \begin{pmatrix} \log\Pi \\ \log t_0 \end{pmatrix}$$

Next, in order to find n, an nN projection method is used. (Equation 22) is derived from the definition equation of (Equation 2). As shown in FIG. 22, a vertical plane in which log L multiplied by the scaling factor √2 is used as a unit vector, and the log N axis is used as another unit vector is formed. There is a unit vector log N in the direction in which the vertical log n vector in the plane deviates from log L, that is, when the mixing angle φ=about 35.3° is rotated counterclockwise. log n is multiplied by a scaling factor of (√6)/3. According to the nN projection method, the magnitude of the inner product is obtained by orthogonally projecting points on the hilly landscape to the unit vector $e_5$, and the magnitude is measured as (√6)/3×log n. Eventually, the image is returned to an image in which the function $n(u_0)$ is drawn as a curve on the plane stretched by log n and log $u_0$ in FIG. 22, and the function $n(u_0)$ is continuously formed as an n membrane in the direction orthogonal to the plane.

$$\log n = -\log L + \log N \quad \text{[Equation 22]}$$

$$\log n = -\frac{1}{\sqrt{2}}(\sqrt{2}\log L) + \log N$$

$$\frac{\sqrt{6}}{3}\log n = -\sin\phi(\sqrt{2}\log L) + \cos\phi\log N$$

A cliff cross section of log L=0 can be used without using the nN projection method. First, using the result system all logarithmic ΠtN type 3D graph as the starting point, when coordinate transformation of LRT is performed, axes of the log–log $u_0$–L bottom plane are expressed. Next, if the cliff cross section with log L=0 is displayed, the function $n(u_0)$, which is the fault plane of 2D log N–log $u_0$, appears as the intercept function. Exactly, it can be observed as a function log n(log $u_0$). The 2D cross section portion 13 generates a discrete log $u_0$ to be swept. Since log L=0 is fixed, corresponding log Π and log $t_0$ are uniquely determined (Equation 21). Since the starting point is the all logarithmic ΠtN type 3D graph, the two-variable function log N(log Π, log $t_0$) can be simply obtained. After all, log N with log L=0, immediately, log n.

Similarly, this method can also be applied to the bottom plane logarithm ΠtN type contour diagram, and when the z-axis with the antilogarithm N(log $u_0$) is obtained and the vertical cross section N–log $u_0$ on the log $u_0$ axis is viewed, this is the antilogarithm n(log $u_0$) which is the theoretical number of plates per unit length.

[Applying Scaling Factor and Offset]

In the present invention, various offsets can be used. On the logarithmic axis, addition or subtraction of offset corresponds to multiplication and division of antilogarithms. Since the flow rate F is the product of the linear velocity $u_0$ and the effective cross-sectional area Seff of the column, $u_0$ can be read as a flow rate by adding the offset log Seff to the scale of the log $u_0$ axis.

Similarly, log ΔP can be read from the log Π axis using (Equation 6). The positive offset on the log Π axis is log η, and the negative offset is log $K_V$. In addition, as shown in (Equation 2), similarly, for the reciprocal relationship, log H can be simply read by multiplying the log n axis by -1 as a type of scaling factor. The retention time $t_R$ can also be read by adding the offset log(k+1) to the log $t_0$ axis. Here, k is a retention coefficient.

As shown in the degree of separation RS (Equation 23), the right side offset is added to the log N axis, and then a scaling factor ½ can be multiplied and then read. This is the same as the relationship read from the all logarithmic uLN type 3D graph by multiplying log Π by a scaling factor 1/√2. That is, if the magnitude is 1 on the log N graph after the above offset is shifted, the magnitude of log RS is read as ½. 2, which is multiplied by the front of log RS of (Equation 23), has this action. Here, α is a separation coefficient.

$$R_S = \frac{1}{4}\sqrt{N}\frac{\alpha-1}{\alpha}\frac{k}{k+1} \quad \text{[Equation 23]}$$

$$\log R_S = \frac{1}{2}\log N + \log\frac{k(\alpha-1)}{4\alpha(k+1)}$$

$$2\log R_S = \log N + 2\log\frac{k(\alpha-1)}{4\alpha(k+1)}$$

It is shown that six variables including Π, $t_0$, and n visualized in the all logarithmic uLN type 3D graph can be read as a flow rate F, a degree of separation RS, a pressure loss ΔP, a retention time $t_R$, and a theoretical stage equivalent height H by using the scaling factor and the offset. Constants required here are Seff, $K_V$, η, k, and α.

[Van Deemter Plot and Hold Up Time Measurement Device]

Figure 23:
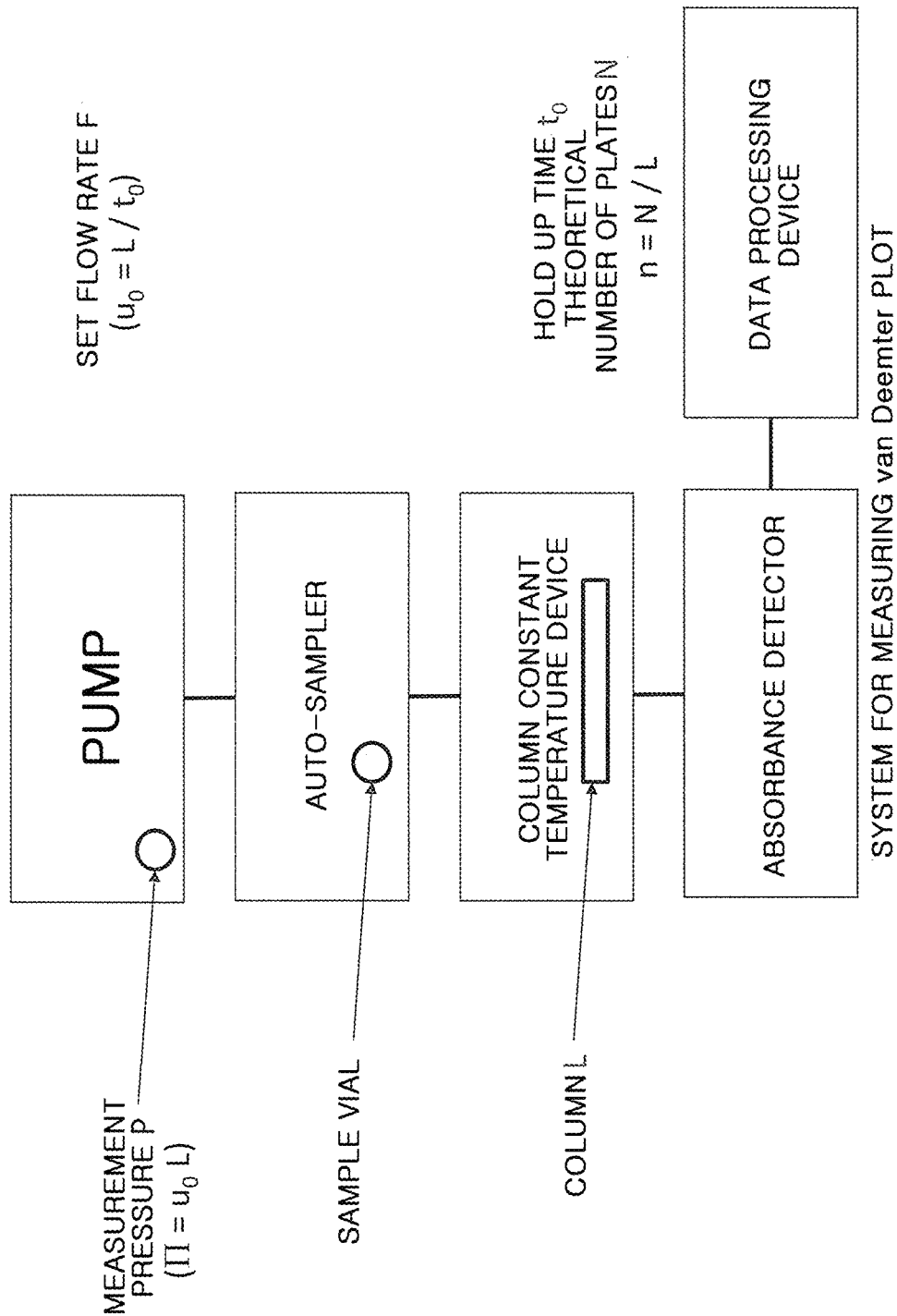
FIG. 23 is a diagram showing a measurement system of van Deemter Plot.

Although it has been explained that $H(u_0)$ or its reciprocal $n(u_0)$ is the starting point of the present invention, a liquid chromatograph (FIG. 23) in which the van Deemter plot is automatically measured may be obtained. In addition, continuously, a system that measures the hold up time $t_0$ is shown.

For example, an analysis method is set in a sample table so that $u_0$ changes from 0.5 mm/s to 5.0 mm/s in steps of 0.5 mm/s, and each N is measured. The flow rate setting of the pump (liquid transfer unit) is converted by multiplying the above Seff. If the column length L=50 mm, n can be obtained from (Equation 2). In analysis conditions, for example, as described in the background technique, butyl benzoate is used as an analyte solute, and 10 μL is sucked and injected from a sample vial on an auto-sampler (sample injection unit). In the column constant temperature device, the column is constantly heated to 40° C., and in the UV absorbance detector (detection unit), the wavelength is set to 270 nm. If the pressure is predicted to reach the upper limit pressure of 60 MPa of the column, increasing the flow rate is stopped before that. N is calculated by the method of the Japanese Pharmacopoeia, or US Pharmacopoeia after the data processing device that also serves as a controller that processes the detection result performs peak identification of the analyte.

As shown in (Equation 2), H is a reciprocal of n, and as shown in (Equation 8), H can be regressed to coefficients A, B, and C. Here, there are some techniques, and the method of regressing the product $u_0$H as a quadratic function $u_0$, is simple. That is, C is regressed to the coefficient of the next term of $u_0$, A is regressed to the coefficient of the first-order term, and B is regressed to the constant term. The graphs of the present invention can be displayed using these coefficient groups.

In addition, it is also necessary to obtain the hold up time $t_0$ by the data processing device or the like. Uracil is generally used for this analyte. It is convenient to add and mix with the butyl benzoate sample described above. The non-retention time of uracil can be $t_0$ for each injection. Since $u_0$ is a physical quantity obtained by dividing L by $t_0$, each $t_0$ is measured without using the set flow rate, and each $u_0$ for each injection is obtained. Therefore, if $u_0$ is obtained, the effective cross-sectional area Seff of the column is decided as a proportional constant with the set flow rate F.

As six variables, for the length L of the column of the column constant temperature device, a specification value at the time of purchase is used, and it is sufficient for the data processing device to measure N for butyl benzoate and $t_0$ for uracil. Other three variables $u_0$, $\Pi$, and n are all calculated. $L = u_0 t_0$, $\Pi = u_0 L$, $(t_0\Pi = L2)$, and $N = nL$.

[Plotting Measurement Results on 3D Graph without Change]

In the above method, the value of butyl benzoate is used as N, but N of uracil can also be used. To return to our subject. Among six variables, if there are three variables;

L of the column dimension value and $t_0$ and N that are directly measured by the data processing device, a plurality of sets (L, $t_0$, N) can be directly plotted on the 3D graph without change without executing an operation process of variable transformation. For example, the all logarithmic uLN type 3D graph as shown in FIG. 12 can be plotted. Since each measured value ($t_0$, N) measured by changing the flow rate is measured from the same column, L is constant. It should be noted that this measured value ($t_0$, N) is different from the $t_0$–N graph used in the KPL method. In the KPL method, L uniquely changes in synchronization with to so that $\Delta P$ is constant in the background of the $t_0$–N graph. On the other hand, in the case of the measured value ($t_0$, N) of this example, since L is constant, $\Delta P$ changes in inverse proportion to $t_0$ in the background. That is, $\Delta P$ is uniquely linked to $t_0$.

The log L-axis and the (log $t_0$)/$\sqrt{2}$ axis are visible on FIG. 13, which is a contour diagram overlooking FIG. 12. These two axes function as an oblique coordinate system with an angle of 45°, and any coordinate position on the bottom plane can be determined. However, in this case, each measured value ($t_0$, N) is plotted on the straight line with a constant L in FIG. 13. When the value of to is set, it is reaffirmed to perform plotting by multiplying a scaling scale factor for the scale of the to logarithmic axis. When the value of log N on the z-axis is plotted, plot points are provided at the height of log N corresponding to $t_0$ on the bottom plane coordinate position of the log $t_0$, which is on the straight line with a constant L. This operation is repeated, and all of the measured values ($t_0$, N) are plotted. As a result, in the image of FIG. 12, a plurality of points of the measured value ($t_0$, N) are provided in a row on the vertical plane stretched above the straight line with a constant L.

Up to this point, only plot points ($t_0$, N) are present on the vertical plane L, but these measured points should be developed in the 3D graph space as shown in FIG. 12. Here, the characteristics of the N curved surface, which is a hilly landscape, are applied. That is, the log N curved surface is a curved surface with a slope of 1 along the log L-axis. Plot points ($t_0$, N) on the vertical plane L extend in the extension direction in which L is larger and the reduction direction in which L is smaller with a slope of 1 along the log L-axis. As a result, the curved surface N as shown in FIG. 12 is formed.

Among other three variables, $u_0$ and $\Pi$ can be found using the relationship of LRT transformation. Using the oblique coordinate system of the log L-axis and the (log $t_0$)/$\sqrt{2}$ axis, the bottom plane of the 3D graph is stretched, but in the same bottom plane, as shown in FIG. 13, the log $u_0$ axis and the (log $\Pi$)/$\sqrt{2}$ axis can be found. Since the bottom plane is two-dimensional, if two variables among the four variables are selected, the remaining two variables are dependent on them.

For the final sixth variable n, the intercept function log n ($u_0$) as a cliff cross section of the curved surface N with log L=0 is observed. After all, L and two variables to and N measured by the data processing device are directly plotted in on the 3D graph, all six variables can be displayed.

Figure 24:
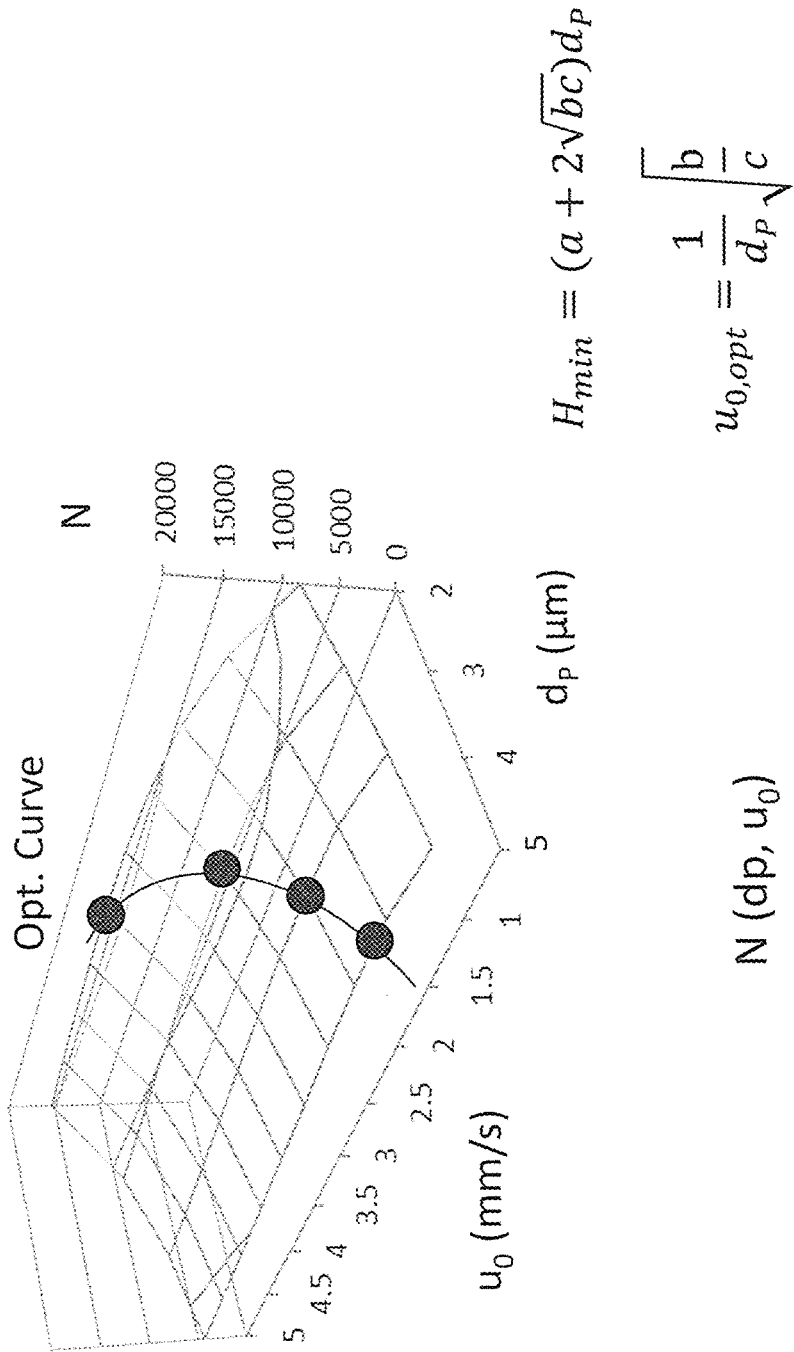
FIG. 24 is a diagram showing N($d_P$, $u_0$).

FIG. 24 is a graph in which the output variable N when a column length is 100 mm is displayed on the vertical axis using (Equation 18). For input variables, there is a two-variable function N($d_P$, $u_0$) with $d_P$ and $u_0$. An Opt. curve drawn from $u_{0,opt}$ of each $d_P$ is drawn as a ridge line. It can be understood that the larger $d_P$, the slower $u_{0,opt}$. This is because a filler with a larger $d_P$ lowers $u_0$, and a relatively larger N can be obtained by performing separation over time. Although $\Pi$ and pressure are not clearly indicated, it can be seen that a filler with a larger $d_P$ from FIG. 24 is positioned with a relative emphasis on separation rather than time.

Here, as described above, the method of displaying a graph with surfaces or lines for data with three or more dimensions is not limited to a so-called 3D graph such as a perspective view, and as a 3D graph display in a broad sense, a graph may be displayed so that contours are displayed according to values of the coordinate axis in the direction perpendicular to the plane of the paper.

In addition, the logarithmic display includes not only a case in which the scale of coordinate axes is displayed by the logarithm but also a case in which the interval between contours is displayed according to the logarithmic scale.

[Display Related to Theoretical Number of Plates N]

Next, a display of the theoretical number of plates N of liquid chromatography will be described.

In order to understand the relationship between the analysis time and the separation performance in HPLC, first, Patent Document 1 is the basis. In Patent Document 1, the same variable as the velocity-length product $\Pi(m^2/s)$ of (Equation 24) is introduced by the expression of the flow constant Cf $$\Pi \equiv u_0 L = \frac{K_V \Delta P}{\eta} \qquad \text{[Equation 24]}$$

Here, $K_V(m^2)$ is a column permeability (column liquid permeability), and $\eta(Pa\cdot s)$ is a viscosity. The pressure loss $\Delta P$ is simply $\Pi$ with $K_V$ and $\eta$ as proportional factors. Since secondary factors of $K_V$ and $\eta$ can be removed, in the present invention, $\Pi$ is considered to be a more convenient variable than $\Delta P$. $\Pi$ is also called a pressure-driven strength. In (Equation 24), $u_0$(m/s) is a linear velocity of the non-retained component, L(m) is a column length, and Π is a simple product of them.

In the present invention, as a model of exhibiting the flow velocity dependence of the theoretical number of plates N, for simplicity, the van Deemter equation is used. That is, the theoretical stage equivalent height H(m) is represented by the function $H(u_0)$ with $u_0$.

$$H(u_0) = A + B\frac{1}{u_0} + Cu_0 \qquad \text{[Equation 25]}$$

Here, coefficients A(m), B(m²/s), and C(s) are constants specific to the column filler, and also depend on the mobile phase, the column temperature, and the analyte. The theoretical number of plates N is a dimensionless index obtained by (Equation 26) using H and L. As can be seen from (Equation 26), N also has a flow velocity dependence.

$$N(u_0) = \frac{L}{H(u_0)} \qquad \text{[Equation 26]}$$

The optimal flow velocity $u_{0,opt}$ is related to this. In the case of the van Deemter equation, $u_{0,opt}$ is obtained by the following equation (Equation 27).

$$u_{0,opt} = \sqrt{\frac{B}{C}} \qquad \text{[Equation 27]}$$

In addition, (Equation 25) draws a downwardly convex curve, and a minimum value $H_{min}$ at $u_{0,opt}$ is obtained (Equation 28).

$$H_{min} = A + 2\sqrt{BC} \qquad \text{[Equation 28]}$$

The maximum value $N_{max}$ of N is obtained by dividing L by $H_{min}$ (Equation 29).

$$N_{max} = \frac{L}{H_{min}} \qquad \text{[Equation 29]}$$

The hold up time $t_0$(s) is used as an index of high speed performance. In reversed-phase chromatography, for example, the appearance time of the non-retained component uracil is generally used. Actually, to explain differently, $u_0$ that has obtained earlier can be positioned as a variable calculated using L from the measured variable $t_0$.

$$u_0 = \frac{L}{t_0} \qquad \text{[Equation 30]}$$

Six variables Π, $u_0$, L, H, N, and $t_0$ and their relational expressions that have appeared so far are preparation for model calculation of the present invention. Then, the constants A, B, and C in (Equation 25) have important roles.

(Summary)
(Problem)

In Patent Document 2, the 3D graph is shown. This is a display of the two-variable function N(Π, $t_0$), and a coefficient of pressure-application (CPA), and a coefficient of time-extension (CTE) have been proposed. CPA for N is a kind of effectiveness index that indicates how much N can increase as the pressure loss increases. There is also CPA for $t_0$, which is an index that indicates how much the pressure rise is effective for speeding up. CTE is an index for N that indicates how effectively N can be strengthened by extending the analysis time, that is, $t_0$.

Although these indexes are able to indicate the effectiveness of the pressure and time, it is not possible to mention how much N can be improved. Separation conditions of the present invention are limited to optimization of only $u_0$ and L. That is, no gradient elution method is used, and the column temperature does not rise. The discussion will proceed with the retention coefficient k of each component fixed. Therefore, a stationary phase (a column filler, a particle size, etc.), a mobile phase (an eluent composition), a solute (an analyte component), and a column temperature are fixed, and an isocratic elution is assumed. As an example, they are all based on the results measured under the same separation conditions (the stationary phase is a C18 silica fully porous filler with a particle size of 2 μm, the mobile phase is a 60% aqueous acetonitrile solution, the column temperature is 40° C., and the sample solute is butyl benzoate).

First, the problem is how the constants A, B, and C in the van Deemter equation influence the determination of the behavior of N(Π, $t_0$) in the optimization of separation conditions with only $u_0$ and L. As a result, the user prioritizes and controls factors with a high degree of influence.

The user also wants to determine N that can be reached by optimization. Is there an upper limit value? If so, the user wants to see it. The upper limit value may have some relationship with variables Π and $t_0$.

(Means)

In order to achieve the above objective, the present invention provides a liquid chromatography data processing device which can calculate the behavior of N(Π, $t_0$) from the flow velocity characteristic of N or H, and display it as a result. In addition, the upper limit value of N and the ratio of N that is currently realized to the upper limit value can also be displayed.

(Effect)

According to the present invention, it is possible to easily determine the relationship between data such as separation conditions for the chromatography device and to easily obtain separation conditions according to user intent.

(Specific Examples)

[Upper Limit Theoretical Number of Plates]

In Patent Document 2, a 3D graph is shown. This is a two-variable function N(Π, $t_0$), which can be clearly described in Equation 31.

$$\begin{aligned}N &= \frac{\Pi}{u_0 H(u_0)} \\ &= \frac{\Pi}{Au_0 + B + Cu_0^2}\end{aligned} \qquad \text{[Equation 31]}$$

$$N(\Pi, t_0) = N(t_0) = \frac{\Pi t_0}{A\sqrt{\Pi t_0} + Bt_0 + C\Pi}$$

Here, Π and $t_0$ are treated as two variables. The variable $u_0$ can be synthesized from Π and $t_0$ (Equation 32).

$$u_0 = \sqrt{\frac{\Pi}{t_0}} \quad (\Pi > 0, t_0 > 0) \qquad \text{[Equation 32]}$$

The domains of $\Pi$, $t_0$, and $u_0$ are positive. (Equation 32) is obtained from (Equation 33) derived from (Equation 24) and (Equation 30).

$$\Pi = u_0^2 t_0 (t_0 > 0) \qquad \text{[Equation 33]}$$

In addition, it should be noted that, since (Equation 31) can be represented by (Equation 34), $\Pi/B$ and $t_0/C$ have interchangeable symmetry with respect to N.

$$N(\Pi, t_0) = \frac{\left(\frac{\Pi}{B}\right)\left(\frac{t_0}{C}\right)}{\sqrt{\frac{A^2}{BC}\left(\frac{\Pi}{B}\right)\left(\frac{t_0}{C}\right) + \left(\frac{\Pi}{B}\right) + \left(\frac{t_0}{C}\right)}} \qquad \text{[Equation 34]}$$

Incidentally, as described above, since (Equation 31) is clearly expressed, the condition in which it is a monotonically increasing function can also be shown. First, $\Pi$ is fixed in (Equation 31) and treated as a one-variable function $N(t_0)$. In order to determine whether $N(t_0)$ monotonically increases, $N(t_0)$ is differentiated by $t_0$.

$$\frac{dN(t_0)}{dt_0} = \Pi \frac{\left(A\sqrt{\Pi t_0} + Bt_0 + C\Pi\right) - \left(\frac{A\sqrt{0}}{2\sqrt{t_0}} + B\right)t_0}{\left(A\sqrt{\Pi t_0} + Bt_0 + C\Pi\right)^2} \qquad \text{[Equation 35]}$$

$$= \frac{A\sqrt{\Pi^3 t_0} + 2C\Pi^2}{2\left(A\sqrt{\Pi t_0} + Bt_0 + C\Pi\right)^2}$$

In order for this differential coefficient to be positive, it can be understood that, when viewed the numerator of the fraction, A is not zero or C is not zero in the condition. Originally, it is assumed that the constants A, B, and C are non-negative. Therefore, this is a necessary and sufficient condition in which $N(t_0)$ is a monotonically increasing function. For example, in the case of the filler with a particle size of 2 μm, it is a monotonically increasing function with $A=5.1\times10^{-6}$ (m), $B=3.3\times10^{-9}$ (m$^2$s$^{-1}$), and $C=2.7\times10^{-4}$ (s).

Next, $t_0$ in (Equation 31) is fixed and treated as a one-variable function $N(\Pi)$.

$$N(\Pi) = \frac{t_0 \Pi}{A\sqrt{t_0 \Pi} + Bt_0 + C\Pi} \qquad \text{[Equation 36]}$$

Similarly, in order to determine whether $N(\Pi)$ monotonically increases, $N(\Pi)$ is differentiated by $$\frac{dN(\Pi)}{d\Pi} = t_0 \frac{\left(A\sqrt{t_0 \Pi} + Bt_0 + C\Pi\right) - \left(\frac{A\sqrt{t_0}}{2\sqrt{\Pi}} + C\right)\Pi}{\left(A\sqrt{t_0 \Pi} + Bt_0 + C\Pi\right)^2} \qquad \text{[Equation 37]}$$

$$= \frac{A\sqrt{t_0^3 \Pi} + 2Bt_0^2}{2\left(A\sqrt{t_0 \Pi} + Bt_0 + C\Pi\right)^2}$$

As in (Equation 35), it can be understood that, when the numerator is viewed, A is not zero or B is not zero in the condition, that is, a necessary and sufficient condition in which $N(\Pi)$ is a monotonically increasing function is found. Here, the constants A, B, and C are non-negative.

Each condition in which $N(t_0)$ and $N(\Pi)$ are monotonically increasing functions is understood, but does $N(\Pi, t_0)$ diverse to infinity? First, it can be understood that, if to is set to infinity in (Equation 31), as shown in (Equation 38), there is an asymptotic upper limit value $N_{sup}(\Pi)$ according to $\Pi$. Similarly, actually, $\Pi$ does not become infinity, but if $\Pi$ is virtual set to infinity, $N_{sup}(t_0)$ corresponding to $t_0$ is obtained (Equation 38).

$$N_{sup}(\Pi) \equiv \lim_{t_0 \to \infty} N(\Pi, t_0) = \frac{\Pi}{B} \qquad \text{[Equation 38]}$$

$$N_{sup}(t_0) \equiv \lim_{\Pi \to \infty} N(\Pi, t_0) = \frac{t_0}{C}$$

Figure 25:
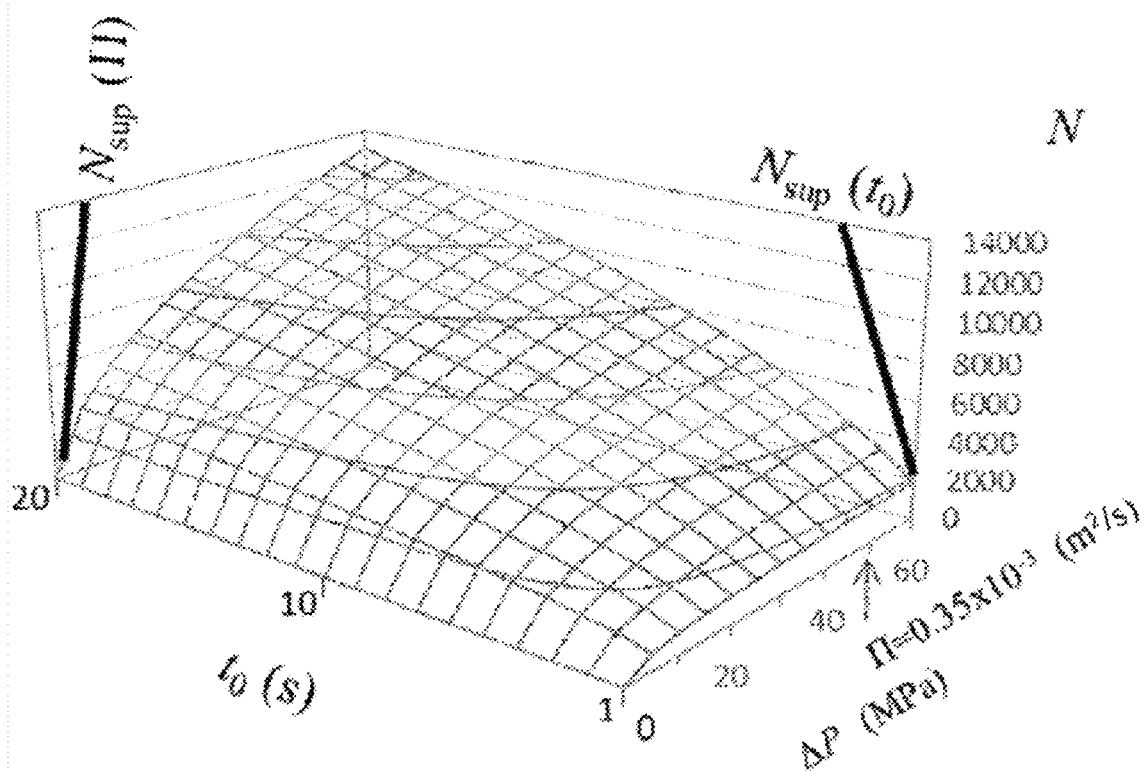
FIG. 25 is a 3D graph displaying an upper limit theoretical number of plates.

When each $N_{sup}$ is projected on the vertical wall plane of the 3D graph, it becomes as shown in FIG. 25. For example, $N(\Pi)$ at $t_0=20$ s has a square root curved cross section on the vertical wall N–$\Pi$ plane, but interestingly, the projected $N_{sup}(\Pi)$ is a straight line proportional to $\Pi$.

Similarly, under the maximum pressure loss, $N(t_0)$ with $\Delta P_{max}=60$ MPa has a square root curved cross section on the vertical wall N–$t_0$ plane, but the virtually projected $N_{sup}(t_0)$ is also a straight line proportional to $t_0$. The data processing device can display each of the projected straight lines of $N_{sup}$ on the 3D graph as a limit value in which separation condition optimization is reached.

Figure 26:
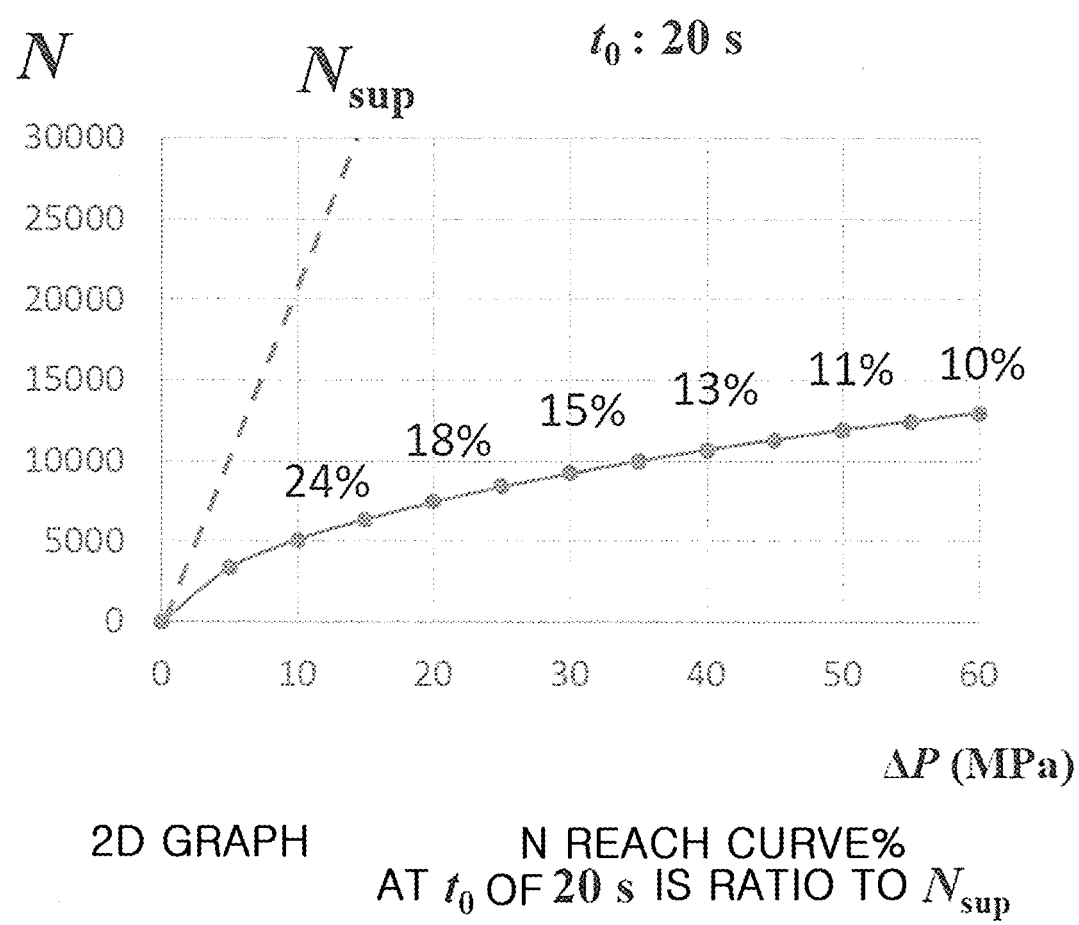
FIG. 26 is a 2D graph displaying an upper limit theoretical number of plates.

In addition, as shown in FIG. 26, for example, display data corresponding to the limit value of the theoretical number of plates as the separation performance may be data corresponding to the display line that displays the limit value in the 2D graph. In addition, as shown in the figure, it may be a display line that displays a value of a predetermined ratio of the limit value or data corresponding to the scale of the coordinate axis. In addition, for example, it may be data that displays a value of a ratio to a limit value in the theoretical number of plates of a plot corresponding to one or more predetermined plots of a graph showing the correspondence between the flow velocity $u_0$ and the theoretical number of plates N.

Here, in displaying the limit value as described above, the coefficients A to C in (Equation 25) may be obtained based on, for example, automatic measurement, or may be input by the user or the like.

Liquid chromatography data processing devices that can perform display as described above can be summarized, and configured, for example, as follows.

A first liquid chromatography data processing device is a liquid chromatography data processing device which generates display data that displays a graph showing a correspondence relationship between data based on analysis conditions of a chromatography device and data on separation performance, and the liquid chromatography data processing device is configured to generate display data showing a correspondence relationship between data according to an analysis time and data on a separation performance and also generate display data corresponding to a limit value of the separation performance.

A second liquid chromatography data processing device is a liquid chromatography data processing device in which the display data corresponding to a limit value of the separation performance is data corresponding to a display line that displays the limit value in the first liquid chromatography data processing device.

A third liquid chromatography data processing device is a liquid chromatography data processing device in which the display data corresponding to a limit value of the separation performance is data corresponding to a display line that displays the limit value and a value of a predetermined ratio of the limit value or a scale of a coordinate axis in the first liquid chromatography data processing device.

A fourth liquid chromatography data processing device is a liquid chromatography data processing device in which the display data corresponding to a limit value of the separation performance is data indicating a value of a ratio to the limit value of the value related to separation performance in a plot corresponding to the predetermined plot of the graph in the first liquid chromatography data processing device.

In addition, in the special case of $u_0=u_{0,opt}$, $u_{0,opt}$ becomes the square root of the value obtained by dividing B by C as in (Equation 27), and the relationship as in (Equation 39a) is obtained. That is, interestingly, on the straight line with $u_0=u_{0,opt}$, $N_{sup}(\Pi)$ with infinite to and virtual $N_{sup}(t_0)$ with infinite $\Pi$ have the same value.

$$N_{sup}(\Pi) = \frac{u_{0,opt}L}{B} = \frac{L}{\sqrt{BC}}$$ [Equation 39]

$$N_{sup}(t_0) = \frac{L}{Cu_{0,opt}} = \frac{L}{\sqrt{BC}}$$ (Equation 39a)

Here, L has a role of a sort of a parameter.

$$L^2 = \Pi t_0$$ (Equation 39b)

However, with regard to $\Pi$ and $t_0$, a condition in which one side uniquely restricts the other side is imposed as shown above.

The straight line with $u_0=u_{0,opt}$ intersects the $\Delta P_{max}$, that is boundary condition of $\Pi_{max}$. In particular, this intersection is called a vertex of a delta region, which is meaningful for optimization. Since N of the vertex is obtained by $\Pi_{max}$, it is expressed as $N_{ver}(\Pi_{max})$ including the meaning on the line $u_{0,opt}$ (Equation 40).

$$N_{ver}(\Pi_{max}) = \frac{\left(\frac{C}{B}\Pi_{max}\right)\Pi_{max}}{A\sqrt{\left(\frac{C}{B}\Pi_{max}\right)\Pi_{max} + B\left(\frac{C}{B}\Pi_{max}\right) + C\Pi_{max}}} = \frac{C}{A\sqrt{BC}+2BC}\Pi_{max}$$ [Equation 40]

Here, next $t_{0,ver}$ which is to in the vertex, is substituted.

$$t_{0,ver} = \frac{\Pi_{max}}{u_{0,opt}^2} = \frac{C}{B}\Pi_{max}$$

In general, since there are asymptotic upper limit values $N_{sup}(\Pi)$ and $N_{sup}(t_0)$ for any two-variable function $N(\Pi, t_0)$, the ratio of $N(\Pi, t_0)$ to each upper limit value can be calculated. As a special case, the ratio of $N_{ver}(\Pi_{max})$ to $N_{sup}$ is required (Equation 41). Since it is on the $u_{0,opt}$ line, as described above, $N_{sup}(t_{0,ver})=N_{sup}(\Pi_{max})$.

$$\frac{N_{ver}(\Pi_{max})}{N_{sup}(\Pi_{max})} =$$ [Equation 41]

$$\frac{C\Pi_{max}}{A\sqrt{BC}+2BC} \cdot \frac{B}{\Pi_{max}} = \frac{BC}{A\sqrt{BC}+2BC} = \frac{1}{\frac{A}{\sqrt{BC}}+2}$$

Here, (Equation 40) is divided by (Equation 38). As a result, since the domain of $A/(\sqrt{BC})$ is zero to infinity, the ratio of N to $N_{sup}$ in vertex is an upper limit of 50%.

The data processing device can output this kind of various results.

[Consideration of Particle Size]

In Non-Patent Document 3, the relational expression (Equation 42) between H and particle size $d_P$(μm) is described.

$$H(u_0) = ad_P + b\frac{1}{u_0} + cd_P^2 u_0$$ [Equation 42]

Here, a, b, and c are coefficients. Compared to the coefficients in (Equation 25), there are relationships of $A=ad_P$, $B=b$, and $C=cd_P^2$. First, $u_{0,opt}$ of the optimal flow velocity is obtained as (Equation 43), and when $u_0=u_{0,opt}$ is fixed here, H is obtained (Equation 44).

$$u_{0,opt} = \sqrt{\frac{B}{C}} = \sqrt{\frac{b}{cd_P^2}} = \frac{1}{d_P}\sqrt{\frac{b}{c}}$$ [Equation 43]

$$H(u_{0,opt}) = ad_P + bd_P\sqrt{\frac{c}{b}} + \frac{cd_P^2}{d_P}\sqrt{\frac{b}{c}} =$$ [Equation 44]

$$ad_P + d_P\sqrt{bc} + d_P\sqrt{bc} = (a+2\sqrt{bc})d_P = H_{min}(d_P)$$

That is, a relational expression (Equation 44) in which the minimum value Hmm at $u_0=u_{0,opt}$ is proportional to $d_P$ is obtained.

It can be understood that, when the coefficients B and C in the above (Equation 38) are read as the coefficients in (Equation 42), interestingly, since B=b, $N_{sup}(\Pi)$ does not depend on the particle size. That is, the same $N_{sup}(\Pi)$ can be obtained even if $d_P$ is 2 μm or 5 μm because $\Pi$ is the same. However, when $\Pi$ is converted into $\Delta P$, it is necessary to divide by $K_V$ (Equation 24). In Non-Patent Document 5, according to the Kozeny-Carman equation, $K_V$ is proportional to the square of $d_P$ (Equation 45).

$$K_V = \frac{d_P^2}{\phi_P}$$ [Equation 45]

Here, the flow resistance φP is a proportional constant, and empirical, it is a number larger than 1 such as several hundred.

Since $K_V$ is proportional to the square of $d_P$, a larger $d_P$ relatively easily achieves the same $\Pi$ with a smaller $\Delta P$. In other words, in order to obtain the same $N_{sup}(\Pi)$, $\Delta P$ needs to be increased in a form in which a smaller particle size is inversely proportional to $d_P^2$. If this is expressed by an equation, (Equation 46) is obtained from (Equation 38) and (Equation 24).

$$N_{sup}(\prod) = \frac{\prod}{B} = \frac{\prod}{b} = \frac{K_V \Delta P}{b\eta} = \frac{d_P^2 \Delta P}{b\phi_P \eta} \quad \text{[Equation 46]}$$

$$N_{sup}(\Delta P) \equiv \frac{d_P^2 \Delta P}{b\phi_P \eta}$$

Therefore, the upper limit theoretical number of plates $N_{sup}(\Delta P)$ with the pressure loss $\Delta P$ as a variable can be newly defined (Equation 46). This interpretation is a technical expression, but in order to obtain any same $N_{sup}(\Pi)$, for example, 100,000 plates, $\Delta P$ should be raised in inverse proportion to $d_P^2$.

On the other hand, $N_{sup}(t_0)$ in (Equation 38) transitions to (Equation 47).

$$N_{sup}(t_0) = \frac{t_0}{C} = \frac{t_0}{cd_P^2} \quad \text{[Equation 47]}$$

$N_{sup}(t_0)$ is inversely proportional to $d_P^2$. When this is interpreted, at the same $t_0$, a larger $N_{sup}$ is obtained in a form in which a smaller particle size is inversely proportional to $d_P^2$. When (Equation 46) and (Equation 47) are combined, in an operation of reducing the particle size, for example, obtaining any same upper limit theoretical number of plates $N_{sup}$ as 100,000 plates, although there is an adverse effect that $\Delta P$ needs to be increased in inverse proportion to $d_P^2$, as a result, to can increase in proportion to $d_P^2$. This can be mentioned because $N_{sup}(t_0)$ and $N_{sup}(\Delta P)$ have a characteristic expressed as a function that is simply proportional to $t_0$ and $\Delta P$, respectively.

Instead of the upper limit value $N_{sup}$, the discussion will return to a general theoretical number of plates N. A three-variable function $N(\Delta P, t_0, d_P)$ with variables $\Delta P$, $t_0$, and $d_P$ is introduced, and the domain of $u_0$ in which $H_{min}$ can be approximated to be almost constant even if $u_0$ changes is handled. Bottom plane coordinates $(\Delta P, t_0)$ are fixed, and only $d_P$ is changed. (Equation 26), (Equation 44), and (Equation 39b) are used to represent $N(\Delta P, t_0, d_P)$ (Equation 48).

$$N(\Delta P, t_0, d_P) = \frac{L}{H_{min}(d_P)} = \quad \text{[Equation 48]}$$

$$\frac{\sqrt{\prod t_0}}{(a+2\sqrt{bc})d_P} = \frac{\sqrt{\frac{d_P^2 \Delta P}{\phi_P \eta} t_0}}{(a+2\sqrt{bc})d_P} = \frac{\sqrt{\Delta P t_0}}{\sqrt{\phi_P \eta}(a+2\sqrt{bc})}$$

Here, (Equation 24) and (Equation 45) are also used.

In (Equation 48), $d_P$ is offset by the numerator and the denominator. Therefore, when bottom plane coordinates $(\Delta P, t_0)$ are fixed, N is constant even if $d_P$ changes because all others are constants.

This interpretation is based on a nearly constant approximation of Hmm to $u_0$ change. However, for example, even if $d_P$ is subdivided from 3 μm to 2 μm, the effect of $d_P$ making Hasan smaller and better is offset by the adverse effect of $d_P$ making $K_V$ being larger. After all, for example, when viewed from fixed coordinates $(\Delta P, t_0)$ with $\Delta P=20$ MPa and $t_0=10$ s, N does not increase or decrease even if $d_P$ changes.

Even if the subdivision influence is explained with the image of the all logarithmic type 3D graph, after all, the effect of raising the landscape of $N(u_0, L)$ as a whole according to an action of H or n and the amount of deterioration shift (contribution to lower $\Pi$) of $K_V$ when $\Delta P$ is converted to $\Pi$ will be offset.

Actually, there is a relationship between $\Delta P$ and $t_0$ in which $N(\Delta P, t_0, d_P)$ does not change no matter how much $d_P$ changes, that is, a trajectory on the coordinates $(\Delta P, t_0)$. First, $N(\Pi, t_0, d_P)$ is obtained using the coefficients in (Equation 31) and (Equation 42) (Equation 49).

$$N(\prod, t_0, d_P) = \frac{\prod t_0}{ad_P\sqrt{\prod t_0 + bt_0 + cd_P^2 \prod}} \quad \text{[Equation 49]}$$

Here, $\Pi$ is a two-variable function $\Pi(\Delta P, d_P)$ from (Equation 24) and (Equation 46) (Equation 50).

$$\prod(\Delta P, d_P) = \frac{1}{\phi_P \eta} d_P^2 \Delta P \quad \text{[Equation 50]}$$

By substituting three places (Equation 50) for (Equation 49), all $\Pi$ can be replaced with $\Delta P$, and $N(\Delta P, t_0, d_P)$ can be expressed explicitly. The partial differential coefficient (Equation 51) is calculated, and the condition in which the partial differential coefficient becomes zero is coordinates $(\Delta P, t_0)$ in which $N(\Delta P, t_0, d_P)$ does not change even if $d_P$ is changed.

$$\left(\frac{\partial N(\Delta P, t_0, d_P)}{\partial d_P}\right)_{\Delta P, t_0} = \frac{\frac{1}{\phi_P \eta} t_0 \Delta P \left(bt_0 - c\frac{1}{\phi_P \eta} d_P^4 \Delta P\right)}{\left(ad_P^2 \sqrt{\frac{1}{\phi_P \eta} t_0 \Delta P} + bt_0 + c\frac{1}{\phi_P \eta} d_P^4 \Delta P\right)^2} \quad \text{[Equation 51]}$$

The condition in which (Equation 51) becomes zero is that the number in parentheses of the numerator is zero (Equation 52).

$$bt_0 - c\frac{1}{\phi_P \eta} d_P^4 \Delta P = 0 \quad \text{[Equation 52]}$$

This condition can transition to (Equation 53) by replacing the coefficients and variables with equivalents.

$$bt_0 - (cd_P^2)\left(\frac{d_P^2 \Delta P}{\phi_P \eta}\right) = 0 \quad \text{[Equation 53]}$$

$$Bt_0 - C\Pi = 0$$

$$C\Pi = Bt_0$$

$$\frac{\Pi}{t_0} = \frac{B}{C} = u_{0,opt}$$

This means that, in model calculation of the present invention, when Π and $t_0$ are on the Opt. line, the partial differential coefficient is zero. That is, it is a necessary and sufficient condition in which N(ΔP, $t_0$, $d_P$) does not change even if $d_P$ is exactly changed only when the relationship between ΔP and $t_0$ is a relationship when operating at the optimal flow velocity $u_{0,opt}$. The above approximate calculation (Equation 48) using $H_{min}$ is right.

[Step of Drawing all Logarithmic Type 3D Graph]

As described in Patent Document 3, the landscape N($u_0$, L) grows from the cliff cross section curve n($u_0$) with a slope of 1, but four steps returning back to the valley curve H($u_0$) will be described here. First, before entering each step, in step 0, the coordinate system of the all logarithmic type 3D graph is set in advance. In the Cartesian system with right hand, and x, y, and z axes are assigned to log $u_0$, log L, and log N, respectively.

Figure 27:
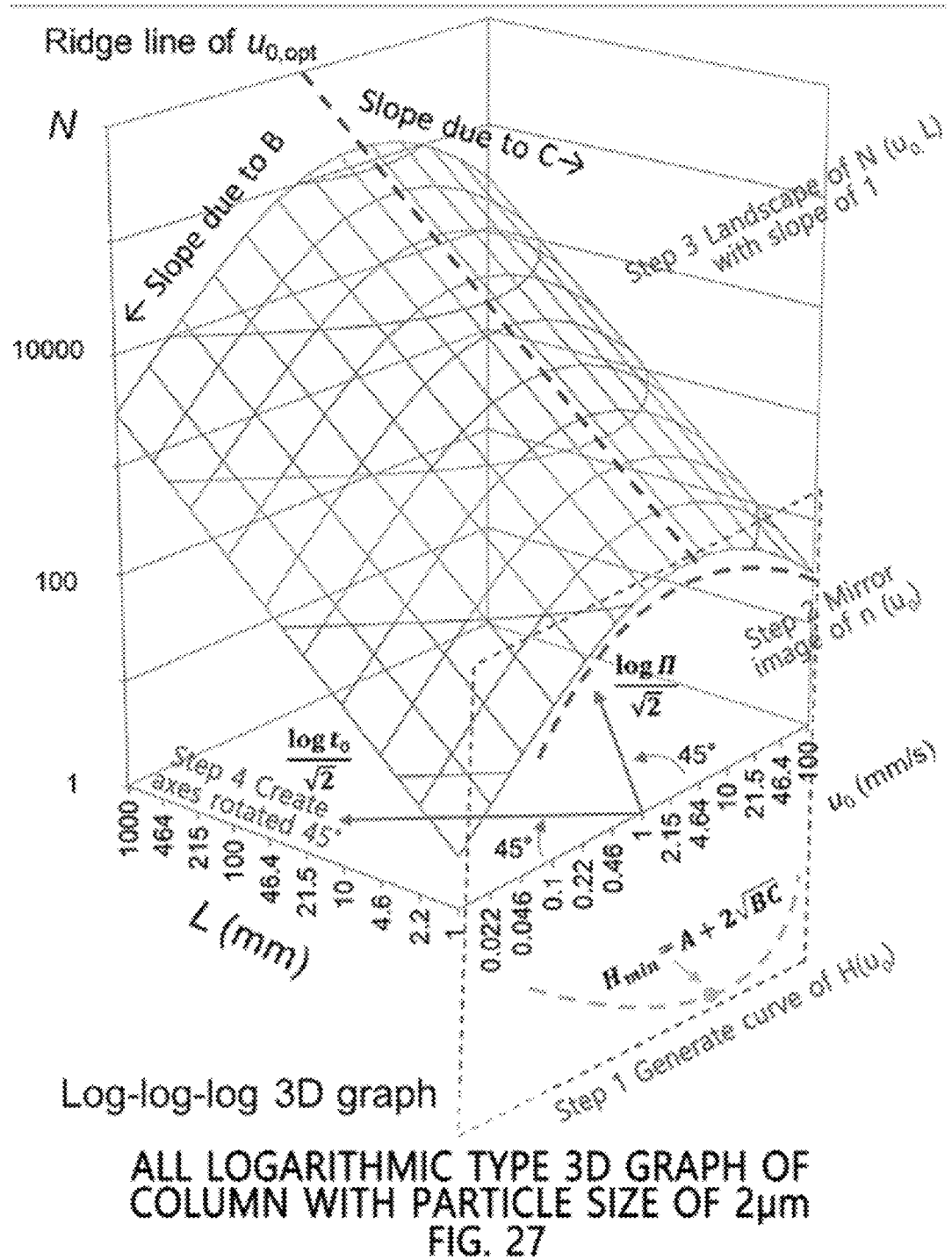
FIG. 27 is an all logarithmic type 3D graph of a column with a particle size of 2 µM.

In step 1, a valley curve H($u_0$) is generated. This is a so-called van Deemter curve (Equation 25). As shown in FIG. 27, the curve H($u_0$) is plotted on a vertical plane of N-$u_0$ with log L=0, that is, L=1 (mm).

In step 2, a cliff cross section n($u_0$) curve which is a mirror image of the valley H($u_0$) curve is drawn above the valley.

In step 3, the landscape of N($u_0$, L) is grown according to the slope of 1. Since N is proportional to L, log N increases with a slope of 1 due to log L when expressed logarithmically.

In the final step 4, logarithmically rotating coordinate system (LRC) transformation is used. A log Π/√2 axis is set at a location rotated 45° counterclockwise from the log $u_0$ axis. This √2 is a scaling factor. Similarly, a log $t_0$/√2 axis is set at a location rotated 45° counterclockwise from the log L-axis.

The steps of generating an all logarithmic type 3D graph are described above. Variables related to the landscape N($u_0$, L) can be measured quantitatively with axes as scales.

[Curve Fitting Step of Van Deemter Equation]

In Patent Document 3, as described in the above [van Deemter plot and hold up time measurement device], a method of multiplying both the right side and the left side of (Equation 8) by $u_0$ and curve fitting as a quadratic function is obtained. Here, a method of obtaining coefficients based on characteristics of the van Deemter equation will be described.

First, as step 1, the C term is obtained in a sufficiently large flow velocity range of $u_0$. Here, since the B term has no influence, the slope of the straight line directly becomes a coefficient C. Actually, it is desirable to perform straight line regression in the flow velocity range after about twice $u_{0,opt}$.

In step 2, the horizontal axis point $u_{0,opt}$ of the minimum value of the van Deemter plot is found. Actually, it is easy to use curve fitting of a local quadratic curve. As shown in (Equation 27), since $u_{0,opt}^2$ is a quotient of B and C, the constant B can be calculated by substituting C obtained in step 1.

In addition, in step 3, the coefficient A is also obtained based on algebraic calculation from the vertical axis point Hmm of the minimum value and the constants B and C (Equation 28).

[Service Provided by Server Computer]

A device system that the user possess outputs a 3D graph and performs optimization calculation for separation conditions, but the same input and output results are obtained by linking a computer that the user possess to a server computer of a service provider via a network line.

For example, time-series data for van Deemter plots is transmitted to the server, and after regression analysis, the output coefficients A, B, and C are received. Next, these A, B, and C can be used to receive the all logarithmic type 3D graph. When relationship data between the flow velocity and the pressure loss is uploaded, $K_V$ is also output as the analysis result of the server. When these analysis results are combined, N(ΔP, $t_0$) is graphed in the all antilogarithmic type 3D graph and the contour diagram. If it is a server computer, it is possible to display the output result of overlaying in consideration of the discrete column length. In addition, in consideration of the upper limit theoretical number of plates, the separation method is optimized, and services that provide advice to the user are also provided. It is possible to realize a centralized function from collecting raw data to numerical value analysis such as mathematical statistics, and optimization of an analysis method.

Generally, the van Deemter equation is (Equation 25) or (Equation 42), but there are various other expressions as follows (Equations 54 and 55). According to a service performed by a server computer, various functional forms can be easily applied.

$$H(u_0) = Au_0^{1/3} + B\frac{1}{u_0} + Cu_0 \qquad \text{[Equation 54]}$$

There is (Equation 55) from Non-Patent Document 3.

$$H(u_0) = ad_P + b\frac{D_m}{u_0} + \frac{cd_P^2}{D_m}u_0 + \frac{Dd_P^{5/3}}{D_m^{2/3}}u_0^{2/3} + \frac{3}{8k_d}u_0 \qquad \text{[Equation 55]}$$

Here, $D_m$ is a diffusion coefficient (m²/s) of an analyte in a mobile phase, $k_d$ is a desorption rate constant (s⁻¹), and D is a constant intrinsic coefficient.

[Extension of 3D Graph Using Simulation]

The x-, y-, and z-axes of the 3D graph are, for example, Π, $t_0$, and N, but variables can be selected from these superordinate concepts of pressure, time, and separation performance and used. In addition, it can be extended to gradient elution or stepwise elution without being limited to the isocratic elution. In this case, it is convenient to set the degree of separation R or an index indicating the separation performance equivalent thereto on the z-axis. R can also be defined in the local time domain, which is closer to the retention time of two components. For the gradient elution, a fairly complex time program can be used, but even if the complexity is fully used, when the time or pressure is fixed, a specific upper limit degree of separation $R_{sup}$ should not be exceeded. This can be said from the $N_{sup}$ analogy.

Regarding the time, even in the case of gradient elution, the retention time of the second component between the two components is set as t2 and can be used as a variable on the y-axis. When the flow velocity changes, a retention volume V2 of the second component can be used, but the theory is considerably complicated.

Although ΔP can be simply used for the pressure on the x-axis, in the gradient elution, it is conceivable that ΔP is not constant. In this case, for convenience, $\Delta P_{max}$ is used. In order to display such a 3D graph, it is no longer possible to describe it with a simple equation. Therefore, simulation results with $u_0$, L, and H as inputs are used, and it is necessary to devise a method of summarizing the plurality of simulation results into the maximum value and the minimum value and displaying them three-dimensionally. Even if L is fixed, when $u_0$ changes, in particular, since H is a function $H(u_0)$ with $u_0$, it is desirable to perform a simulation.

When the analyte is changed or the composition and concentration of the mobile phase, the column temperature, and the like change, the profile of $H(u_0)$, the retention coefficient k, or $K_V$, and η also change so that these change need to be considered in the simulation.

[Preparation of UHPLC Definition]

Regarding the change in the particle size $d_P$, focusing on the optimal flow velocity $u_{0,opt}$ (Equation 19), variables are uniquely determined (Non-Patent Document 6). The discussion is limited to the category of the so-called Opt. method. First, when a specific pressure loss ΔP is determined, the column length L is necessarily determined (Equation 56) by the Kozeny-Carman equation (Equation 1 and Equation 20).

$$L = \frac{K_V \Delta P}{\eta u_{0,opt}} = \frac{\Delta P}{\phi_P \eta} \sqrt{\frac{c}{b}} \, d_P^3 = L(\Delta P, d_P) \quad \text{[Equation 56]}$$

L can be expressed by the two-variable function $L(\Delta P, d_P)$ with ΔP and $d_P$. The minimum $H_{min}$ is (Equation 20), and N can also be expressed by the two-variable function $N(\Delta P, d_P)$ (Equation 57).

$$N = \frac{L}{H_{min}} = \frac{K_V \Delta P}{(a + 2\sqrt{bc})d_P \eta u_{0,opt}} = \frac{d_P^2 \Delta P}{\phi_P \eta (a + 2\sqrt{bc})d_P} d_P \sqrt{\frac{c}{b}} = \frac{c}{(a\sqrt{bc} + 2bc)} \frac{c}{b} \left(\frac{\Delta P}{\phi_P \eta}\right) d_P^2 = N(\Delta P, d_P) \quad \text{[Equation 57]}$$

It can be understood that, in (Equation 57), at an arbitrary ΔP, when a certain theoretical number of plates $N_r$ is required, there is a specific particle size $d_{P,opt}$. That is, apart from the view that N is a two-variable function $N(\Delta P, d_P)$ such as (Equation 57), it can be interpreted that $d_{P,opt}$ has a form of a two-variable function $d_{P,opt}(\Delta P, N_r)$ with ΔP and $N_r$ such as (Equation 58) (Non-Patent Document 7).

$$d_{P,opt}^2 = \frac{a\sqrt{bc} + 2bc}{c}\left(\frac{\phi_P \eta}{\Delta P}\right) N_r = \{d_{P,opt}(\Delta P, N_r)\}^2 \quad \text{[Equation 58]}$$

On the other hand, it can be understood that the hold up time $t_0$ has a form of two-variable function $t_0(\Delta P, d_P)$ under the optimal flow velocity Opt. method (Equation 59).

$$t_0 = \frac{L}{u_{0,opt}} = \frac{c}{b}\left(\frac{\Delta P}{\phi_P \eta}\right) d_P^4 = t_0(\Delta P, d_P) \quad \text{[Equation 73]}$$

It can be understood that, when all (Equation 56), (Equation 57), and (Equation 59) are viewed at once, L, N, and $t_0$ are proportional to the third, second, and fourth powers of $d_P$, and all are proportional to ΔP.

Incidentally, the coefficients a, b, and c here are specified by the van Deemter equation, which explicitly represent the particle size $d_P$ in (Equation 18). Incidentally, b and c determine the functional shape of the van Deemter equation, but a is a type of offset. Hereinafter, for generalization, the constant $h_{min}$, $U_{min}(m^2/s)$, and $\pi P(1/s)$ related to $d_P$ are introduced, and become easy to see.

$$H_{min} \equiv h_{min} d_P = (a + 2\sqrt{bc})d_P \quad \text{[Equation 60]}$$

$$u_{0,opt} \equiv U_{min} \frac{1}{d_P} = \sqrt{\frac{b}{c}} \frac{1}{d_P} \quad \text{[Equation 61]}$$

$$\Pi \equiv \pi_P d_P^2 = \left(\frac{\Delta P}{\phi_P \eta}\right) d_P^2 \quad \text{[Equation 62]}$$

Here, in Non-Patent Document 7, the dimensionless $v_{min}$ such as (Equation 63) is used, but since the diffusion coefficient $D_m(m^2/s)$ needs to be introduced at the same time, only $U_{min}(m^2/s)$ is used in the present invention.

$$u_{0,opt} \equiv \frac{D_m v_{min}}{d_P} = \frac{U_{min}}{d_P} \quad \text{[Equation 63]}$$

Using these constants, N, L, and $t_0$ can be rewritten from (Equation 57), (Equation 56), and (Equation 59) as follows (Equation 64) to (Equation 66).

$$N(\Delta P, d_P) = \frac{1}{h_{min} U_{min}}\left(\frac{\Delta P}{\phi_P \eta}\right) d_P^2 = \frac{1}{h_{min} U_{min}} \pi_P d_P^2 \quad \text{[Equation 64]}$$

$$L(\Delta P, d_P) = \frac{1}{U_{min}}\left(\frac{\Delta P}{\phi_P \eta}\right) d_P^3 = \frac{1}{U_{min}} \pi_P d_P^3 \quad \text{[Equation 65]}$$

$$t_0(\Delta P, d_P) = \frac{1}{U_{min}^2}\left(\frac{\Delta P}{\phi_P \eta}\right) d_P^4 = \frac{1}{U_{min}^2} \pi_P d_P^4 \quad \text{[Equation 66]}$$

In addition, similarly, (Equation 67) can also be obtained from (Equation 58) or (Equation 64).

$$\{d_{P,opt}(\Delta P, N_r)\}^2 = h_{min} U_{min}\left(\frac{\phi_P \eta}{\Delta P}\right) N_r = h_{min} U_{min} \frac{1}{\pi_P} N_r \quad \text{[Equation 67]}$$

[Definition of UHPLC]

N, L, and $t_0$ are all two-variables $f(\Delta P, d_P)$ specified from the bottom plane $(\Delta P, d_P)$. If $d_P$ is fixed, they are all simple functions that monotonically increase in proportion to ΔP. On the other hand, if ΔP is fixed, a graph proportional to the power of the horizontal axis $d_P$ such as second, third, or fourth power can be drawn.

When two equations are selected from the three equations (Equation 64) to (Equation 66) and ΔP is eliminated, a relational expression such as N and L can be obtained, and the relational expression is also expressed by the power of the horizontal axis $d_P$. In addition, the relational expression is an identical equation related to ΔP, and can be theoretically established at any ΔP such as 20 MPa and 100 MPa. The identical equation related to ΔP will be described below.

Similarly, if $d_P$ can be eliminated from these three equations, an identical equation related to $d_P$ for the horizontal axis ΔP that is theoretically established for both 5 μm and 2

μm can be obtained. For example, the identical equation of $t_0/N^2$ is obtained from (Equation 64) and (Equation 66) (Equation 68). It can be understood that (Equation 68) found from the reasoning of this identical equation is exactly the impedance time $t_E$(s) (initial application for claim to priority).

$$t_E \equiv \frac{t_0}{N^2} = h_{min}^2 \left(\frac{\phi_P \eta}{\Delta P}\right) = h_{min}^2 \frac{1}{\pi_P} \qquad \text{[Equation 68]}$$

Figure 28:
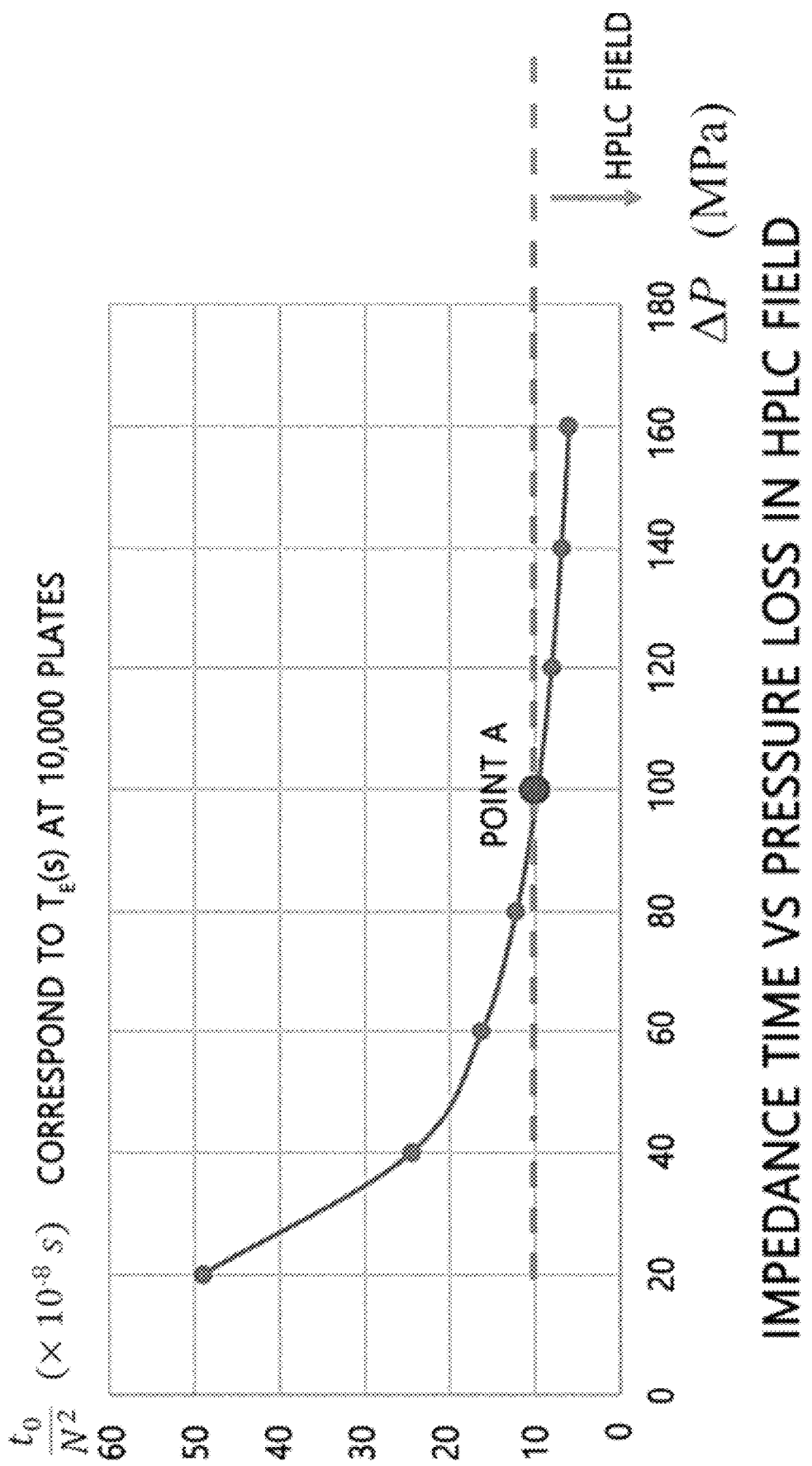
FIG. 28 is a graph showing the relationship between an impedance time and a pressure loss in an HPLC field.

For example, $t_E$ is an index indicating how many seconds are required to obtain 10,000 plates. In order to eliminate $d_P$, N is squared. When $t_E$ is used, $t_E$ is represented by a one-variable function $t_E(\Delta P)$ that is inversely proportional to $\Delta P$, as shown in FIG. 28, a new graph with the pressure loss on the horizontal axis can be drawn. As described above, in the separation conditions, butyl benzoate is used as an analyte, a 60% aqueous acetonitrile solution is used as a mobile phase, and the column temperature is set to 40° C.

When using the idea of FIG. 28, UHPLC can be defined not from the maximum pressure of the system but from the performance aspect of the separation method. That is, $\Delta P$ is a unstable variable that is easily influenced by the column temperature, the viscosity of the mobile phase, the column transmittance, and the like. Therefore, it is a well-known fact that $\Delta P$ is not necessarily the separation performance itself. Therefore, in order to specify UHPLC, some indexes indicating separation performance are necessary. In (Equation 68), $t_E$ is one of overall performance indexes specified from both aspects of high speed and high separation. Again, in consideration of the Opt. method, under constant conditions of each $\Delta P$, to has a characteristic that is proportional to $N^2$. Interestingly, for example, under a specific $\Delta P$ such as 60 MPa, at each $d_P$ such as 5 μm and 2 μm, N and $t_0$ indicate different performances, but $t_E$ is constant when focusing on the ratio of $t_0/N^2$. In this case, since $\Delta P$ is determined, L in the background is uniquely determined at any $d_P$. Based on the same $\Delta P$, at 5 μm, the column transmittance is higher so L is longer, and $t_0$ is applied, however N or $N^2$ is larger. The good relationship between $t_E$ and $\Delta P$ has a characteristic obtained by the Opt. method of the optimal flow velocity.

For example, among performances obtained using the HPLC system, a performance obtained under a pressure condition of 100 MPa or more is provisionally called a UHPLC grade performance. As described above, since the pressure fluctuates due to various factors, the definition by pressure is not suitable as a method of specifying separation performance. In FIG. 28, for example, when $t_E$ is $10 \times 10^{-8}$ s or less, it can be specified as ultra high performance liquid chromatography (UHPLC). This corresponds to 10 seconds or less at 10,000 plates. This separation condition corresponds to about 100 MPa or more here. A nice round number is occasional, but it seems to be roughly the concept considering for the maximum pressure of a general UHPLC system. Since the vertical axis of the graph is $t_E$ indicating overall performance of separation and high speed, a UHPLC boundary reference $10 \times 10^{-8}$ s or less can be proposed instead of 100 MPa. This corresponds to 10 s or less at 10,000 plates, and is equivalent to taking 40 s, which is four times that of 20,000 plates. Precisely, in FIG. 28, the point A corresponds to 10 s at 10,000 plates, but cannot be said to be 10 s at 10,000 plates. N=10,000 plates at the point A occurs only when $d_P$=1.5 μm from (Equation 42) or (Equation 57), and $t_0$=10 s. Here, in the calculation, for the coefficients a, b, and c, experimental values with a particle size $d_P$=5 μm are used and when $d_P$=2.1 μm, N=40 s at 20,000 plates. The point A is a point that represents 10 s grade at 10,000 plates including all arbitrary particle sizes $d_P$. This is the intent of a specification method with $t_E$.

UHPLC specified from performance can be called a UHPLC field. The HPLC field includes the UHPLC field, and the UHPLC field is a subset belonging to the HPLC field. The boundary can be proposed as a reference value $t_E = 10 \times 10^{-8}$ s.

Using the performance-specification method means that the UHPLC field can be reached using a system with a maximum pressure of 60 MPa. When a monolith column or a core-shell column is used, since it enters the UHPLC field with a relatively low analysis pressure, it may be called a UHPLC column. In a fully porous silica column, if the withstand pressure of the column with a particle size of 3 μm increases, a threshold value of 160 s at 40,000 plates may be exceeded by using a relatively long column. Since this is $t_E$ specification, it can be understood that it is equivalent to the UHPLC boundary value $10 \times 10^{-8}$ s. In addition, as in the conventional manner, when acetonitrile instead of methanol is used in the mobile phase, since the viscosity is lower, it is easier to reach the UHPLC field. The method of raising the column temperature is also the same.

The curve in FIG. 28 shows an impedance time reach limit in the meaning that it cannot reach below this curve. It is the limit that can be reached with the same type of filler with any particle size $d_P$ by adjusting the column length L to some extent under these separation conditions. This is because the limit is the Knox and Saleem limit that can be reached by fully using optimal $d_P$ and L in the specific pressure loss $\Delta P$ shown on the horizontal axis (Non-Patent Document 6). In addition, the impedance time $t_E$ is examined in detail in Non-Patent Document 8. The novelty of the present application is to show the graph with the vertical axis $t_E$ and the horizontal axis $\Delta P$. Here, even if $N^2/t_0(1/s)$ which is the reciprocal of $t_E$ is used on the vertical axis, the boundary of the UHPLC field is similarly shown.

Similarly, when the optimal $d_P$ is considered with the fixed specific pressure $\Delta P$, there are remaining two relational expressions obtained by selecting two equations from three equations (Equation 64) to (Equation 66). There are (Equation 69) in which the third power of N is proportional to the square of L and (Equation 70) in which the fourth power of L is proportional to the third power of $t_0$.

$$h_{min}^3 U_{min} N^3 = \left(\frac{\Delta P}{\phi_P \eta}\right) L^2 = \pi_P L^2 \qquad \text{[Equation 69]}$$

$$L^4 = U_{min}^2 \left(\frac{\Delta P}{\phi_P \eta}\right) t_0^3 = U_{min}^2 \pi_P t_0^3 \qquad \text{[Equation 70]}$$

In addition, again, for $t_E$, when fixed to a specific pressure, a relational expression in which to is proportional to the square of N is obtained from (Equation 74). If this is shown as a $t_0$–N plot, its trajectory is drawn by a quadratic function that passes through the origin.

[Relational Expression Between N and Π]

Another important relational expression (Equation 71) is created in the Opt. method.

$$\Pi = h_{min} U_{min} N \qquad \text{[Equation 71]}$$

Here, $d_P$ is offset by eliminating the parameter L from $\Pi = u_{0,opt} L$ and $L = H_{min} N$ and using (Equation 60) and (Equation 61). In the relational expression, to does not appear explicitly, and Π is proportional to N. Therefore, it can be understood again that, for any $d_P$ and $\Delta P$ and H linked thereto, $\Pi$ has a role of a direct intensity variable for N. In this series of fully porous silica fillers, the velocity-length product $\Pi$ is used to determine N and can be regarded as being introduced as an index that is not influenced by $d_P$ instead of $\Delta P$. On the other hand, it can be understood that, since to is obtained from $\Pi=u_{0,opt}^2 t_0$, it depends on $d_P$ according to (Equation 63).

[Plate Time]

From three equations (Equation 64) to (Equation 66), three new relational expressions can be found by linking the corresponding pressure loss $\Delta P$ for a specific particle size $d_P$. That is, there are three identical equations (Equation 72), (Equation 73), and (Equation 74) in which $\Delta P$ is eliminated and the side of $d_P$ is explicitly shown.

$$h_{min}d_P^2 N = U_{min}t_0 \quad \text{[Equation 72]}$$

$$h_{min}d_P N = L \quad \text{[Equation 73]}$$

$$d_P L = U_{min}t_0 \quad \text{[Equation 74]}$$

(Equation 72) and (Equation 74) are equal to each other.

Incidentally, a plate time $t_P$ (Equation 75), which is the time per plate, is derived from (Equation 72) (Patent Document 3).

$$t_P = \frac{t_0}{N} = \frac{h_{min}}{U_{min}} d_P^2 \quad \text{[Equation 75]}$$

As shown in (Equation 75), $t_P$ is a one-variable function with a particle size $d_P$ (Non-Patent Document 7). In this background, $\Delta P$ can be freely increased or decreased in proportion to L, and only the ratio $t_P$ of $t_0/N$ is stored. However, $d_P$ is a variable that should be determined.

The impedance time $t_E$ is a function of $\Delta P$, which is symmetric to $d_P$ that is free. For $t_E$, in the background, since $\Delta P$ is constant, for $d_P$, L is constrained so that $L \propto d_P^2$, and under this constraining condition, only the ratio $t_E$ of $t_0/N^2$ is stored. $t_P$ is output when $d_P$ is input, but for $t_E$, as shown in FIG. 28, $t_E$ is output when $\Delta P$ on the horizontal axis is input. Both $t_P$ and $t_E$ are total performance related to the time and theoretical number of plates, but $t_E$ is more appropriate for defining UHPLC imaged at a high pressure.

Non-Patent Document 8 describes a formula in which $t_E$ is related to the separation impedance E. It is shown in the notation of the present invention (Equation 76).

$$t_E = \quad \text{[Equation 76]}$$

$$\frac{t_0}{N^2} = \frac{\eta}{\Delta P} \frac{H_{min}^2}{K_V} = \frac{\eta}{\Delta P} E = \frac{\eta}{\Delta P} \phi_P h_{min}^2 = \frac{h_{min}^2}{\pi_P} = \frac{H_{min}^2}{\Pi}$$

After this section [Preparation of UHPLC definition], the description is limited to the Opt. method, and an examination is performed in consideration of N, L, and $t_0$ that are two-variable functions with $\Delta P$ and $d_P$ (Equations 64 to 66), but in (Equation 76), $d_P$ does not appear explicitly. $t_E$ and E related to the impedance are functions only with $\Delta P$. It can be understood that $t_E$ and E are generated from the relational expression in which $d_P$ is eliminated. A 2D graph with $t_E$ and $\Delta P$ on two axes is important.

On the other hand, in the plate time $t_P$, similarly, $\Delta P$ does not explicitly appear. In the background, $\Delta P$ and L are linked and support (Equation 75). In $t_E$, in the background, $d_P$ and L are linked. A mathematical operation begins from the starting point in which five variables N, L, $t_0$, $\Delta P$, and $d_P$ are treated, and is positioned as the bottom plane ($\Delta P$, $d_P$) in which $\Delta P$ and $d_P$ change independently. It can be overlooked that the relational expression is found by fixing either $\Delta P$ or $d_P$ and combining variables N and $t_0$ that can be on the z-axis, and mutually symmetric $t_E$ and $t_P$ are extracted (Equation 68) (Equation 75). In addition, since the method is limited to the Opt. method, H and $u_0$ are fixed to $H_{min}$ and $u_{0,opt}$, respectively. After all, there is an image that leads the industry regarding a higher pressure $\Delta P$ is desirable for UHPLC. Therefore, when a graph in which $t_E$ is associated with $\Delta P$ as shown in FIG. 28 is drawn, UHPLC can be defined based on the total performance $t_E$ of high speed and high separation that replaces $\Delta P$. If an image that a smaller particle size $d_P$ is desirable is prioritized, UHPLC should be defined based on $t_P$ regardless of $\Delta P$, but it is not actually like that.

Further, the apparatus may include a computer. The processes that are performed by the apparatus are stored in program formats in a computer-readable storage medium and the computer reads out the programs, whereby the programs are performed. The computer-readable storage medium is a magnetic disc, a magneto-optical disc, a CD-ROM, a DVD-ROM, a semiconductor memory, etc. The computer programs may be transmitted to a computer through a network such that the computer receiving the programs performs the programs.

The programs may be programs for achieving some of the functions described above. The programs may be programs that can achieve the functions by combination with other programs recorded in advance in a computer system, that is, difference files (difference programs).

What is claimed is:

1. A liquid chromatography data processing device which generates, based on data regarding analysis conditions of a chromatography device and separation performance, display data that displays a graph showing correspondence of the data regarding analysis conditions of the chromatography device and separation performance, generating:
   a first group of biaxial data regarding the analysis conditions;
   a second group of biaxial data obtained by calculations, comprising multiplication and/or division of two data of the first group of biaxial data; and
   display data according to a graph showing correspondence of data regarding the separation performance,
   wherein at least each axis of the first group of biaxial data and the second group of biaxial data is represented as a logarithmic axis.

2. The liquid chromatography data processing device according to claim 1,
   wherein the first group of biaxial data and the second group of biaxial data include data corresponding to at least one of an index according to a flow velocity of a mobile phase, a column length, an index according to a pressure loss of a column, and an index according to an analysis time.

3. The liquid chromatography data processing device according to claim 1,
   wherein the data regarding the separation performance include data corresponding to at least one of a theoretical number of plates, a theoretical stage equivalent height, a theoretical number of plates per unit length of a column, and a degree of separation.

4. The liquid chromatography data processing device according to claim 3,
wherein the graph representing the data regarding the separation performance is represented with logarithmic axis.

5. The liquid chromatography data processing device according to claim 4,
wherein the data regarding the separation performance include first separation performance data according to at least one of the theoretical number of plates, the theoretical stage equivalent height, the theoretical number of plates per unit length of the column, and the degree of separation and second separation performance data obtained by a calculation including multiplication and/or division of the first separation performance data and at least one of the first group of biaxial data and the second group of biaxial data or a calculation including a reciprocal of the first separation performance data.

6. The liquid chromatography data processing device according to claim 5,
wherein the first separation performance data is the theoretical number of plates, the second separation performance data is the theoretical number of plates per unit length of the column, the first group of biaxial data or the second group of biaxial data includes a column length, and display data showing a cross-sectional shape of a surface where the column length in a 3D graph is a unit length is generated.

7. The liquid chromatography data processing device according to claim 1,
wherein at least some of the axes are represented by antilogarithm according to an instruction given.

8. The liquid chromatography data processing device according to claim 1,
wherein display data that display a cross section obtained by cutting the graph in a predetermined plane is additionally obtained.

9. The liquid chromatography data processing device according to claim 1,
wherein display data that displays a curve when any of the first group of biaxial data and the second group of biaxial data is set to a predetermined fixed value is additionally generated.

10. The liquid chromatography data processing device according to claim 1,
wherein the first group of biaxial data and the second group of biaxial data include a particle size of a column.

* * * * *